United States Patent
Takahashi

(10) Patent No.: US 10,545,612 B2
(45) Date of Patent: Jan. 28, 2020

(54) SIGNAL PROCESSING CIRCUIT, SIGNAL PROCESSING IC, AND SEMICONDUCTOR DEVICE

(71) Applicant: Semiconductor Energy Laboratory Co., Ltd., Atsugi-shi, Kanagawa-ken (JP)

(72) Inventor: Kei Takahashi, Isehara (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 486 days.

(21) Appl. No.: 15/366,176

(22) Filed: Dec. 1, 2016

(65) Prior Publication Data

US 2017/0168648 A1 Jun. 15, 2017

(30) Foreign Application Priority Data

Dec. 11, 2015 (JP) ................. 2015-242728

(51) Int. Cl.
G06F 3/045 (2006.01)
G06F 3/041 (2006.01)
G06F 3/044 (2006.01)

(52) U.S. Cl.
CPC ............ G06F 3/0418 (2013.01); G06F 3/044 (2013.01); G06F 3/0412 (2013.01)

(58) Field of Classification Search
CPC ....... G06F 3/0418; G06F 3/044; G06F 3/0412
See application file for complete search history.

(56) References Cited

U.S. PATENT DOCUMENTS 8,441,462 B2 5/2013 Kobayashi et al.
8,902,192 B2 12/2014 Miyamoto et al.
8,942,937 B2 1/2015 Miyamoto et al.
8,976,154 B2 3/2015 Miyamoto et al.
(Continued)

FOREIGN PATENT DOCUMENTS

JP 2011-113187 A 6/2011
JP 2014-519063 8/2014
WO WO-2004/053819 6/2004

OTHER PUBLICATIONS

Hamaguchi.M et al., "A 240Hz-Reporting-Rate 143×81 Mutual-Capacitance Touch-Sensing Analog Front-End IC With 37dB SNR for 1mm-Diameter Stylus", ISSCC 2014 (Digest of Technical Papers. IEEE International Solid-State Circuits Conference), Feb. 11, 2014, pp. 214-216.

(Continued)

Primary Examiner — Kent W Chang
Assistant Examiner — Andrew Lee
(74) Attorney, Agent, or Firm — Robinson Intellectual Property Law Office; Eric J. Robinson

(57) ABSTRACT

An object is to improve the signal-to-noise ratio (SNR). A signal processing circuit includes first to fourth terminals, a switch circuit, and an integrator circuit. The integrator circuit includes an amplifier circuit. The amplifier circuit has an output terminal, a terminal (−), a first terminal (+), and a second terminal (+). The switch circuit has a function of electrically connecting the terminal (−) to the second terminal, the first terminal (+) to the first terminal, and the second terminal (+) to the third terminal; and a function of electrically connecting the terminal (−) to the third terminal, the first terminal (+) to the second terminal, and the second terminal (+) to the fourth terminal. The integrator circuit integrates a signal input to the terminal (−), with an average voltage of the voltages of the first terminal (+) and the second terminal (+) as a reference voltage. The integrator circuit removes common mode noise from the signal input to the terminal (−) and thus can output a signal with high SNR. The signal processing circuit is used for a sensing circuit of a touch sensor, for example.

18 Claims, 35 Drawing Sheets

(56) References Cited

U.S. PATENT DOCUMENTS

| | | | |
|---|---|---|---|
| 9,013,448 B2 | 4/2015 | Miyamoto et al. | |
| 9,030,441 B2 | 5/2015 | Yumoto et al. | |
| 9,058,085 B2 | 6/2015 | Miyamoto et al. | |
| 9,146,632 B2 | 9/2015 | Miyamoto | |
| 9,152,286 B2 | 10/2015 | Yumoto et al. | |
| 9,354,757 B2 | 5/2016 | Miyamoto et al. | |
| 9,367,184 B2 | 6/2016 | Kobayashi et al. | |
| 9,454,271 B2 | 9/2016 | Miyamoto et al. | |
| 9,465,492 B2 | 10/2016 | Miyamoto et al. | |
| 2006/0072047 A1 | 4/2006 | Sekiguchi | |
| 2008/0136627 A1* | 6/2008 | Hayakawa | G01P 15/08 340/540 |
| 2010/0109620 A1* | 5/2010 | Colombo | H01L 23/4952 323/265 |
| 2010/0307840 A1* | 12/2010 | Kobayashi | G06F 3/044 178/18.06 |
| 2012/0286697 A1* | 11/2012 | Kimura | G05F 3/242 315/291 |
| 2013/0211757 A1 | 8/2013 | Miyamoto | |
| 2014/0132562 A1 | 5/2014 | Miyamoto et al. | |
| 2014/0146010 A1* | 5/2014 | Akai | G06F 3/0416 345/174 |
| 2014/0218645 A1 | 8/2014 | Miyamoto | |

OTHER PUBLICATIONS

Hamaguchi.M et al., "A 240Hz-Reporting-Rate 143×81 Mutual-Capacitance Touch-Sensing Analog Front-End IC With 37dB SNR for 1mm-Diameter Stylus", ISSCC 2014, 12.3, Feb. 11, 2014.

* cited by examiner

FIG. 6

| INPUTS | | | OUTPUTS | | | | | |
|---|---|---|---|---|---|---|---|---|
| REV | MO | PRE | PRE_LS | MO_LS | INM_O | INM_E | INP_O | INP_E |
| H | H | H | H | H | L | L | L | L |
| L | | | H | H | L | L | L | L |
| H | L | | H | L | L | L | H | L |
| L | | | H | L | L | L | L | H |
| H | H | L | L | H | H | L | L | L |
| L | | | L | H | L | H | L | L |
| H | L | | L | L | H | L | L | H |
| L | | | L | L | L | H | H | L |

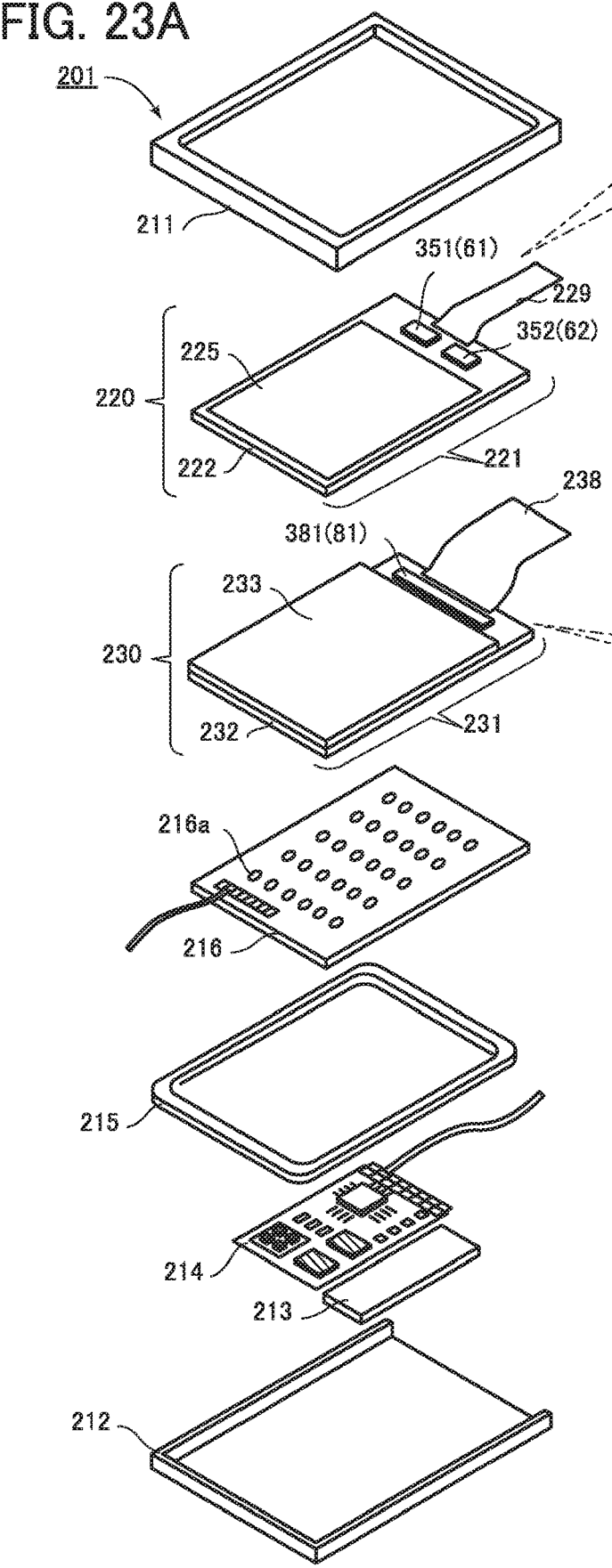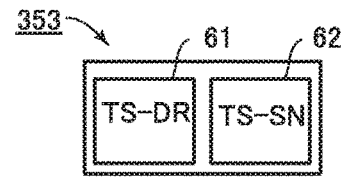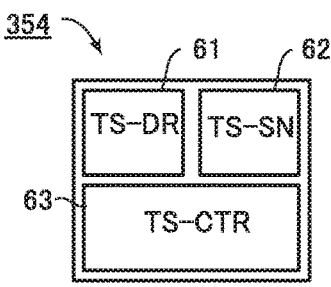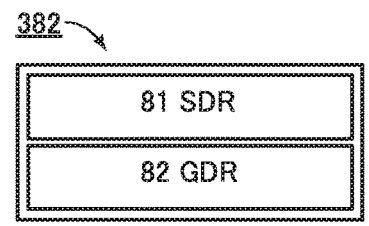

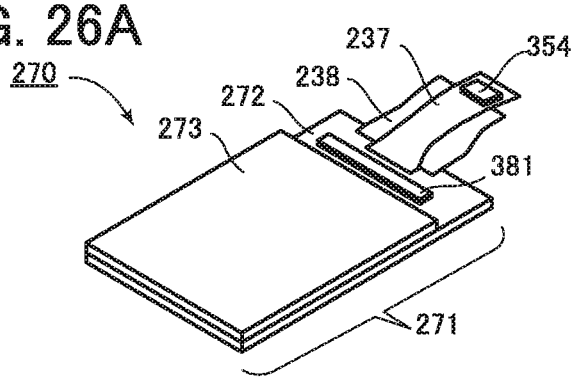
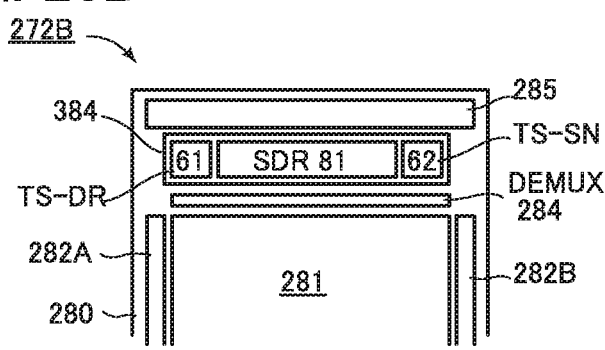
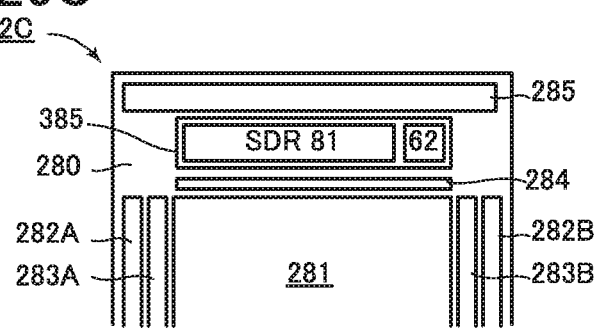
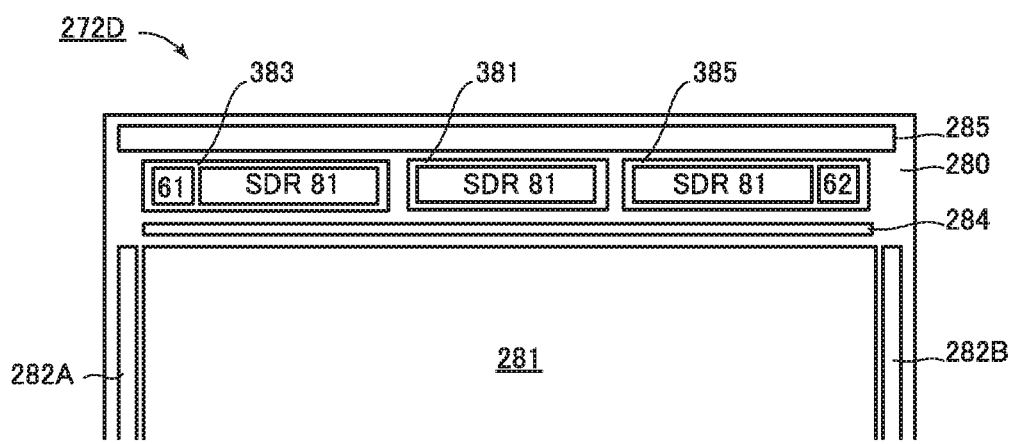

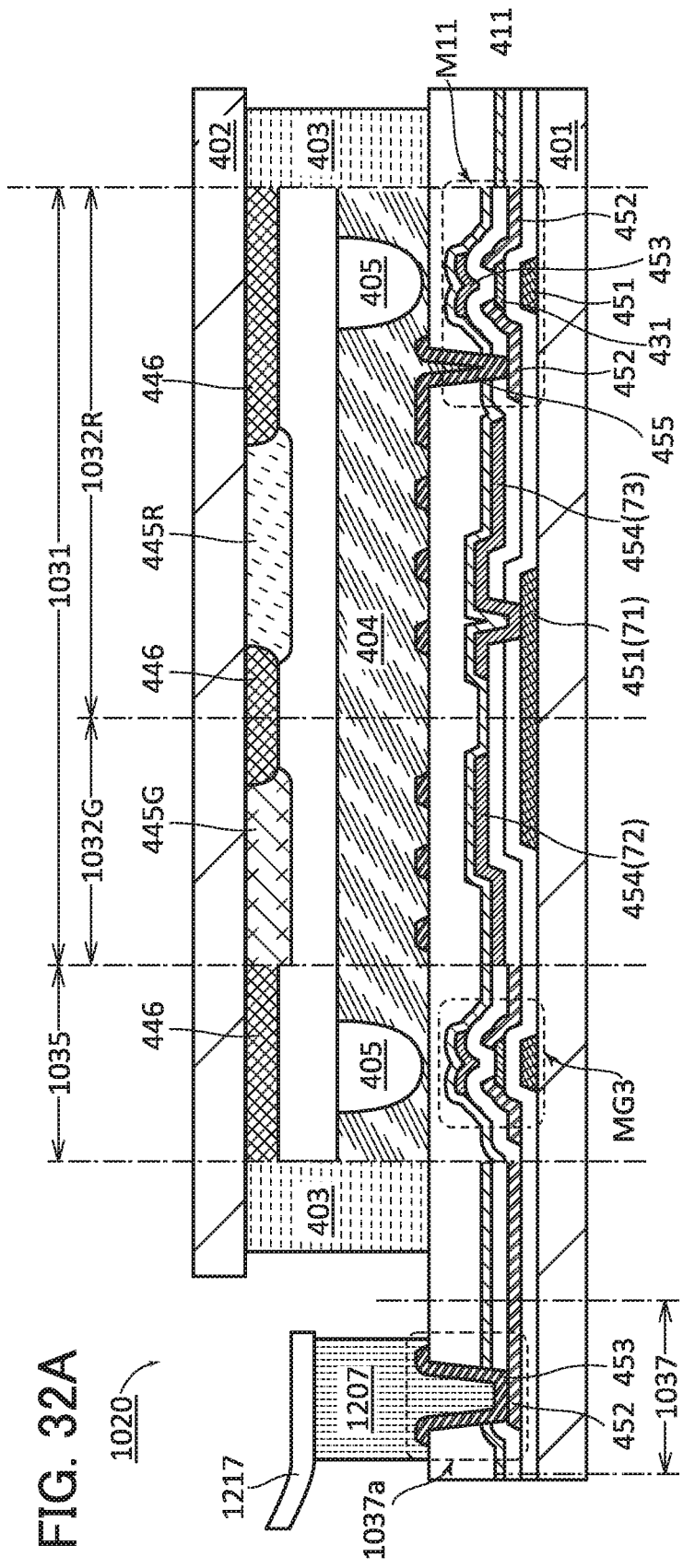
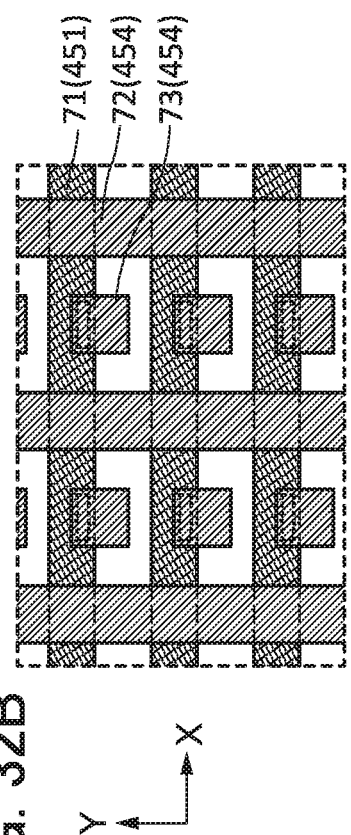
FIG. 32A
FIG. 32B

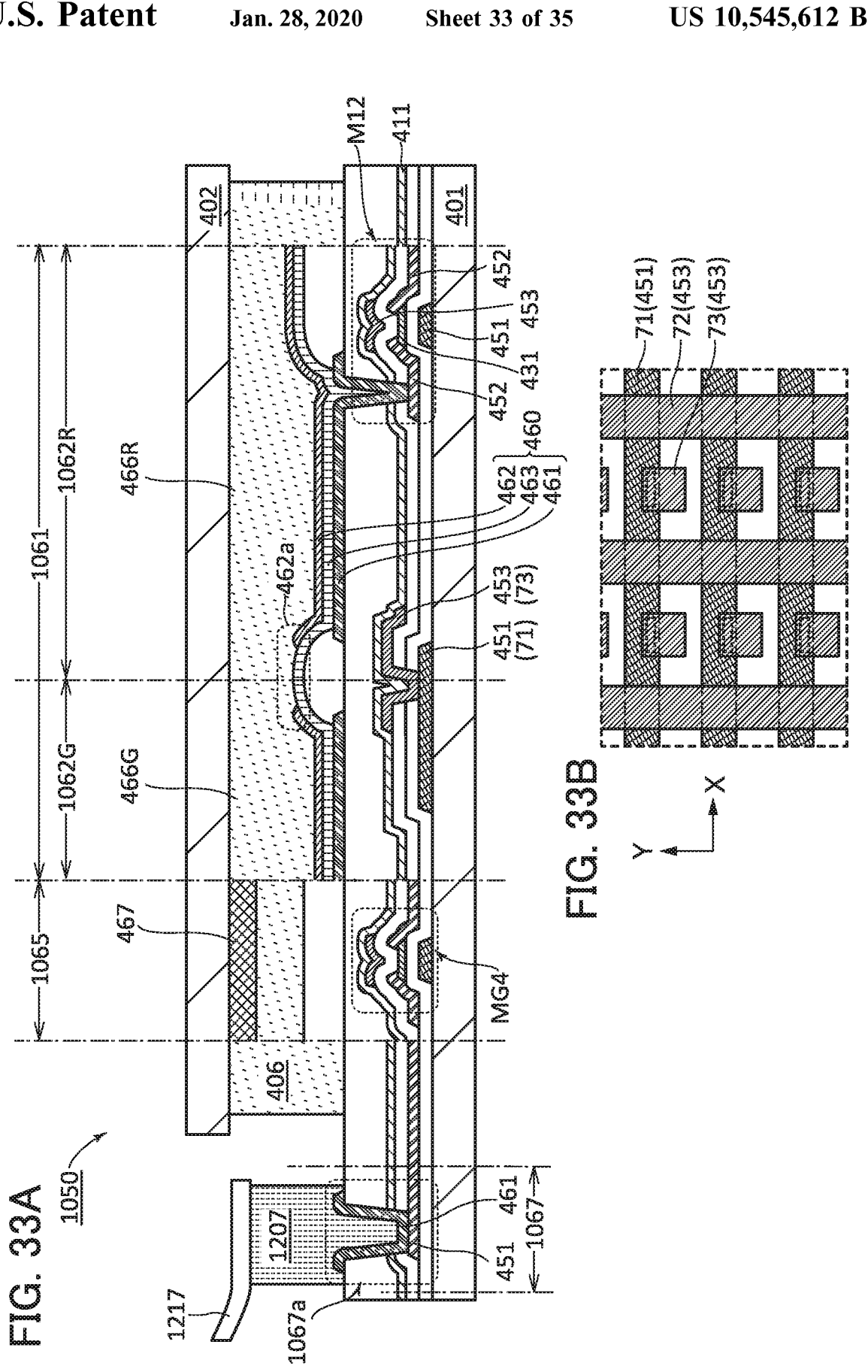

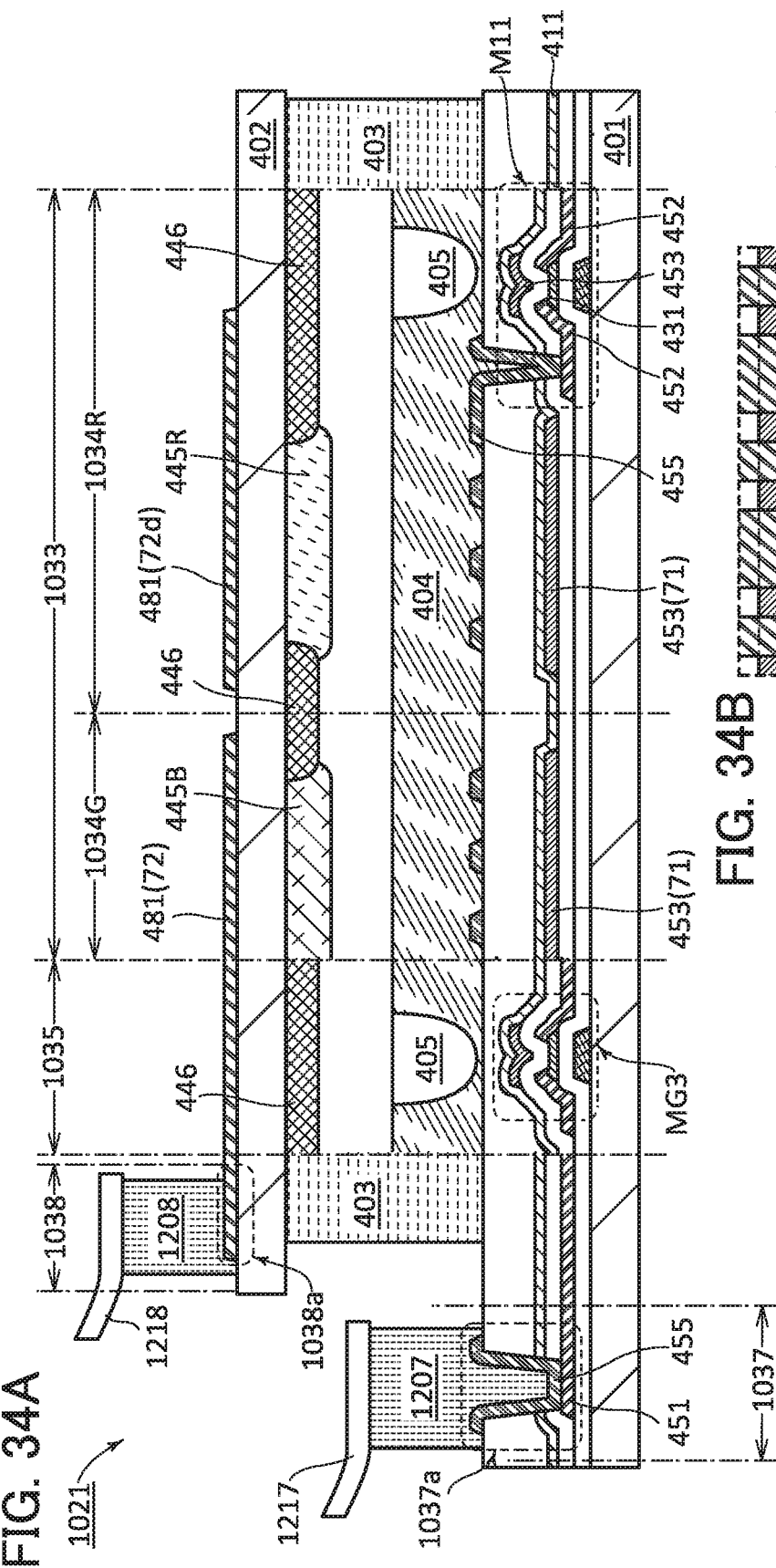
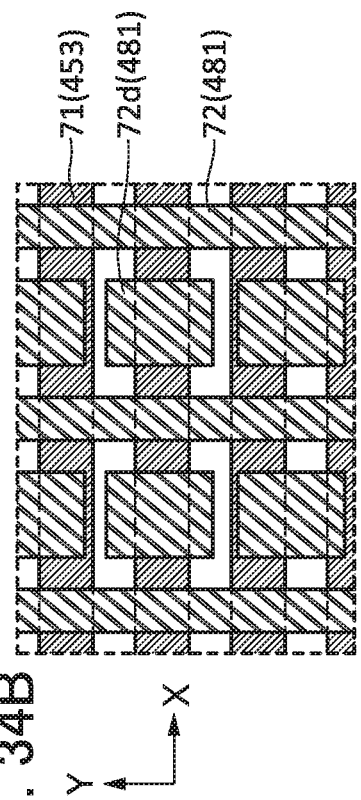
FIG. 34A
FIG. 34B

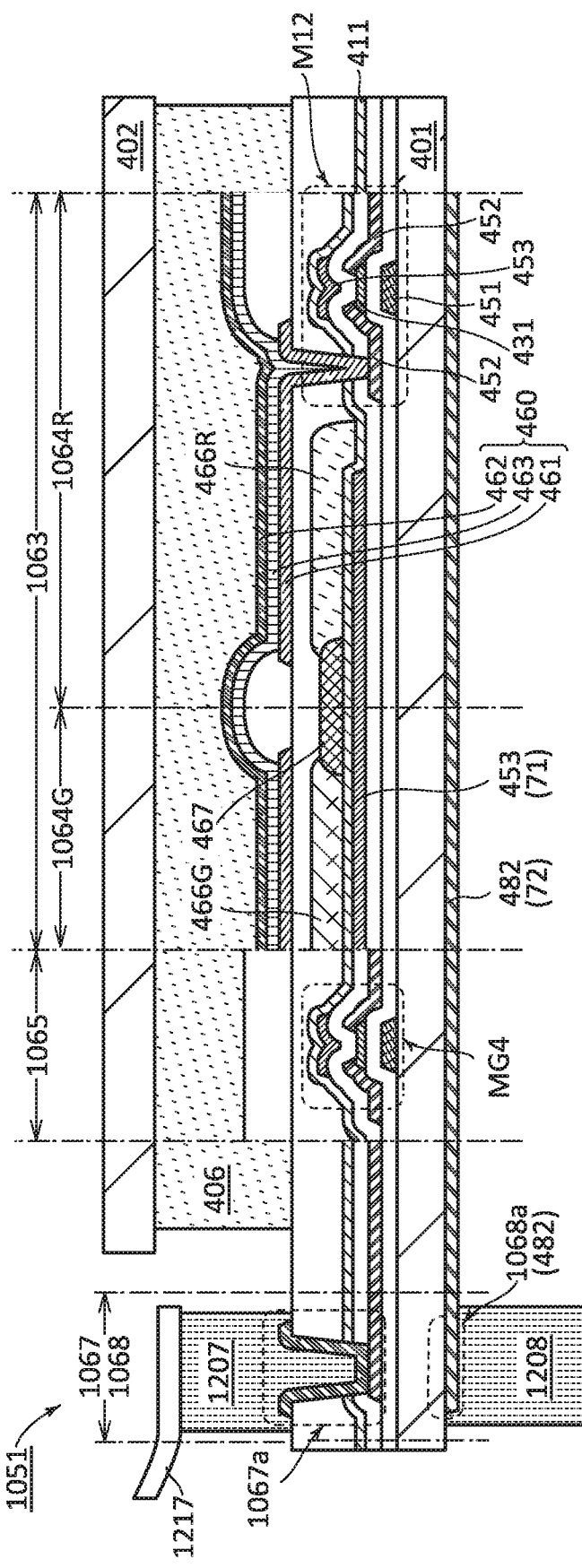
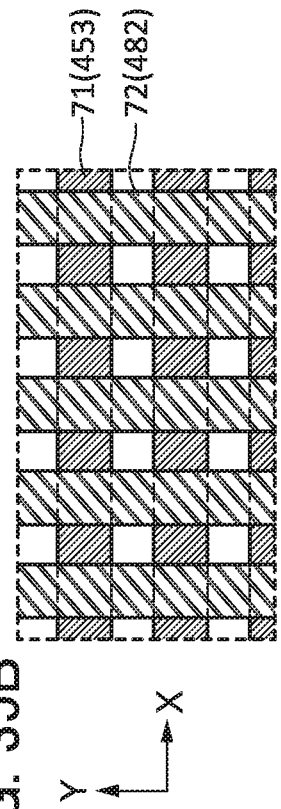
FIG. 35A
FIG. 35B

SIGNAL PROCESSING CIRCUIT, SIGNAL PROCESSING IC, AND SEMICONDUCTOR DEVICE

BACKGROUND OF THE INVENTION

1. Field of the Invention

One embodiment of the present invention relates to a signal processing circuit, a semiconductor device including the signal processing circuit, and methods for operating these, for example.

Note that the technical field of the present invention is not limited to the above. In the specification, drawings, and claims of this application (hereinafter collectively referred to as "this specification and the like"), a semiconductor device refers to a device that functions by utilizing semiconductor characteristics, and means a circuit including a semiconductor element (e.g., a transistor, a diode, or a photodiode), a device including the circuit, or the like. For example, an integrated circuit, a chip including an integrated circuit, and an electronic component including a chip in a package are examples of semiconductor devices. Moreover, an input device, a display device, an electronic component, an electronic device, and the like themselves are semiconductor devices or may include a semiconductor device.

2. Description of the Related Art

To increase the screen size, reduce the weight, and improve the convenience, a touch sensor is mounted on a variety of electronic devices as an input unit instead of a keyboard. Examples of such electronic devices include a smartphone, a tablet information appliance, an e-book reader, and a navigation system. The operability of an information appliance that is operated by touch is largely affected by the detection sensitivity of a touch sensor. A touch sensor is provided near the screen of a display device and thus is affected by noise from the display device. In view of this, a variety of techniques have been suggested to improve the signal-to-noise ratio (SNR) of a touch sensor.

For example, in Patent Documents 1 and 2 and Non-Patent Document 1, a differential input amplifier circuit is used as a sensing circuit, and signals of two adjacent sensing lines are used as differential signals input to the amplifier circuit, thereby removing common mode noise from a sensed signal.

REFERENCE

Patent Document

Patent Document 1: Japanese Published Patent Application No. 2011-113187
Patent Document 2: Japanese Translation of PCT International Application No. 2014-519063
Patent Document 3: PCT International Publication No. WO2004/053819

Non-Patent Document

Non-Patent Document 1: M. Hamaguchi, A. Nagao, and M. Miyamoto, "A 240 Hz-Reporting-Rate 143×81 Mutual-Capacitance Touch-Sensing Analog Front-End IC with 37 dB SNR for 1 mm-Diameter Stylus," *IEEE ISSCC Dig. Tech. Papers*, February 2014, pp. 214-215.

SUMMARY OF THE INVENTION

An object of one embodiment of the present invention is to provide a novel semiconductor device or to provide a method for operating a novel semiconductor device, or the like. Typical objects of one embodiment of the present invention are to improve SNR and to improve detection sensitivity.

Note that the description of a plurality of objects does not preclude their coexistence. One embodiment of the present invention does not necessarily achieve all the objects. Objects other than those listed above are apparent from the description of the specification and the like, and such objects could be an object of one embodiment of the present invention.

One embodiment of the present invention is a signal processing circuit including first to fourth terminals, a switch circuit, and an integrator circuit. The integrator circuit includes an amplifier circuit and a capacitor. The amplifier circuit has an output terminal, an inverting input terminal, a first non-inverting input terminal, and a second non-inverting input terminal. The amplifier circuit has a function of amplifying a difference between a voltage of the inverting input terminal and an average voltage of a voltage of the first non-inverting input terminal and a voltage of the second non-inverting input terminal. One of electrodes of the capacitor is electrically connected to the inverting input terminal, and the other of the electrodes of the capacitor is electrically connected to the output terminal. The switch circuit has a first function and a second function. The first function is capable of establishing electrical continuity between the inverting input terminal and the second terminal, establishing electrical continuity between the first non-inverting input terminal and the first terminal, and establishing electrical continuity between the second non-inverting input terminal and the third terminal. The second function is capable of establishing electrical continuity between the inverting input terminal and the third terminal, establishing electrical continuity between the first non-inverting input terminal and the second terminal, and establishing electrical continuity between the second non-inverting input terminal and the fourth terminal.

One embodiment of the present invention is a signal processing circuit including first to fifth terminals, a switch circuit, and a sensing circuit. The sensing circuit includes an integrator circuit and an analog-to-digital converter circuit. The analog-to-digital converter circuit has a function of converting analog data output from the integrator circuit into digital data. The integrator circuit includes an amplifier circuit and a capacitor. The amplifier circuit has a first output terminal, an inverting input terminal, a first non-inverting input terminal, and a second non-inverting input terminal. The amplifier circuit has a function of amplifying a difference between a voltage of the inverting input terminal and an average voltage of a voltage of the first non-inverting input terminal and a voltage of the second non-inverting input terminal. One of electrodes of the capacitor is electrically connected to the inverting input terminal, and the other of the electrodes of the capacitor is electrically connected to the first output terminal. Each of the first to fourth terminals is a terminal to be electrically connected to a wiring targeted for sensing. A first voltage is input to the fifth terminal. The switch circuit has first to fourth functions. The first function is capable of establishing electrical continuity between the inverting input terminal and the second terminal, establishing electrical continuity between the first non-inverting input terminal and the first terminal, and establishing electrical continuity between the second non-inverting input terminal and the third terminal. The second function is capable of establishing electrical continuity between the inverting input terminal and the third terminal, establishing electrical continuity between the first non-inverting input terminal and the second terminal, and establishing electrical continuity between the second non-inverting input terminal and the fourth terminal. The third function is capable of establishing electrical continuity between the inverting input terminal and the second terminal, and establishing electrical continuity between the fifth terminal and each of the first and second non-inverting input terminals. The fourth function is capable of establishing electrical continuity between the inverting input terminal and the third terminal, and establishing electrical continuity between the fifth terminal and each of the first and second non-inverting input terminals.

In this specification and the like, ordinal numbers such as "first," "second," and "third" are used to show the order in some cases. Alternatively, ordinal numbers are used to avoid confusion among components in some cases, and do not limit the number or order of the components. For example, it is possible to replace the term "first" with the term "second" or "third" in describing one embodiment of the present invention. Other matters regarding the description of this specification and the like will be described in Embodiment 4.

One embodiment of the present invention can provide a novel semiconductor device and a method for operating a novel semiconductor device. Typically, one embodiment of the present invention can improve SNR and detection sensitivity.

The description of the plurality of effects does not preclude the existence of other effects. One embodiment of the present invention does not necessarily achieve all the effects described above. In one embodiment of the present invention, an object other than the above objects, an effect other than the above effects, and a novel feature will be apparent from the description of the specification and the drawings.

BRIEF DESCRIPTION OF THE DRAWINGS

In the accompanying drawings:

FIG. 6 is a truth table for a logic circuit and level shifter in a sensing IC;

FIG. 23A is a schematic exploded perspective view illustrating a structure example of a touch panel device, and FIGS. 23B to 23D are block diagrams each illustrating a structure example of an IC;

FIG. 25D is a block diagram illustrating a structure example of an IC;

FIG. 26A is a perspective view illustrating a structure example of a touch panel unit, and FIGS. 26B to 26D are plan views each illustrating a structure example of an element substrate of a display panel;

FIG. 32A is a cross-sectional view illustrating a structure example of a display panel, and FIG. 32B is a plan view illustrating a structure example of a sensor array;

FIG. 33A is a cross-sectional view illustrating a structure example of a display panel, and FIG. 33B is a plan view illustrating a structure example of a sensor array;

FIG. 34A is a cross-sectional view illustrating a structure example of a display panel, and FIG. 34B is a plan view illustrating a structure example of a sensor array; and FIG. 35A is a cross-sectional view illustrating a structure example of a display panel, and FIG. 35B is a plan view illustrating a structure example of a sensor array.

DETAILED DESCRIPTION OF THE INVENTION

Figure 1:
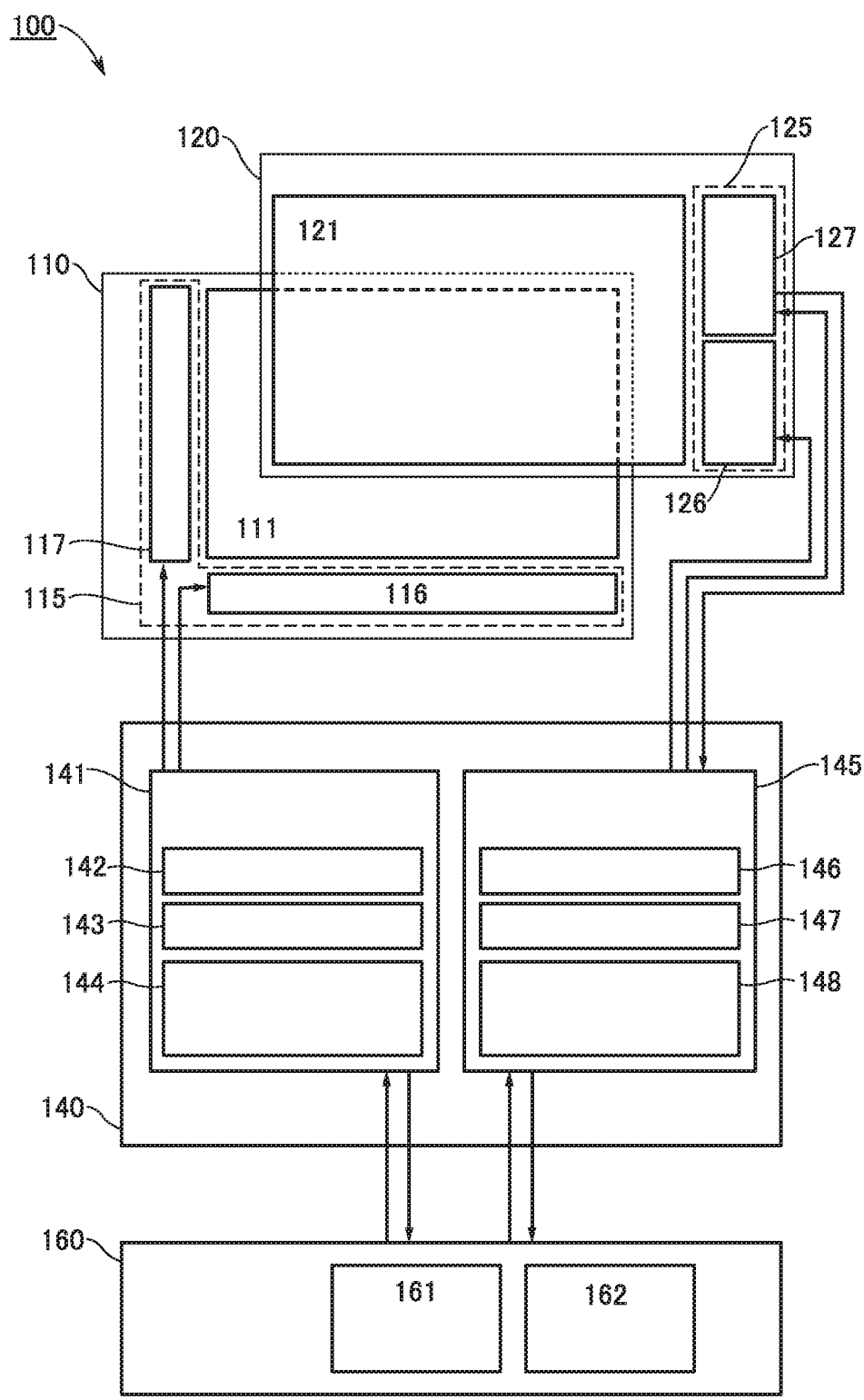
FIG. 1 is a block diagram illustrating a structure example of a touch panel device.

Embodiments of the present invention will be described below. Note that one embodiment of the present invention is not limited to the following description. It will be readily appreciated by those skilled in the art that modes and details of the present invention can be modified in various ways without departing from the spirit and scope of the present invention. One embodiment of the present invention therefore should not be construed as being limited to the following description of the embodiments.

Any of the embodiments described below can be combined as appropriate. In the case where some structure examples (including a manufacturing method example, an operating method example, and the like) are given in one embodiment, any of the structure examples can be combined with each other as appropriate or combined with one or more structure examples described in the other embodiments as appropriate.

In the drawings, the same elements, elements having similar functions, elements formed of the same material, elements formed at the same time, and the like are sometimes denoted by the same reference numerals, and the description thereof is not repeated in some cases.

Embodiment 1

In this embodiment, a semiconductor device including a display unit and an input unit that is operated by touch will be described.

<<Structure Example of Touch Panel>>

FIG. 1 is a block diagram illustrating a structure example of a touch panel device. A touch panel device 100 includes a display unit 110, a touch sensor unit 120, a control unit 140, and a processor 160. In the touch panel device 100, the touch sensor unit 120 functions as an input device. An image that the display unit 110 displays is changed in accordance with a signal sensed by the touch sensor unit 120.

The display unit 110 includes a pixel array 111 and a peripheral circuit 115. The peripheral circuit 115 includes a gate driver circuit 116 and a source driver circuit 117. The touch sensor unit 120 includes a sensor array 121 and a peripheral circuit 125. The peripheral circuit 125 includes a driver circuit 126 and a sensing circuit 127. The control unit 140 is a circuit for controlling the display unit 110 and the touch sensor unit 120 and includes a display controller 141 and a touch sensor (TS) controller 145.

The display controller 141 is a controller for the display unit 110 and includes a memory 142, a timing controller 143 (hereinafter referred to as TCON 143), and an image processing circuit 144. The TCON 143 has a function of generating a variety of signals for setting the timing for the operation of the peripheral circuit 115. For example, the TCON 143 generates signals for controlling the gate driver circuit 116 (e.g., a start pulse signal and a clock signal) and signals for controlling the source driver circuit 117 (e.g., a start pulse signal and a clock signal). The image processing circuit 144 has a function of processing an image signal input from the outside and generating a data signal written to the pixel array 111. The memory 142 retains data necessary for the display controller 141 to execute processing. For example, the memory 142 retains data of an image signal to be processed by the image processing circuit 144.

The TS controller 145 is a controller for the touch sensor unit 120 and includes a memory 146, a timing controller 147 (hereinafter referred to as TCON 147), and a signal processing circuit 148. The TCON 147 has a function of generating a variety of signals for setting the timing for the operation of the peripheral circuit 125. For example, the TCON 147 generates signals for controlling the driver circuit 126 (e.g., a start pulse signal and a clock signal) and signals for controlling the sensing circuit 127 (e.g., a clock signal and a reset signal). The signal processing circuit 148 has a function of processing an output signal of the sensing circuit 127 and generating a signal including touch information (information on whether touch operation is performed), a signal including touch position information, and the like.

The processor 160 executes various programs and controls the entire touch panel device 100. The processor 160 is provided with an execution unit 161 and a memory 162. The execution unit 161 has a function of executing the above programs. For example, the execution unit 161 is an arithmetic logic unit (ALU), and the memory 162 is a cache memory. Alternatively, the execution unit 161 can be any of various kinds of processing device such as a central processing unit (CPU) and a microprocessor unit (MPU), in which case the memory 162 can be a main memory or a cache memory of the processing device. Note that when the touch panel device 100 is incorporated into an electronic device as an electronic component, the processor 160 may be a processor of the electronic device (host device).

<Display Unit>

Figure 2A:
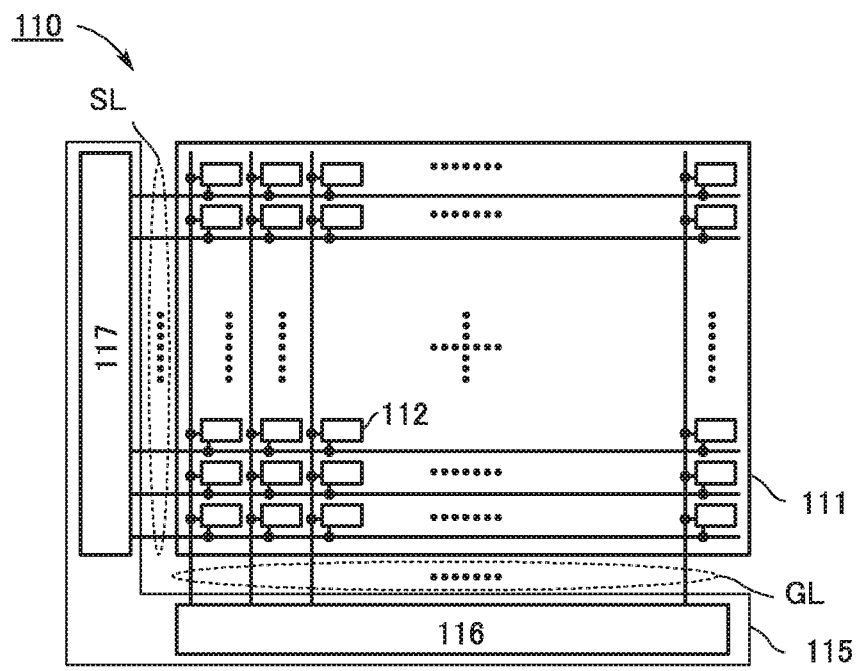
FIG. 2A is a block diagram illustrating a structure example of a display unit.

FIG. 2A illustrates a structure example of the display unit 110. The pixel array 111 includes a plurality of subpixels 112 and a plurality of wirings GL and SL. The plurality of subpixels 112 include display elements and are arranged in an array. The plurality of wirings GL and SL are provided in accordance with the arrangement of the subpixels 112. Each subpixel 112 is electrically connected to the wiring GL in a corresponding row and the wiring SL in a corresponding column. The wiring GL can be referred to as a gate line, a scan line, a selection signal line, or the like. The wiring SL can be referred to as a source line, a data line, a data signal line, or the like.

When the display unit 110 displays color images, one pixel is composed of a predetermined number of subpixels 112. For example, one pixel can be composed of three subpixels 112 for expressing respective colors of red (R), green (G), and blue (B). Alternatively, one pixel can be composed of four subpixels 112 that express different colors. Examples of a combination of four colors are RGBW (W: white), RGBY (Y: yellow), and RGBC (C: cyan).

The gate driver circuit 116 is a circuit for driving the wiring GL and has a function of generating a signal supplied to the wiring GL. The source driver circuit 117 is a circuit for driving the wiring SL. The source driver circuit 117 has a function of processing an image signal transmitted from the display controller 141 and generating a data signal supplied to the wiring SL.

(Circuit Configuration Examples of Subpixel)

Figure 3A:
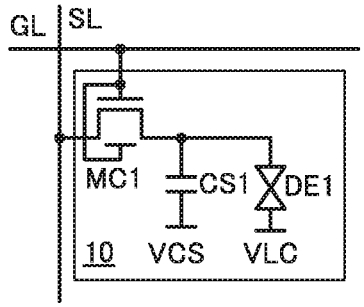
FIGS. 3A to 3F are circuit diagrams each illustrating a configuration example of a subpixel.
Figure 3B:
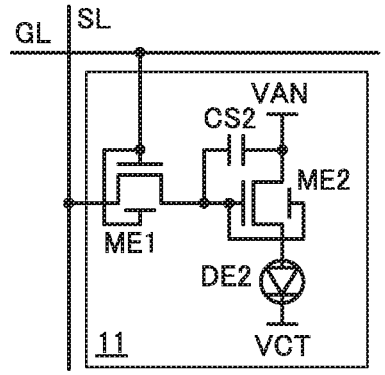
Figure 3C:
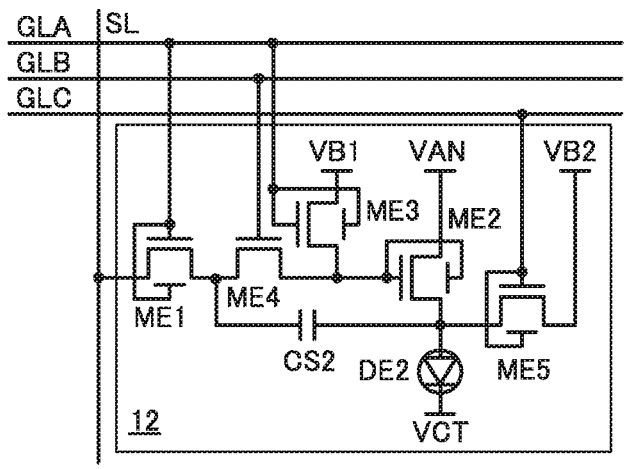
Figure 3D:
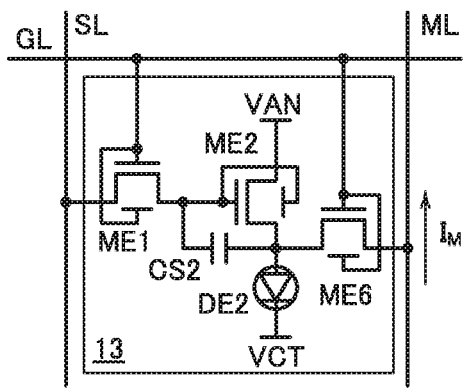
Figure 3E:
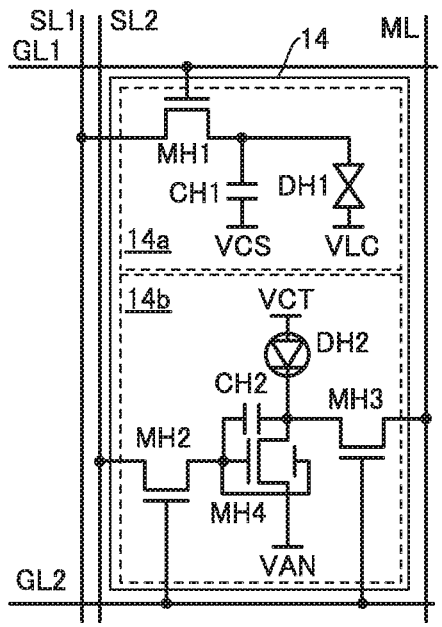
Figure 3F:
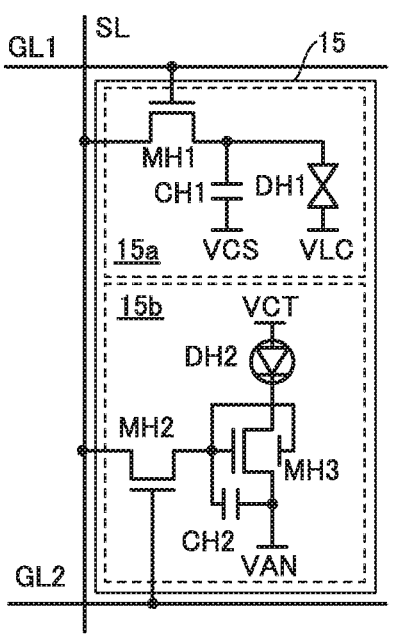

Circuit configuration examples of the subpixel 112 will be described with reference to FIGS. 3A to 3F. FIG. 3A illustrates a configuration example of a subpixel applied to a display unit that performs display using external light. FIGS. 3B to 3D illustrate configuration examples of a subpixel applied to a self-luminous display unit. FIGS. 3E and 3F illustrate configuration examples of a subpixel applied to a hybrid display unit. In a hybrid display unit, a display element that performs display using external light and a self-luminous display element are provided in one subpixel (e.g., see Patent Document 3).

A subpixel 10 illustrated in FIG. 3A includes a transistor MC1, a liquid crystal (LC) element DE1, and a capacitor CS1. The transistor MC1 has a backgate; the current driving capability of the transistor MC1 is increased by electrical connection between its backgate and gate. Note that transistor MC1 may be a transistor without a backgate. The LC element DE1 includes a pixel electrode, a common electrode, and a liquid crystal layer placed between these electrodes. A voltage VLC is input to the common electrode. One electrode of the capacitor CS1 is electrically connected to the pixel electrode, and the other electrode is supplied with a voltage VCS. For example, the voltage VCS can have the same level as the voltage VLC.

As the display element in the subpixel 10, a display element that performs display using external light can be used. Examples of such a display element include an LC element and a display element using any of electrophoresis, particle movement, and particle rotation.

A subpixel 11 illustrated in FIG. 3B includes an electroluminescent (EL) element DE2, transistors ME1 and ME2, and a capacitor CS2. The transistor ME1 is referred to as a selection transistor, and the transistor ME2 is referred to as a driving transistor. The transistor ME1 has a backgate. Although the backgate and a gate of the transistor ME1 are electrically connected to each other in FIG. 3B, the current driving capability of the transistor ME1 can be increased also by electrically connecting the backgate to a drain of the transistor ME1. The transistor ME1 may be a transistor without a backgate. The same applies to the transistor ME2.

The capacitor CS2 is provided to hold a gate voltage of the transistor ME2. One electrode of the capacitor CS2 is supplied with a voltage VAN, and the other electrode is electrically connected to a gate of the transistor ME2. The voltage VAN is higher than a voltage VCT.

The EL element DE2 includes a pair of electrodes (an anode and a cathode) and an EL layer placed between the pair of electrodes. In the example of FIG. 3B, a pixel electrode of the EL element DE2 is the anode and a common electrode thereof is the cathode. The pixel electrode of the EL element DE2 is electrically connected to a drain of the transistor ME2, and the common electrode is supplied with the voltage VCT. The EL layer includes at least a layer containing a light-emitting material (light-emitting layer). Another functional layer such as a layer containing an electron-transport material (electron-transport layer) or a layer containing a hole-transport material (hole-transport layer) can be provided in the EL layer. The EL element is referred to as an organic EL element when containing an organic light-emitting material, and is referred to as an inorganic EL element when containing an inorganic light-emitting material.

FIG. 3C illustrates a configuration example of a subpixel including five transistors. A subpixel 12 includes the EL element DE2, transistors ME1 to ME5, and the capacitor CS2. The subpixel 12 is electrically connected to wirings GLA, GLB, and GLC and the wiring SL. The wirings GLA, GLB, and GLC are driven by the gate driver circuit 116. In FIG. 3C, VB1 and VB2 each denote a voltage. The transistor ME3 functions as a reset circuit that resets the gate voltage of the transistor ME2 to a constant voltage (VB1). The transistor ME4 functions as a switch that controls electrical continuity between the drain of the transistor ME1 and the gate of the transistor ME2. The transistor ME5 functions as a reset circuit that resets the voltage of the pixel electrode of the EL element DE2 to a constant voltage (VB2). In the subpixel 12, a voltage that is not influenced by the threshold voltage of the transistor ME2 can be input to the pixel electrode of the EL element DE2. The display element in the subpixel 12 is not limited to an EL element and may be a light-emitting diode, a light-emitting transistor, or the like.

FIG. 3D illustrates a configuration example of a subpixel including three transistors. A subpixel 13 is electrically connected to the wiring GL, the wiring SL, and a wiring ML.

Like the wiring SL, the wiring ML is provided in each column. The subpixel 13 includes the EL element DE2, transistors ME1, ME2, and ME6, and the capacitor CS2. The transistor ME6 is a pass transistor that controls electrical continuity between the pixel electrode of the EL element DE2 and the wiring ML. Providing the transistor ME6 enables a drain current of the transistor ME6 (current IM) to be output from the subpixel 13 to the wiring ML. The current IM corresponds to a current flowing through the EL element DE2. Thus, the current IM (analog signal) flowing through the wiring ML is analyzed and a voltage of a data signal input to the wiring SL is corrected on the basis of the analysis result, whereby deviation of the luminance of the EL element DE2 can be corrected. When the pixel array 111 consists of the subpixels 13, a circuit that converts the current IM into a digital signal is provided in the source driver circuit 117, and the image processing circuit 144 analyzes the digital signal generated by the source driver circuit 117 and corrects the voltage of a data signal, for example.

A subpixel 14 illustrated in FIG. 3E includes subpixels 14a and 14b. The subpixel 14a has a circuit configuration similar to that of the subpixel 10 and includes an LC element DH1, a transistor MH1, and a capacitor CH1. The subpixel 14b has a circuit configuration similar to that of the subpixel 13 and includes an EL element DH2, transistors MH2 to MH4, and a capacitor CH2. The subpixel 14a is electrically connected to wirings GL1 and SL1. The subpixel 14b is electrically connected to wirings GL2, SL2, and ML. The wirings GL1 and GL2 are gate lines and are driven by the gate driver circuit 116. The wirings SL1 and SL2 are source lines and are driven by the source driver circuit 117.

A subpixel 15 illustrated in FIG. 3F includes subpixels 15a and 15b. The subpixel 15a has a circuit configuration similar to that of the subpixel 14a and includes the LC element DH1, the transistor MH1, and the capacitor CH1. The subpixel 15b has a circuit configuration similar to that of the subpixel 12 and includes the EL element DH2, the transistors MH2 and MH3, and the capacitor CH2. The subpixel 15a and the subpixel 15b are electrically connected to the same source line (wiring SL). Note that as in the subpixel 14 of FIG. 3E, the subpixel 15a and the subpixel 15b may be electrically connected to the wiring SL1 and the wiring SL2, respectively. Needless to say, in the subpixel 14, the subpixel 14a and the subpixel 14b may be electrically connected to the same source line (wiring SL).

In the subpixel 14, the LC element DH1 is stacked over the EL element DH2. A pixel electrode of the LC element DH1 is a reflective electrode and has an opening for extracting light from the EL element DH2. Such a structure enables the reduction in area of the subpixel 14. The same applies to the subpixel 15.

<<Touch Sensor Unit>>

Figure 2B:
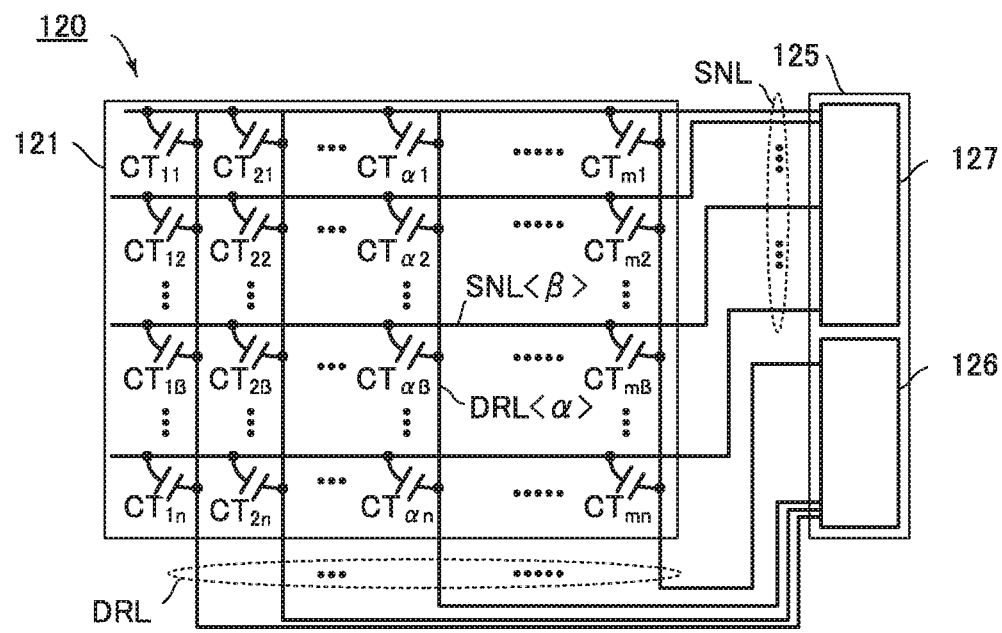
FIG. 2B is a block diagram illustrating a structure example of a touch sensor unit.

FIG. 2B illustrates a structure example of the touch sensor unit 120. Here, the touch sensor unit 120 is a mutual capacitive touch sensor unit as an example. The sensor array 121 includes m wirings DRL and n wirings SNL, where m is an integer larger than 0 and n is an integer larger than 2. The wiring DRL is a driving line, and the wiring SNL is a sensing line. Here, the α-th wiring DRL is referred to as wiring DRL<α>, and the β-th wiring SNL is referred to as wiring SNL<β>. A capacitor $CT_{\alpha\beta}$ refers to a capacitor formed between the wiring DRL<α> and the wiring SNL<β>.

The m wirings DRL are electrically connected to the driver circuit 126. The driver circuit 126 has a function of driving each wiring DRL. The n wirings SNL are electrically connected to the sensing circuit 127. The sensing circuit 127 has a function of sensing signals of (n−2) wirings SNL. A signal of the wiring SNL<β> at the time when the wiring DRL<α> is driven by the driver circuit 126 has information on the change amount of capacitance of the capacitor $CT_{\alpha\beta}$. By analysis of signals of (n−2) wirings SNL, information on whether touch operation is performed or not, touch position, and the like can be obtained.

Figure 4:
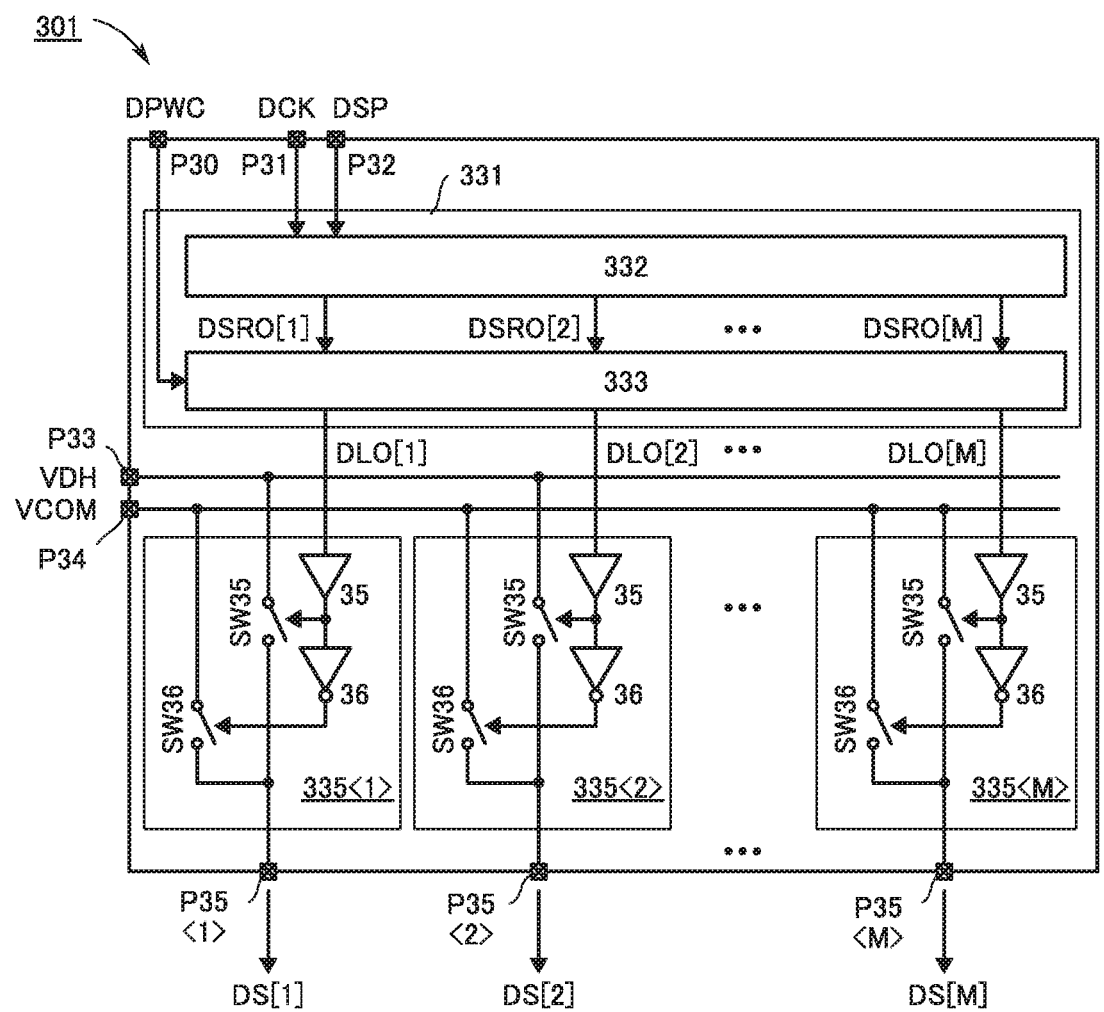
FIG. 4 is a block diagram illustrating a structure example of a driver IC for driving lines (DRL)
Figure 5:
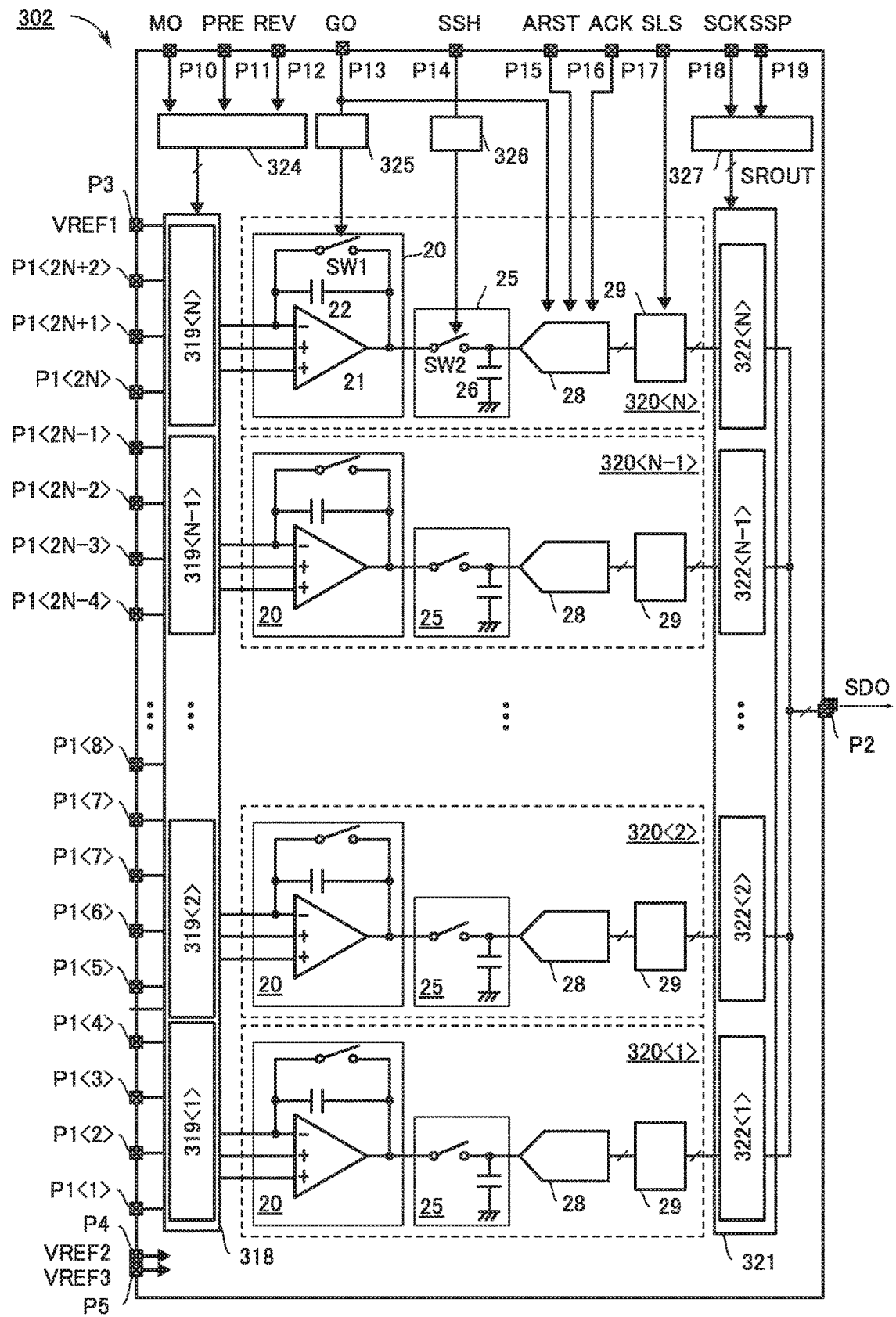
FIG. 5 is a block diagram illustrating a structure example of a sensing IC.

The peripheral circuit 125 can be composed of a dedicated IC. Examples in which the driver circuit 126 or the sensing circuit 127 is composed of a dedicated IC will be shown below. FIG. 4 illustrates a structure example of a driver IC for driving the driving lines. FIG. 5 illustrates a structure example of a sensing IC.

<Driving Line Driver IC>

A driving line driver IC 301 (hereinafter referred to as DRL driver IC 301) illustrated in FIG. 4 includes a control circuit 331, M circuits 335, pins P30 to P34, and M pins P35. Here, M is an integer larger than 0. Note that some functional circuits in the TS controller 145 may be provided in the DRL driver IC 301.

The circuit 335 generates a signal DS and includes a buffer 35, an inverter 36, and switches SW35 and SW36. The signal DS is a drive signal for driving the wiring DRL. A signal DS[1] represents a drive signal that is controlled by the circuit 335<1>. The pins P35<1> to P35<M> are pins for outputting the signals DS[1] to DSM, and each of the pins P35<1> to P35<M> is electrically connected to one corresponding wiring DRL of the sensor array 121.

The pins P33 and P34 are pins for voltage input. VDH and VCOM are power supply voltages of the circuit 335. VDH and VCOM are a high-level voltage and a low-level voltage, respectively, of the signals DS[1] to DSM. Accordingly, VDH is the drive voltage of the wiring DRL.

The control circuit 331 has a function of generating signals DLO[1] to DLO[M]. The signals DLO[1] to DLO[M] are control signals for the respective circuits 335<1> to 335<M>. The control circuit 331 includes a shift register (SR) 332 and a logic circuit 333. The pins P30 to P32 are pins for inputting control signals for the control circuit 331. A signal DPWC is a signal for controlling the pulse width of a drive signal and is input to the logic circuit 333. A signal DCK is a clock signal of the SR 332. A signal DSP is a start pulse signal of the SR 332.

The SR 332 generates signals DSRO[1] to DSRO[M] in accordance with the signals DCK and DSP. The signals DSRO[1] to DSRO[M] have a function of selecting the wiring DRL to which the signal DS is input. The logic circuit 333 performs AND operation of the signal DPWC and each of the signals DSRO[1] to DSRO[M] and generates the signals DLO[1] to DLO[M]. For example, in a period during which the signal DPWC is "H" (high), the voltage of the signal DS[1] becomes VDH when the signal DSRO[1] is "H," and the voltage of the signal DS[1] becomes VCOM when the signal DSRO[1] is "L" (low). In a period during which the signal DPWC is "L," the voltage of the signal DS[1] is fixed at VCOM regardless of the logical level of the signal DS[1].

<Sensing IC>

A sensing IC 302 illustrated in FIG. 5 includes an input circuit 318, N circuits 320 (N is an integer larger than 0), an output circuit 321, a logic circuit and level shifter (LOGIC & LS) 324, level shifters (LS) 325 and 326, and a shift register (SR) 327. The input circuit 318 includes N switch circuits 319. The output circuit 321 includes N output buffer circuits 322. Note that some functional circuits in the TS controller 145 may be provided in the sensing IC 302.

The sensing IC 302 has pins P3 to P5 and P10 to P19, pins P1<1> to P1<2N+2>, and a plurality of pins P2. The pins P1<1> to P1<2N+2> are pins for inputting signals to be processed by the circuits 320 and are electrically connected to the respective wirings SNL of the sensor array 121. The pin P2 is a pin for outputting a signal SDO. The number of pins P2 corresponds to the bit width of the signal SDO. The pins P3 to P5 are pins for inputting reference voltages. VREF1 is a reference voltage of an amplifier circuit 21. VREF2 and VREF3 are reference voltages of an analog-to-digital converter (ADC) 28.

The pins P10 to P19 are pins for inputting a variety of control signals. Note that the sensing IC 302 is provided with pins for inputting a power supply voltage, pins for inputting various signals, and pins for outputting various signals in addition to the above pins.

A signal SSH is a control signal for a sample and hold circuit 25. A signal GO is a control signal for an integrator circuit 20 and also serves as an enable signal (also referred to as set signal) of the ADC 28. A signal ARST is a reset signal of the ADC 28. A signal ACK is a clock signal of the ADC 28.

The circuit 320 has a function of processing analog signals, such as a function of sensing an analog signal and a function of converting a sensed analog signal into a digital data signal. The circuit 320 includes the integrator circuit 20, the sample and hold circuit 25, the ADC 28, and a latch circuit (LAT) 29. The integrator circuit 20 includes the amplifier circuit 21, a capacitor 22, and a switch SW1. The sample and hold circuit 25 includes a switch SW2 and a capacitor 26.

A signal of the wiring SNL targeted for sensing is input to an inverting input terminal (−) of the amplifier circuit 21 through the switch circuit 319. The integrator circuit 20 converts the amount of capacitance change of the wiring SNL targeted for sensing into a voltage. The sample and hold circuit 25 samples an analog signal output from the integrator circuit 20. The ADC 28 converts analog data (specifically an analog voltage value) held in the sample and hold circuit 25 into digital data. A signal SLS is a signal for controlling data rewrite operation of the LAT 29. In accordance with the signal SLS, the LAT 29 stores digital data generated by the ADC 28. The digital data stored in the LAT 29 is output to the output buffer circuit 322. The digital data generated by the ADC 28 represents the amount of change in capacitance between the wiring DRL and the wiring SNL.

<Output Circuit 321>

A digital data signal is output to the output circuit 321 from each LAT 29. The output circuit 321 has a function of converting N digital data signals that are input in parallel into serial data signals and outputting the serial data signals.

A signal SROUT output from the SR 327 is a control signal for the output circuit 321. The SR 327 generates the signal SROUT in accordance with signals SCK and SSP. The signal SCK and the signal SSP are a clock signal and a start pulse signal, respectively. In the output circuit 321, one of the N output buffer circuits 322 is selected by the signal SROUT. The selected output buffer circuit 322 outputs a digital data signal of the corresponding LAT 29 to the pin P2.

<Logic Circuit and Level Shifter 324>

The logic circuit and level shifter 324 (hereinafter referred to as logic circuit 324) processes signals MO, PRE, and REV and generates a control signal for controlling the input circuit 318. FIG. 6 shows a truth table for the logic circuit 324.

The signal MO is a signal for controlling the sensing mode of the sensing IC 302; the operation mode is a differential sensing mode when the signal MO is "L," and is a single-ended sensing mode when the signal MO is "H." In the differential sensing mode, the integrator circuit 20 in the circuit 320 is set to have the configuration of a differential input integrator circuit. Meanwhile, in the single-ended sensing mode, the integrator circuit 20 is set to have the configuration of a single-ended integrator circuit.

The signal PRE is a signal for controlling precharge operation of the pins P1<1> to P1<2N+2>. When the signal PRE is "H," the pins P1<1> to P1<2N+2> are electrically connected to the pin P3.

The signal REV is a signal for controlling switching of the wirings SNL that are targeted to be sensed by the circuits 320. The sensing targets are wirings SNL for even-numbered channels when the signal REV is "H," and are wirings SNL for odd-numbered channels when the signal REV is "L."

The logic circuit 324 generates signals PRE_LS and PREB_LS by shifting the level of the signal PRE and generates signals MO_LS and MOB_LS by shifting the level of the signal MO. Moreover, the logic circuit 324 generates signals INM_O, INMB_O, INM_E, INMB_E, INP_O, INPB_O, INP_E, and INPB_E by performing logical operation and level shift of the signals REV, MO, and PRE. Note that the signal PREB_LS is an inverted signal of the signal PRE_LS. The same applies to the other signals generated by the logic circuit 324.

<Input Circuit 318>

Figure 7:
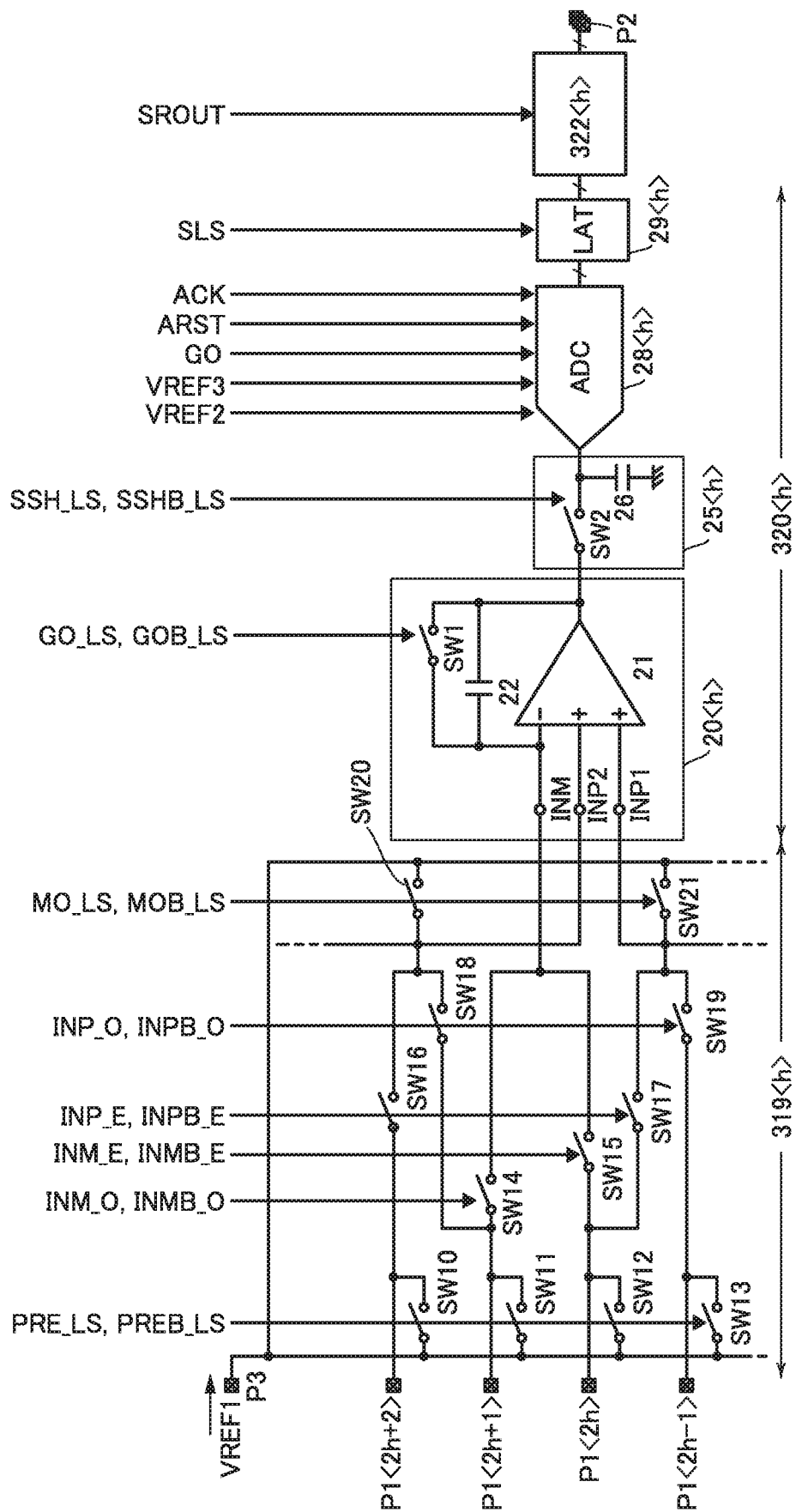
FIG. 7 is a circuit diagram illustrating a configuration example of a switch circuit in a sensing IC.

Each switch circuit 319 is controlled with an output signal of the logic circuit 324. FIG. 7 illustrates a configuration example of the switch circuit 319. Each switch circuit 319 includes switches SW10 to SW21. Here, each of the switches SW10 to SW21 is a CMOS circuit as an example.

The on/off state of each of the switches SW10 to SW13 is controlled with the signals PRE_LS and PREB_LS. The on/off state of the switch SW14 is controlled with the signals INM_O and INMB_O. The on/off state of the switch SW15 is controlled with the signals INM_E and INMB_E. The on/off state of each of the switches SW16 and SW17 is controlled with the signals INP_E and INPB_E. The on/off state of each of the switches SW18 and SW19 is controlled with the signals INP_O and INPB_O. The on/off state of each of the switches SW20 and SW21 is controlled with the signals MO_LS and MOB_LS.

The switch SW10 is turned on when the signal PRE_LS is "H" (the signal PREB_LS is "L"), and is turned off when the signal PRE_LS is "L" (the signal PREB_LS is "H"). This applies also to the operation of the other switches.

The switches SW1 and SW2 in the circuit 320 are also CMOS circuits. Signals GO_LS and GOB_LS are output signals of the level shifter 325 and control the on/off state of the switch SW1. Signals SSH_LS and SSHB_LS are output signals of the level shifter 326 and control the on/off state of the switch SW2.

Electrical continuity between three input terminals of the integrator circuit 20<h> and the pins P1<2h−1> to P1<2h+2> and P3 is determined by the switch circuit 319<h>. The amplifier circuit 21 in the integrator circuit 20 has one inverting input terminal (−) and two non-inverting input terminals (+). Here, the inverting input terminal (−) is referred to as "terminal INM," one of the two non-inverting input terminals (+) as "terminal INP1," and the other as "terminal INP2." The amplifier circuit 21 in the integrator circuit 20<h> is sometimes referred to as "amplifier circuit 21<h>"; the other circuit components may be called in a similar manner.

<Circuit 320>

The circuit 320<h> senses a signal input to the pin P1<2h> (the pin P1 for an even-numbered channel) and a signal input to the pin P1<2h+1> (the pin P1 for an odd-numbered channel). In the differential sensing mode, to sense the input signal of the pin P1<2h>, the terminal INM of the integrator circuit 20<h> is electrically connected to the pin P1<2h>, and the terminals INP1 and INP2 are electrically connected to the pins P1<2h−1> and P1<2h+1>, respectively. To sense the input signal of the pin P1<2h+1>, the terminals INM, INP1, and INP2 are electrically connected to the pins P1<2h+1>, P1<2h>, and P1<2h+2>, respectively.

In Non-Patent Document 1, for example, a voltage of one sensing line adjacent to a sensing line targeted for sensing is used as a reference voltage of an amplifier circuit in order to remove common mode noise. In contrast, when a sensing line for an even-numbered channel (or for an odd-numbered channel) is a sensing target in this embodiment, voltages of two adjacent sensing lines for odd-numbered channels (or for even-numbered channels) are used as reference voltages of the integrator circuit 20. Thus, the SNR of an output signal of the integrator circuit 20 can be improved more effectively, which will be described below.

(Amplifier Circuit 21)

Figure 8A:
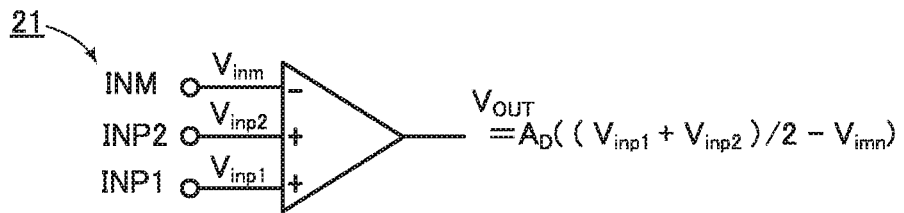
FIG. 8A is a circuit diagram illustrating an example of a function of an amplifier circuit in a sensing IC.

First, the circuit configuration of the amplifier circuit 21 will be described. FIG. 8A is a circuit diagram for explaining a function of the amplifier circuit 21. The amplifier circuit 21 has a function of amplifying a difference between an average voltage of the voltages of the two non-inverting input terminals (+) and the voltage of the inverting input terminal (−). When voltages input to the terminals INP1, INP2, and INM are $V_{inp1}$, $V_{inp2}$, and $V_{inm}$, the amplifier circuit 21 has a function of amplifying a difference voltage $((V_{inp1}+V_{inp2})/2-V_{inm})$ of these input terminals. Given that the amplification factor (differential gain) of the amplifier circuit 21 is $A_D$ and the common mode gain thereof is 0 dB, the relation between an output voltage $V_{OUT}$ of the amplifier circuit 21 and $V_{inp1}$, $V_{inp2}$, and $V_{inm}$ is represented by the following formula: $V_{OUT}=A_D((V_{inp1}+V_{inp2})/2-V_{inm})$.

Figure 8B:
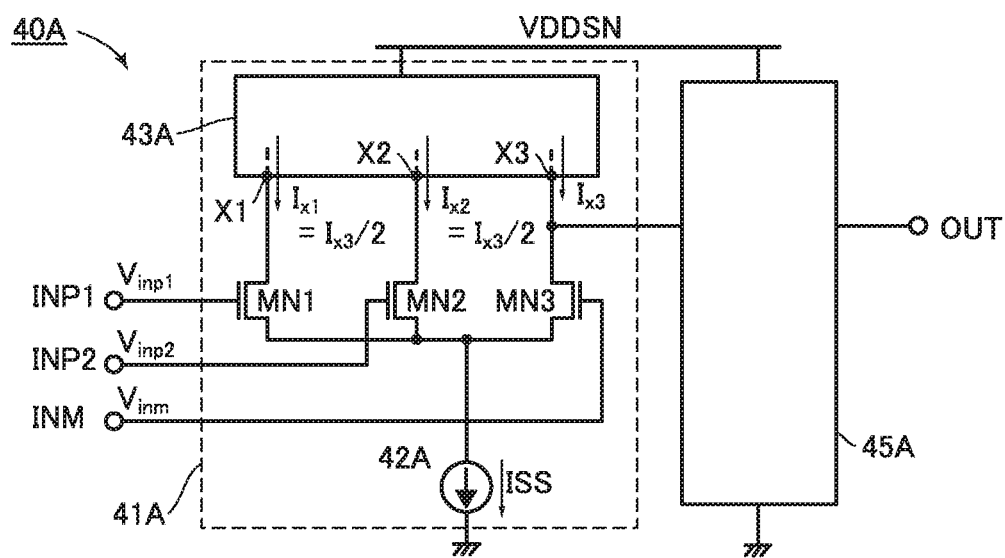
FIGS. 8B and 8C are circuit diagrams each illustrating a configuration example of an amplifier circuit.
Figure 8C:
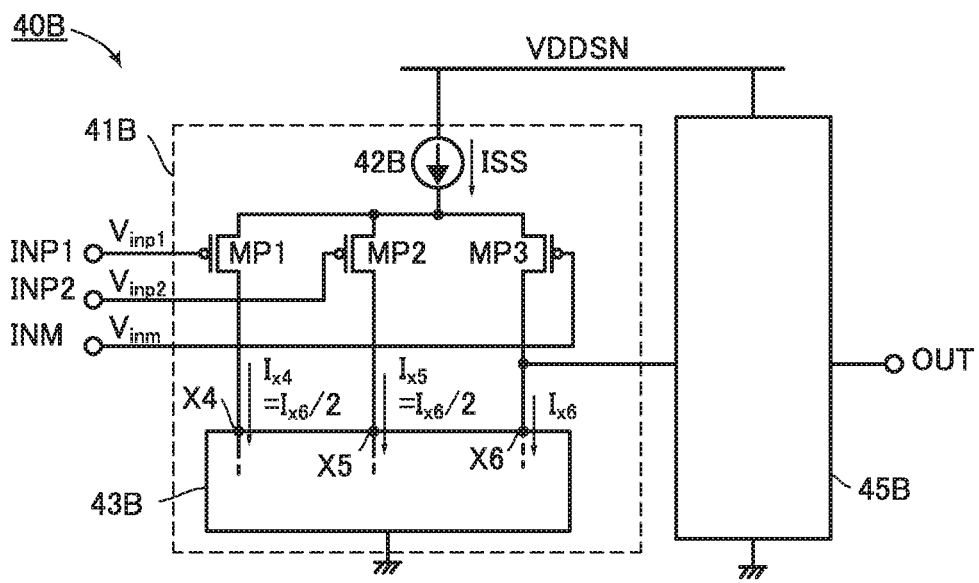

FIGS. 8B and 8C illustrate configuration examples of an amplifier circuit used as the amplifier circuit 21. In an amplifier circuit 40A illustrated in FIG. 8B, a differential amplifier circuit 41A is provided in an input stage, and an output buffer circuit 45A is provided in an output stage. VDDSN is a power supply voltage for the amplifier circuit 40A. The output buffer circuit 45A is provided as necessary. The output buffer circuit 45A can be an output buffer circuit used in a known operational amplifier. The output buffer circuit can be composed of a common-source amplifier circuit or a source follower circuit, for example.

The differential amplifier circuit 41A includes a current source 42A, transistors MN1 to MN3, and a load circuit 43A. The current source 42A consists of an n-channel transistor, for example. The transistors MN1 to MN3 are input transistors of the differential amplifier circuit 41A. A gate of the transistor MN3 is electrically connected to the terminal INM. Gates of the transistors MN1 and MN2 are electrically connected to the terminals INP1 and INP2, respectively.

The differential amplifier circuit 41A has symmetry similar to that of a basic differential input pair. The transistors MN1 to MN3 are designed such that the transconductances of the transistors MN1 and MN2 are equal to each other and are half the transconductance of the transistor MN3. For design specifications, the channel lengths of the transistors MN1 to MN3 are the same and the channel width of each of the transistors MN1 and MN2 is half that of the transistor MN3. Note that in the differential amplifier circuit 41A that is actually manufactured, the transconductance, channel length, and channel width of these transistors cannot strictly satisfy the above relations because of influences of process variation or the like; thus, they may vary within a range that does not interfere with the operation of the differential amplifier circuit 41A. This applies also to the following description.

Note that the transistor MN1 may be a plurality of transistors that are electrically connected in series and/or in parallel. The same applies to the transistors MN2 and MN3 and transistors in other diagrams.

The load circuit 43A has a function of applying load to nodes X1, X2, and X3 so that $I_{X1}$, $I_{X2}$, and $I_{X3}/2$ are equal to each other, where $I_{X1}$, $I_{X2}$, and $I_{X3}$ are currents that flow through the nodes X1, X2, and X3. The load circuit 43A can consist of an appropriate combination of a linear resistor, a current mirror circuit composed of p-channel transistors, a diode-connected p-channel transistor, and a current source circuit formed of a p-channel transistor, for example.

FIG. 8C illustrates a configuration example in which input transistors are p-channel transistors. An amplifier circuit 40B includes a differential amplifier circuit 41B and an output buffer circuit 45B. The differential amplifier circuit 41B includes transistors MP1 to MP3, a current source 42B, and a load circuit 43B. The differential amplifier circuit 41B has a function of amplifying a voltage ($V_{inp1}/2+V_{inp2}/2-V_{inm}$).

The channel lengths of the transistors MP1 to MP3 are the same, and the channel width of each of the transistors MP1 and MP2 is half that of the transistor MP3. The load circuit 43B has a function of supplying nodes X4 to X6 with load that satisfies $I_{X4}=I_{X5}=I_{X6}/2$, where $I_{X4}$ to $I_{X6}$ are currents that flow through the nodes X4 to X6. The load circuit 43B can consist of an appropriate combination of a linear resistor, a current mirror circuit composed of n-channel transistors, a diode-connected n-channel transistor, and a current source circuit formed of an n-channel transistor, for example.

Figure 9A:
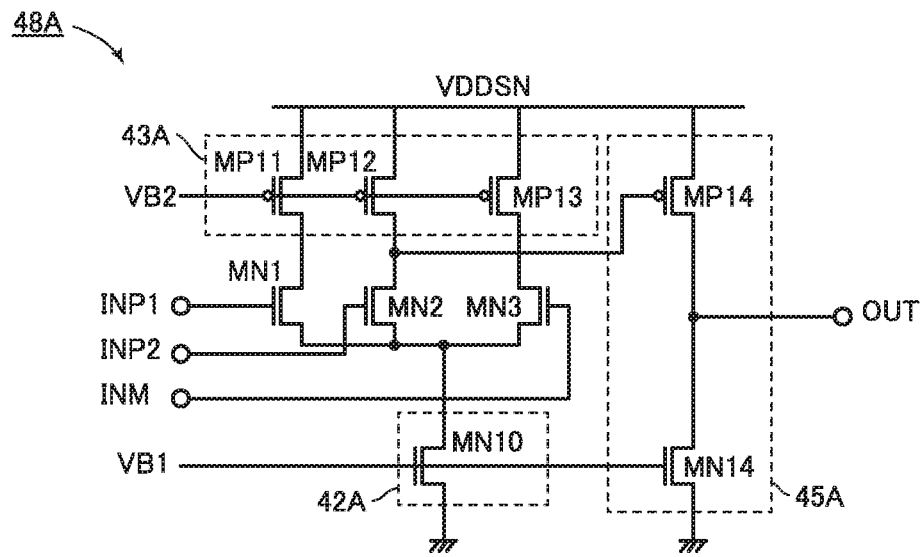
FIGS. 9A and 9B are circuit diagrams each illustrating a configuration example of an amplifier circuit.
Figure 9B:
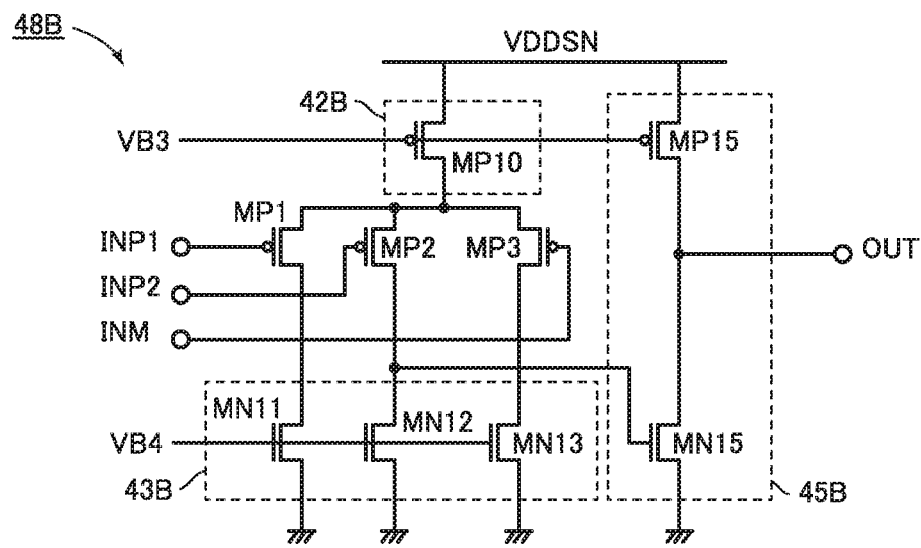

FIGS. 9A and 9B illustrate more specific circuit configuration examples of the respective amplifier circuits 40A and 40B. An amplifier circuit 48A illustrated in FIG. 9A includes the transistors MN1 to MN3 and transistors MN10, MN14, and MP11 to MP14. VB1 and VB2 are each a bias voltage. The channel lengths of the transistors MP11 to MP13 are the same, and the channel width of each of the transistors MP11 and MP12 is half that of the transistor MP13.

An amplifier circuit 48B illustrated in FIG. 9B includes the transistors MP1 to MP3 and transistors MP10, MP15, MN11 to MN13, and MN15. VB3 and VB4 are each a bias voltage. The channel lengths of the transistors MN11 to MN13 are the same, and the channel width of each of the transistors MN11 and MN12 is half that of the transistor MN13.

<Noise Removal>

Figure 10:
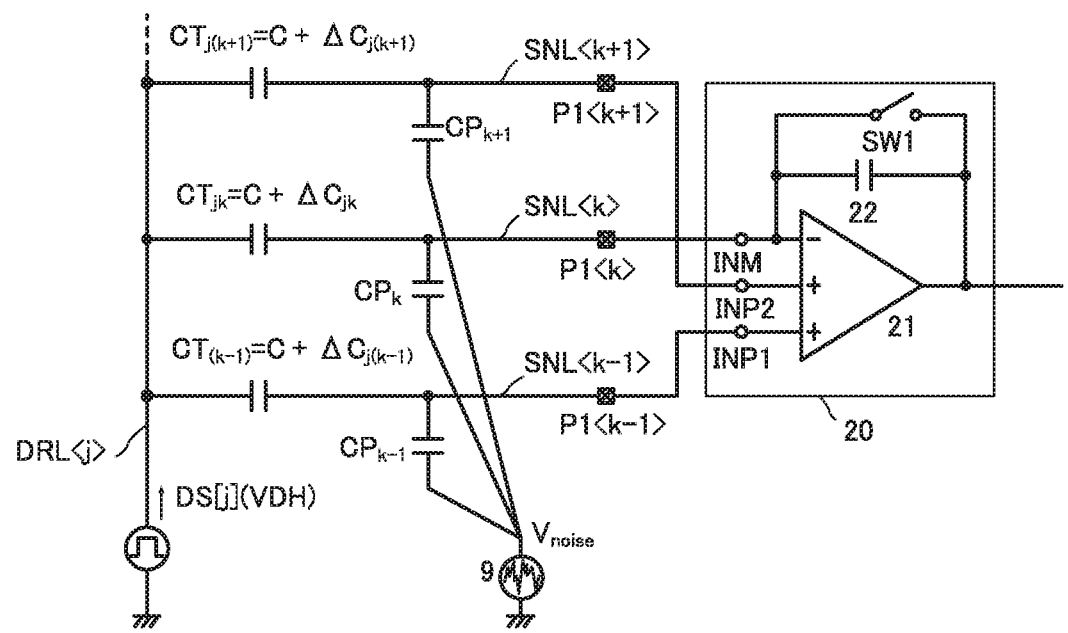
FIG. 10 is a circuit diagram illustrating an example of a function of an integrator circuit in a sensing IC.

The capability of the sensing IC 302 to perform sensing with high SNR will be described with reference to FIG. 10. FIG. 10 illustrates the operation of the integrator circuit 20 at the time of detecting the change in capacitance of the capacitor ($CT_{jk}$) between the wiring DRL<j> and the wiring SNL<k>.

Here, the wirings SNL<k>, SNL<k−1>, SNL<k+1> are electrically connected to the pins P1<k>, P1<k−1>, and P1<k+1>, respectively. The pins P1<k>, P1<k−1>, and P1<k+1> are electrically connected to the terminals INM, INP1, and INP2, respectively, of the amplifier circuit 21. VDH denotes a voltage of the wiring DRL<j>; C, the capacitance of the capacitor $CT_{jk}$ at the time when no touch operation is performed; $\Delta CT_{jk}$, the change amount of capacitance of the capacitor $CT_{jk}$ by touch operation; $CP_k$, a parasitic capacitance between a noise source 9 and the wiring SNL<k>; and $V_{noise}$, a voltage of the noise source 9.

In the conventional sensing method using a differential signal, which is disclosed in Non-Patent Document 1 and the like, in order to sense the capacitance change $\Delta C_{jk}$ of the wiring SNL<k>, a voltage of one adjacent wiring SNL<k−1> is used as a reference voltage of a differential integrator circuit. If the state is ideal, i.e., a voltage ($V_{noise}$) applied to the wiring SNL<k> from the noise source 9 is equal to that applied to the wiring SNL<k−1>, a signal sensed by the integrator circuit does not include a noise component ($V_{noise}$) even with the conventional method. The correlation between $V_{noise}$ applied to adjacent wirings SNL from the noise source 9 is high; however, in reality, $V_{noise}$ varies among the wirings SNL.

In view of the above, to obtain the capacitance change $\Delta C_{jk}$ of the wiring SNL<k>, the sensing IC 302 uses an average voltage of the voltages of the adjacent wirings SNL<k−1> and SNL<k+1> as a reference voltage of the integrator circuit 20. Accordingly, a voltage component due to the noise source 9 is averaged for the reference voltage of each integrator circuit 20. Thus, even if $V_{noise}$ varies among the wirings SNL, the integrator circuit 20 of this embodiment can remove common mode noise more effectively than the conventional differential integrator circuit, thereby outputting signals with high SNR.

An improved SNR of the sensing IC 302 enables touch detection with high accuracy. That is, this embodiment can provide a highly sensitive touch panel device.

Although the example where the circuit 320 is used as a sensing circuit that senses a touch sensor signal is shown here, the applicable range of the circuit 320 is not limited to this. The circuit 320 can be used in a variety of semiconductor devices as a circuit for sensing an analog signal. Moreover, the functional circuits in the circuit 320 can be selected in accordance with a semiconductor device including the circuit 320. For example, a correction circuit or the like can be added to the circuit 320. As another example, one or both of the sample and hold circuit 25 and the LAT 29 can be omitted from the circuit 320.

Figure 11:
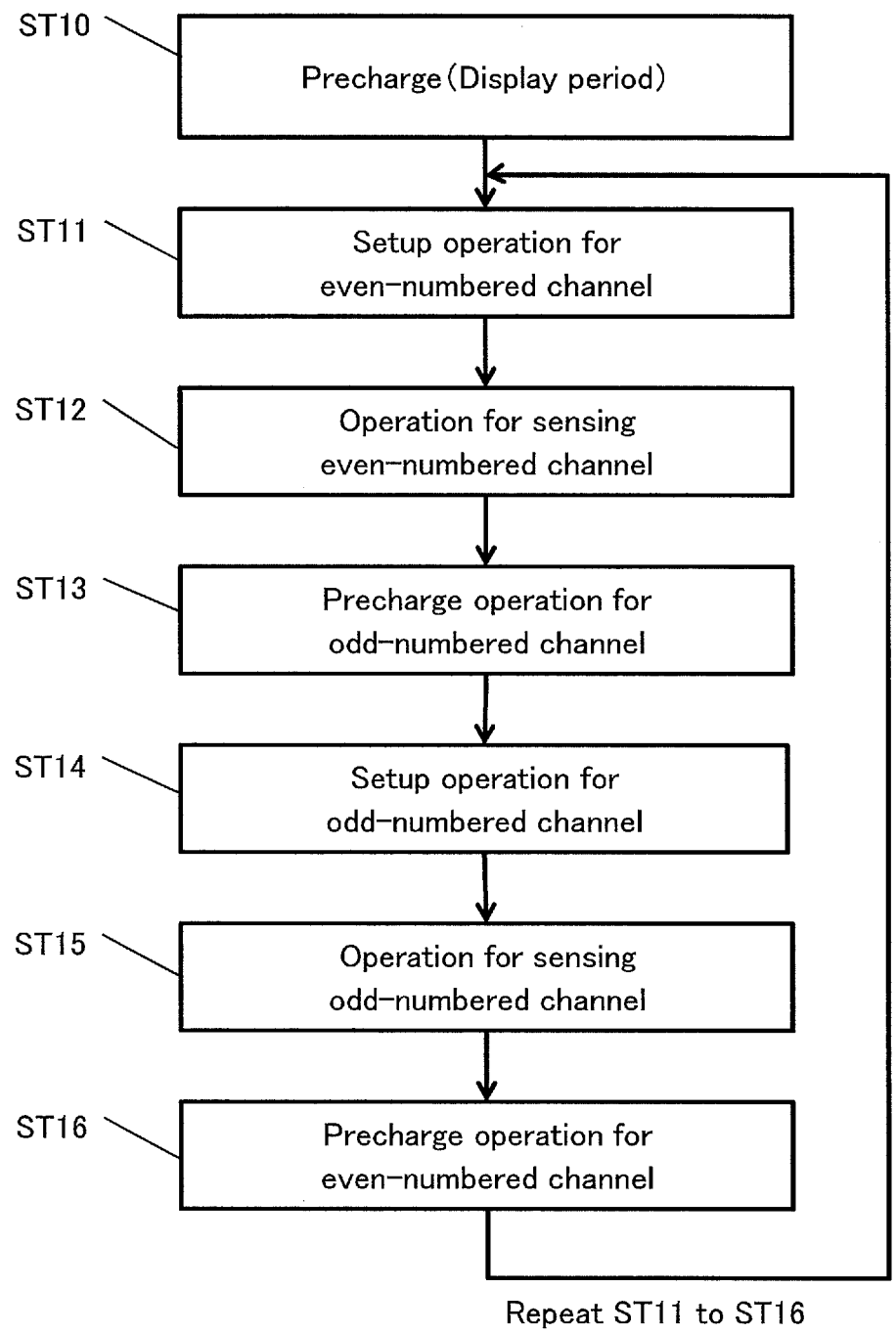
FIG. 11 is a flow chart illustrating an operation example of a sensing IC in a differential sensing mode.
Figure 17:
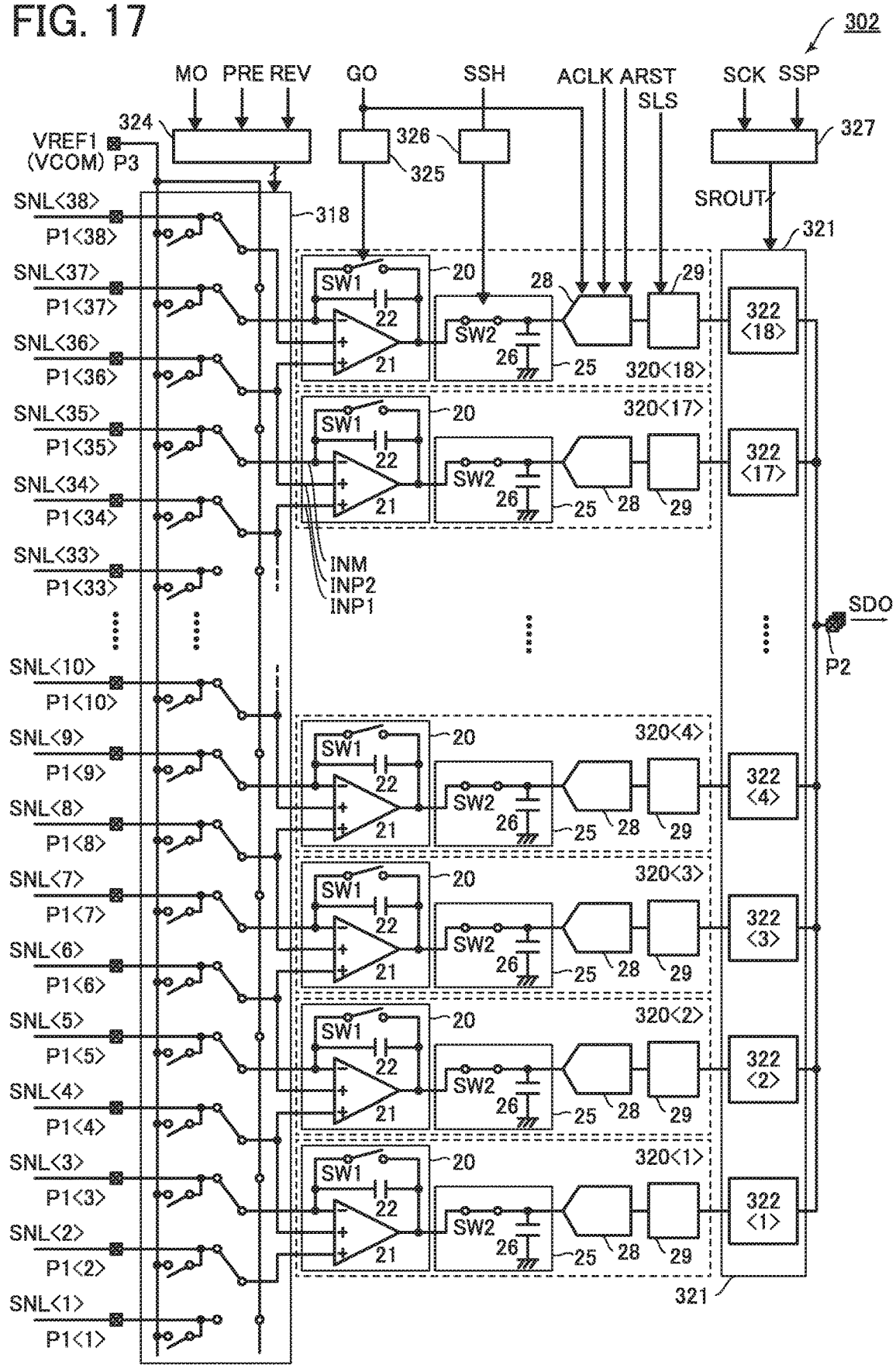
FIG. 17 is a circuit diagram illustrating an operation example of a sensing IC.
Figure 18:
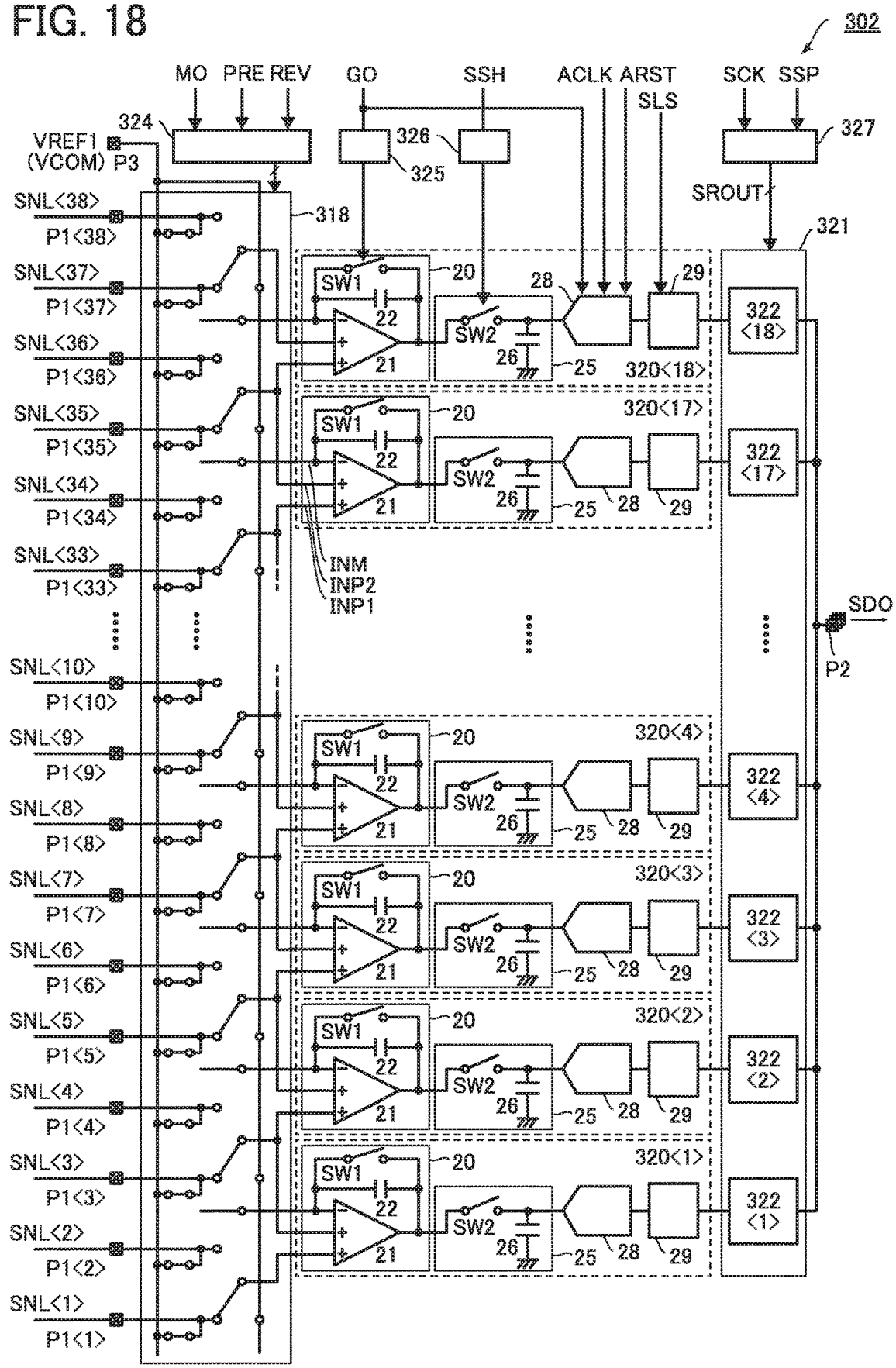
FIG. 18 is a circuit diagram illustrating an operation example of a sensing IC.
Figure 19:
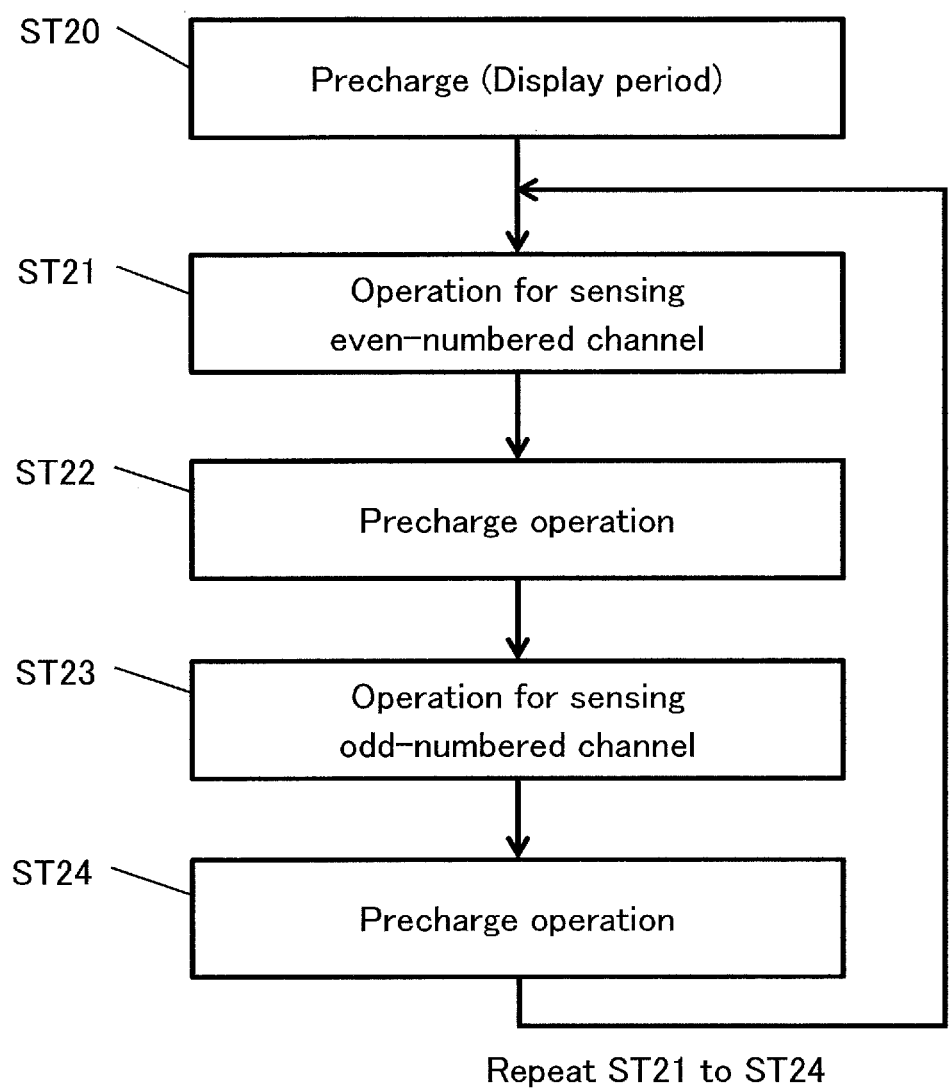
FIG. 19 is a flow chart illustrating an operation example of a sensing IC in a single-ended sensing mode.
Figure 20:
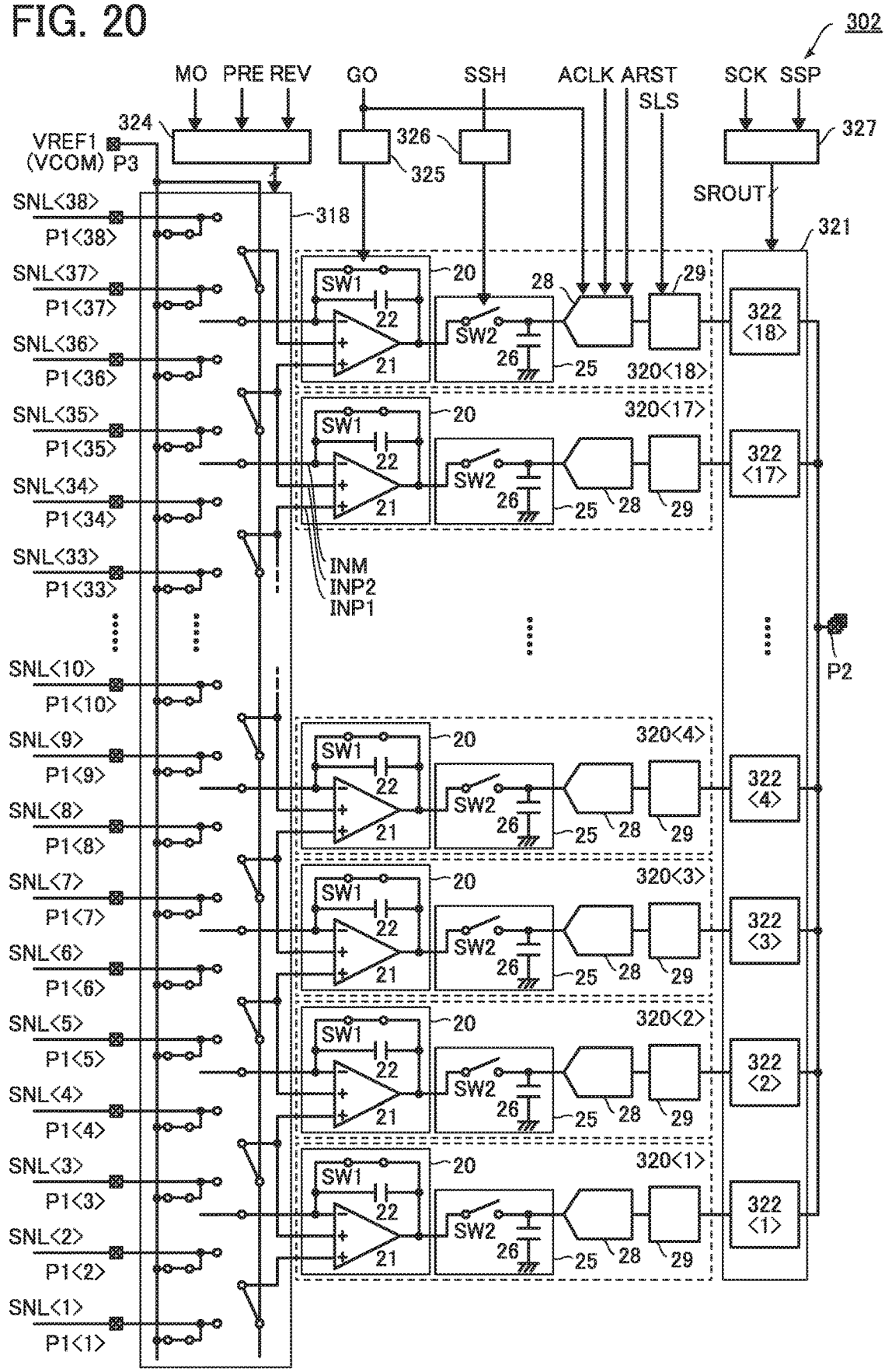
FIG. 20 is a circuit diagram illustrating an operation example of a sensing IC.
Figure 21:
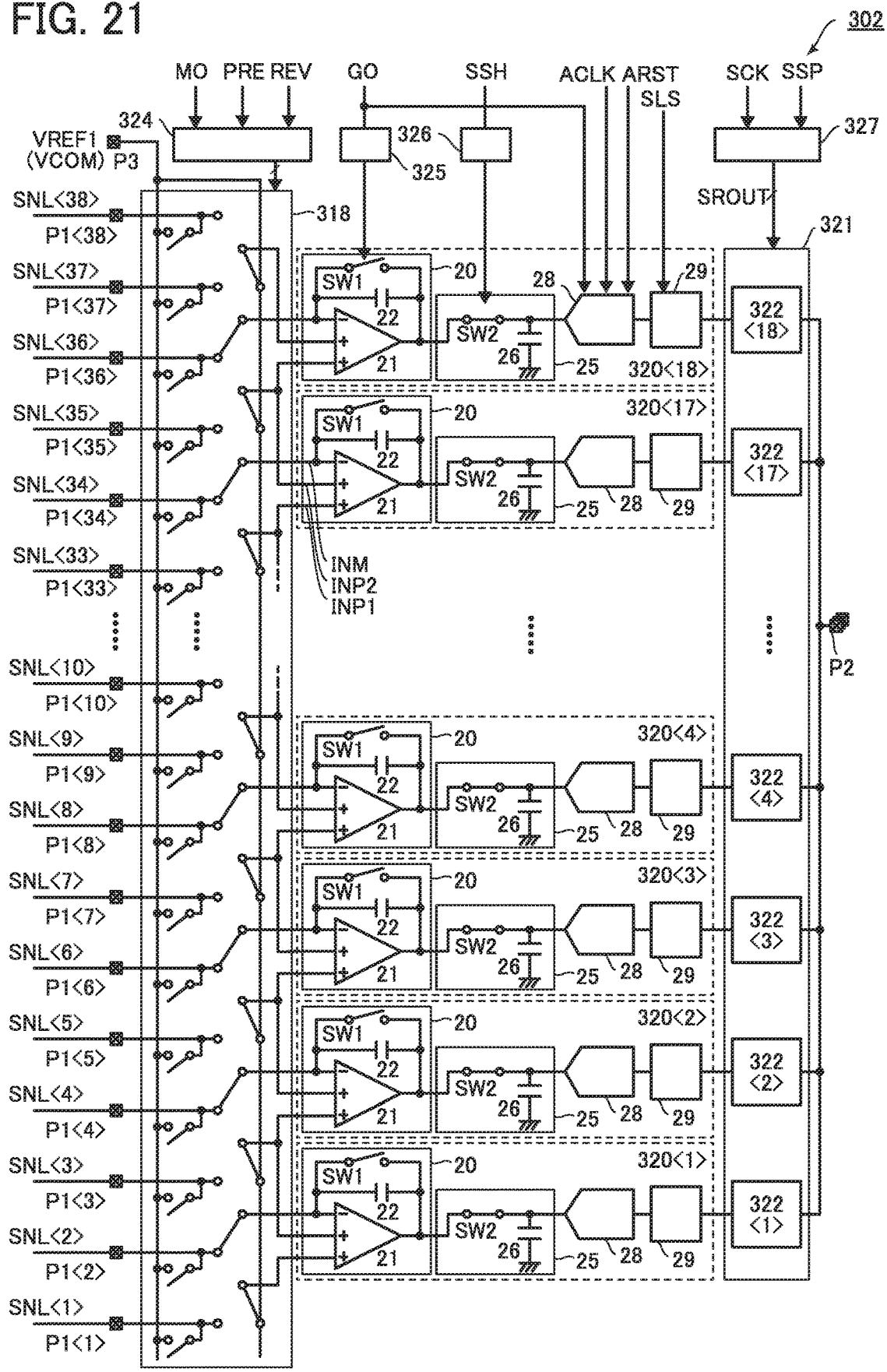
FIG. 21 is a circuit diagram illustrating an operation example of a sensing IC.
Figure 22:
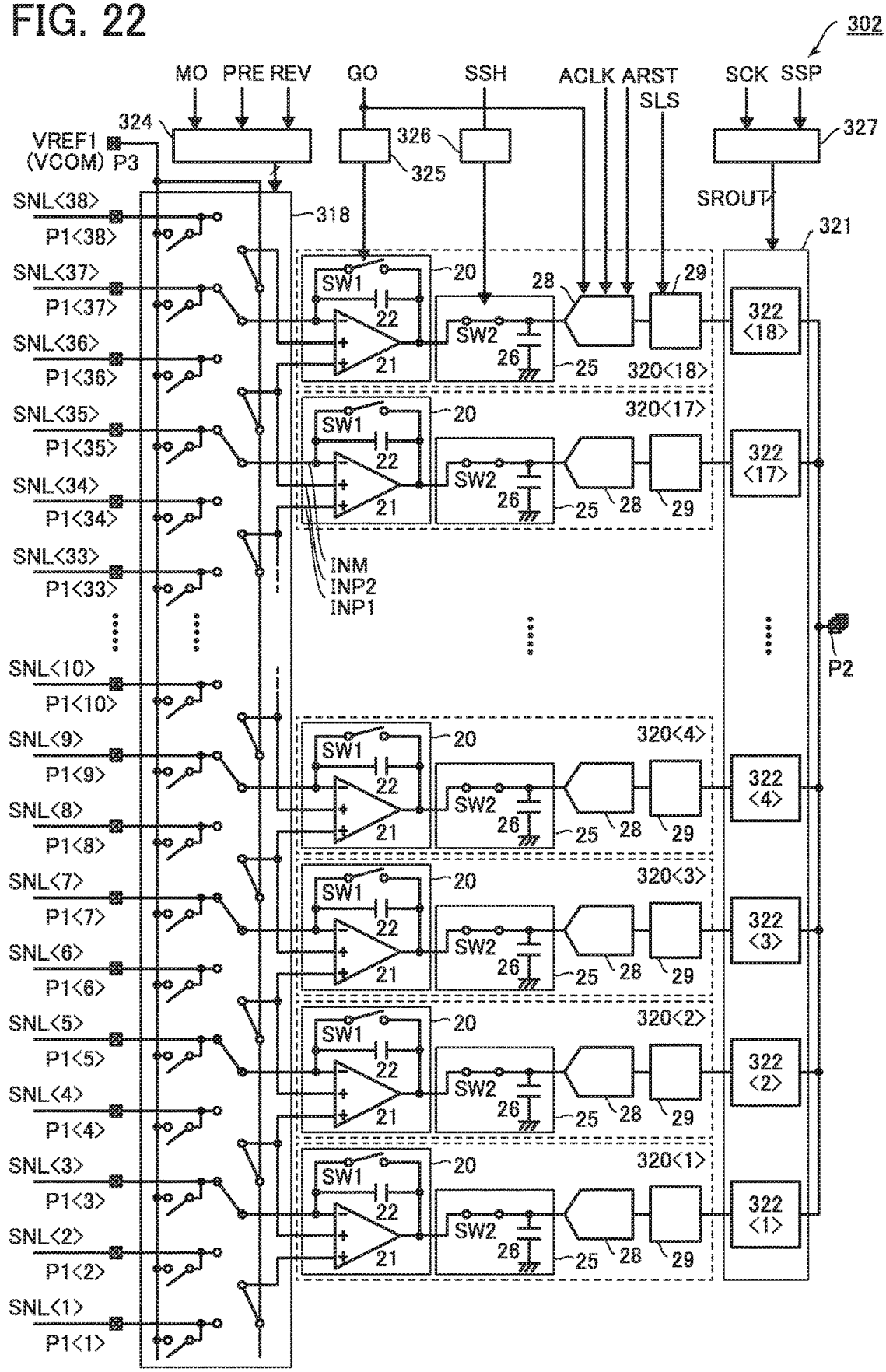
FIG. 22 is a circuit diagram illustrating an operation example of a sensing IC.

An example of a method for operating the touch sensor unit 120 will be described with reference to FIGS. 11 to 22. FIG. 11 is a flow chart illustrating an operation example of the sensing IC 302 in the differential sensing mode. FIGS. 12 to 18 are circuit diagrams illustrating the operation in the differential sensing mode. FIG. 19 is a flow chart illustrating an operation example of the sensing IC 302 in the single-ended sensing mode. FIGS. 20 to 22 are circuit diagrams illustrating the operation in the single-ended sensing mode.

Here, the numbers of wirings DRL and wirings SNL in the sensor array 121 are 50 and 38, respectively, to simplify the explanation. Accordingly, the number of pins P35 (the number of output channels) in the DRL driver IC 301 is 50, and wirings DRL<1> to DRL<50> are electrically connected to the respective pins P35<1> to P35<50>. The number of pins P1 (the number of input channels) in the sensing IC 302 is 38, and wirings SNL<1> to SNL<N> are electrically connected to the respective pins P1<1> to P1<38>. As a reference voltage (VREF1) input from the pin P3, a voltage equal to a common voltage (VCOM) of the DRL driver IC 301 is input. In the circuit diagrams of FIG. 12 and the like, the input circuit 318 is simplified and some of the input pins are omitted.

<<Differential Sensing Mode>>

In the differential sensing mode, to sense a signal of the wiring SNL<j> (j is an integer of 2 to 37), the sensing IC 302 obtains the difference between the voltage of the wiring SNL<j> and the average voltage of the voltages of a pair of adjacent wirings SNL<j−1> and SNL<j+1>. As a result, the sensing IC 302 can perform signal sensing that is less likely to be affected by common mode noise.

The operation of the sensing IC 302 in the differential sensing mode is roughly classified into seven steps ST10 to ST16 shown in FIG. 11. Step ST10 is the operation at the time when display operation is performed in the display unit 110. Steps ST11 to ST16 are the operation for sensing a touch by the touch sensor unit 120. Repeating Steps ST11 to ST16 the same number of times as the number of driving lines allows obtainment of distribution of capacitances in the sensor array 121. Here, Steps ST11 to ST16 are performed in 50 cycles. To set the sensing IC 302 in the differential sensing mode, a low-level (L-level) signal MO is input to the sensing IC 302.

(Step ST10: Precharge (Display Period))

In the display period, the gate driver circuit 116 and the source driver circuit 117 operate to rewrite display data of each subpixel 112 in the pixel array 111. The precharge operation in Step ST10 is performed to set the sensor array 121 in a state that does not affect display on the display unit 110.

In Step ST10, the voltages of the wirings DRL<1> to DRL<50> are set to VCOM by the DRL driver IC 301.

Figure 12:
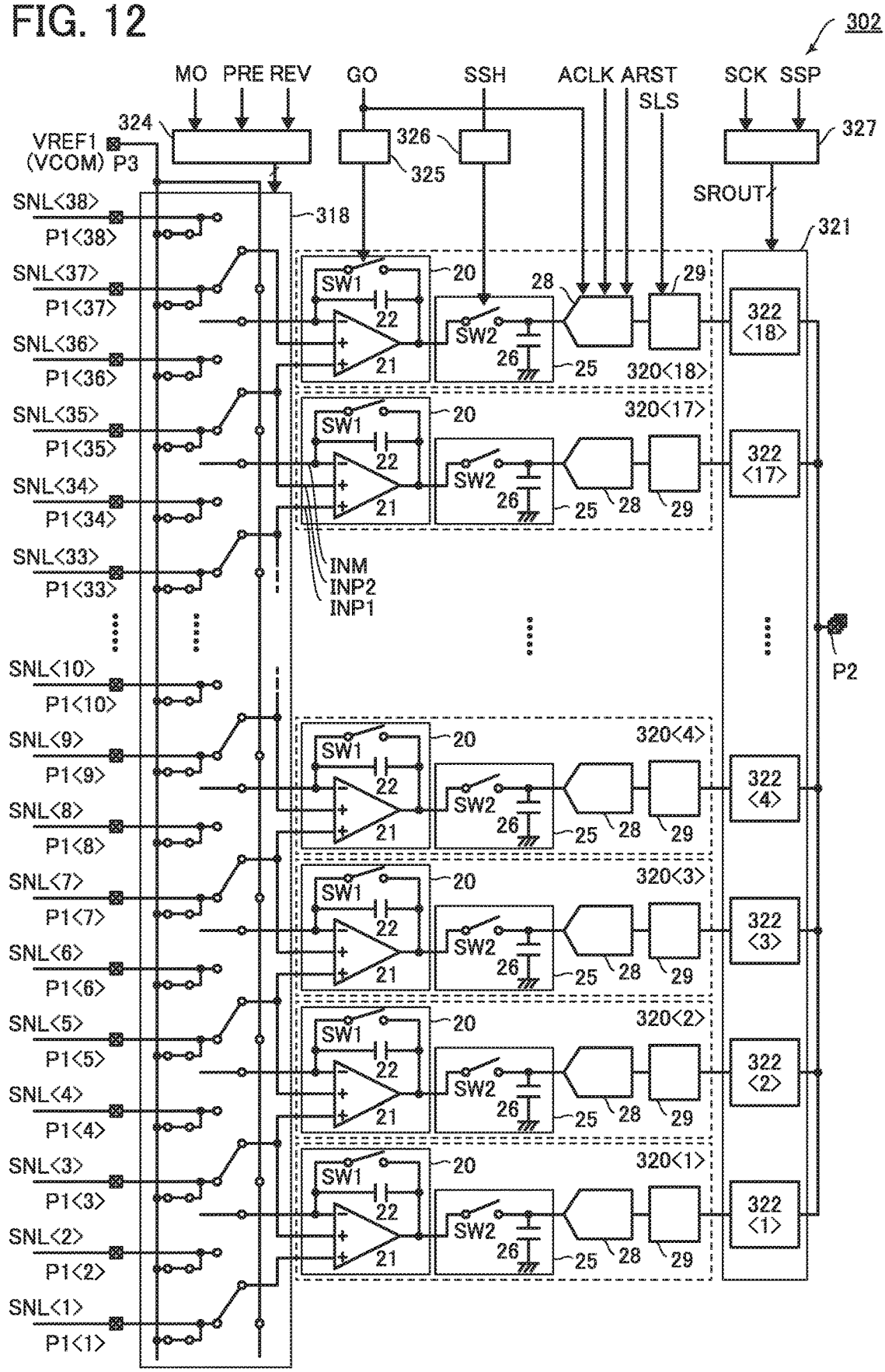
FIG. 12 is a circuit diagram illustrating an operation example of a sensing IC.

The logical levels of the signals MO, PRE, and REV are "L," "H," and "L," respectively. As illustrated in FIG. 12, the input circuit 318 electrically connects the pins P1<1> to P1<38> to the pin P3 and precharges the wirings SNL<1> to SNL<38> at the voltage VCOM. Moreover, the input circuit 318 electrically connects the terminals INP1 and INP2 of the circuit 320<j> to the pins P1<2j−1> and P1<2j+1>, respectively, and makes the terminal INM floating. Note that j is an integer of 1 to 18 here.

(Step ST11: Setup Operation for Even-Numbered Channel)

The operation in Step ST11 is setup operation for sensing an even-numbered channel and is performed to reduce the effect of offset voltage of the amplifier circuit 21. By the setup operation, an output terminal of the amplifier circuit 21 is set in a steady state.

Figure 13:
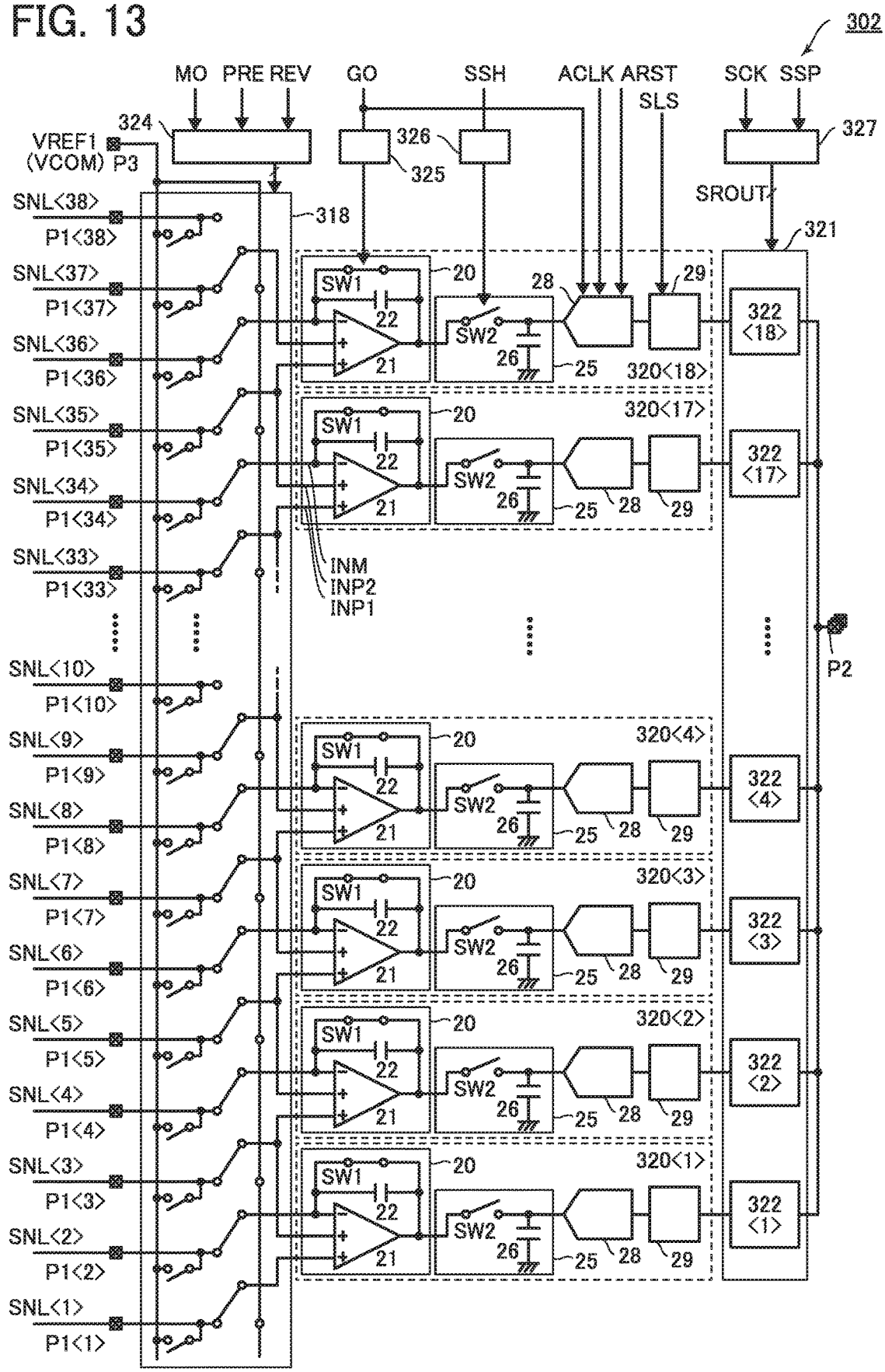
FIG. 13 is a circuit diagram illustrating an operation example of a sensing IC.

The logical levels of the signals MO, PRE, and REV are all "L." The logical level of the signal GO changes from "L" to "H." As illustrated in FIG. 13, electrical connection between the pins P1<1> to P1<38> and the pin P3 is broken. The terminal INM of the circuit 320<j> is electrically connected to the wiring SNL<2j>, and electrically connected to the output terminal of the amplifier circuit 21<j> through the switch SW1. Thus, the output terminal of the amplifier circuit 21 becomes a steady state. Step ST11 is completed by setting the logical level of the signal GO to "L."

In the sensing operation in Step ST12, all the integrator circuits 20<1> to 20<18> are made active at the same time. If offset voltages of the amplifier circuits 21<1> to 21<18> are varied by process variation, the timing at which each of the integrator circuits 20<1> to 20<18> performs integration varies. By performing Step ST11 in advance, variations in timing of performing integration in the integrator circuits 20<1> to 20<18> due to offset voltages of the amplifier circuits 21<1> to 21<18> can be reduced in Step ST12.

(Step ST12: Operation for Sensing Even-Numbered Channel)

Figure 14:
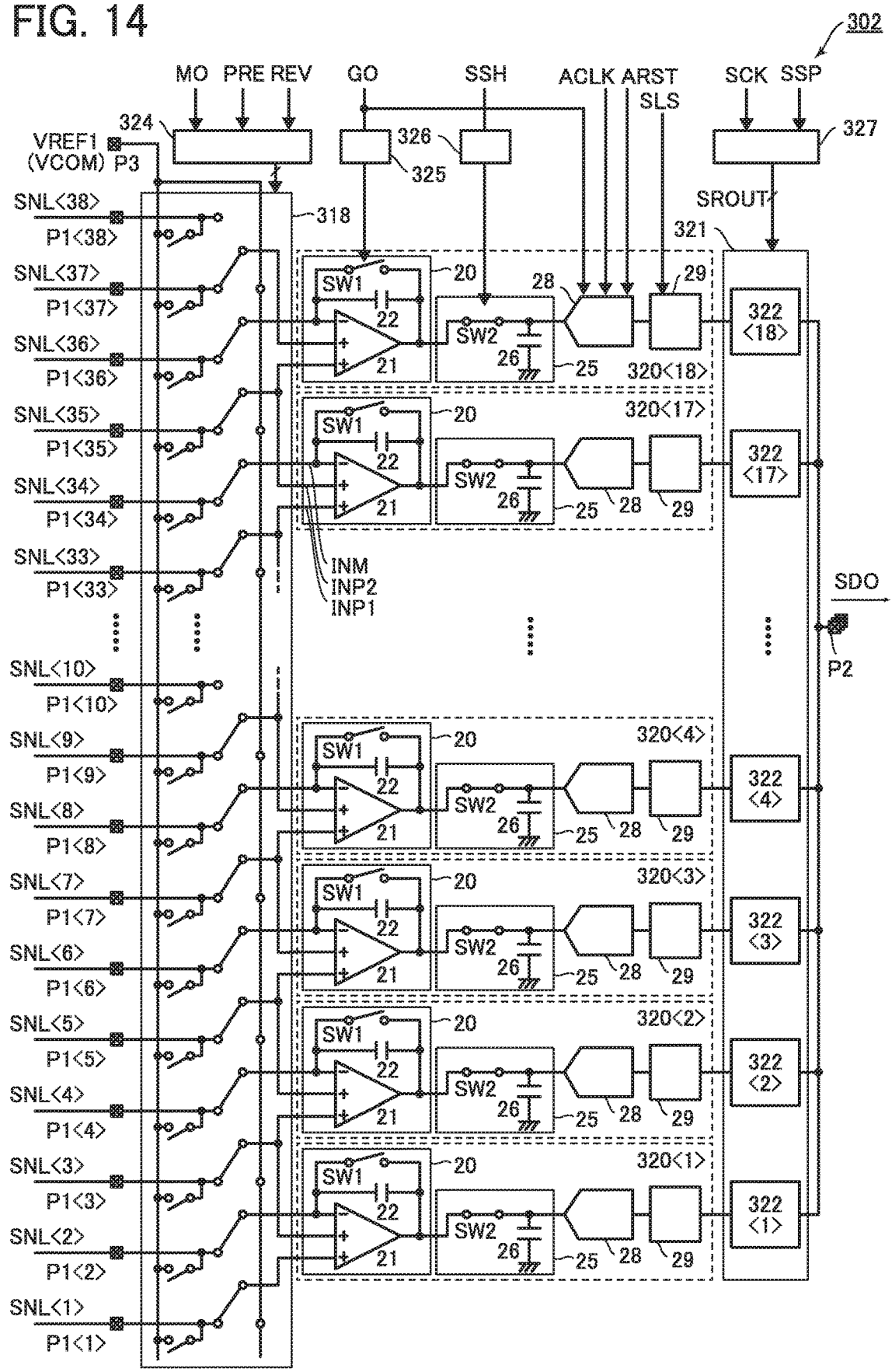
FIG. 14 is a circuit diagram illustrating an operation example of a sensing IC.

In Step ST12, a signal of the wiring SNL for an even-numbered channel is sensed. The logical levels of all the signals MO, PRE, and REV remain at "L." Each of the switches SW1 is turned off by setting the logical level of the signal GO to "L." Then, each switch SW2 is turned on by setting the signal SSH to high (H) level (FIG. 14). The DRL driver IC 301 selects one of the wirings DRL and inputs an H-level drive signal to the selected wiring DRL.

The integrator circuit 20<j> integrates a signal of the wiring SNL<2j>, using the average voltage of the voltages of the wirings SNL<2j−1> and SNL<2j+1> as a reference voltage. The integrator circuit 20<j> converts the amount of capacitance change of the wiring SNL<2j> into a voltage. The sample and hold circuit 25<j> samples the output signal of the integrator circuit 20<j>. The sample and hold circuit 25<j> performs sampling operation in a period during which the signal SSH is at H level. After an L-level signal SSH is input to the sensing IC 302, the DRL driver IC 301 sets the voltage of the wiring DRL in driving to L level.

(Step ST13: Precharge Operation for Odd-Numbered Channel)

Figure 15:
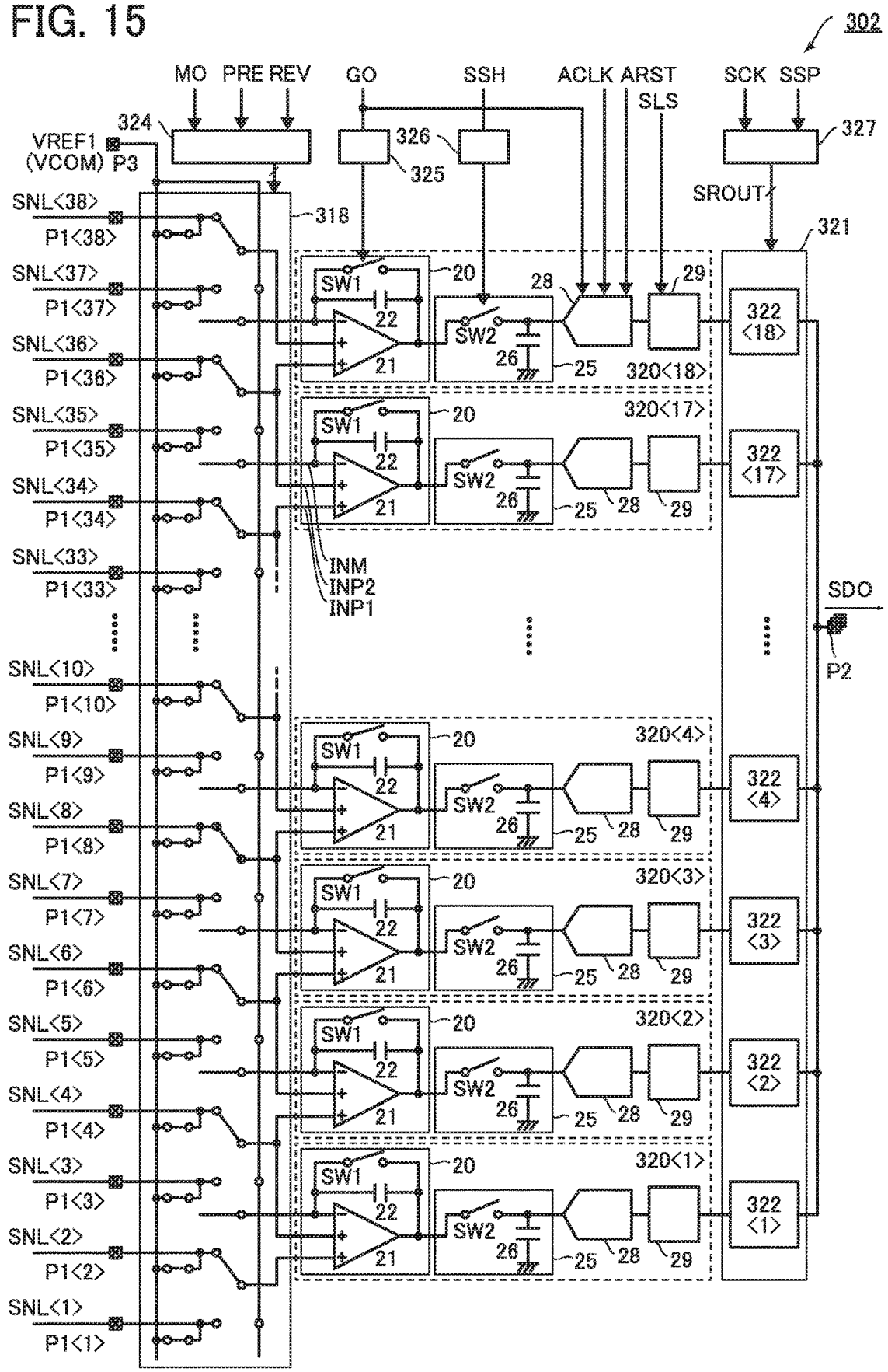
FIG. 15 is a circuit diagram illustrating an operation example of a sensing IC.

In the precharge operation in Step ST13, the logical levels of the signals MO, PRE, and REV are "L," "H," and "H," respectively. As illustrated in FIG. 15, the sensing IC 302 electrically connects the pins P1<1> to P1<38> to the pin P3 and precharges the wirings SNL<1> to SNL<38> at the voltage VCOM. Moreover, the terminals INP1 and INP2 of the circuit 320<j> are electrically connected to the wirings SNL<2j> and SNL<2j+2>, respectively, and the terminal INM is made floating.

(Step ST14: Setup Operation for Odd-Numbered Channel)

The operation in Step ST14 is setup operation for sensing an odd-numbered channel and is performed in a manner similar to that of Step ST12.

Figure 16:
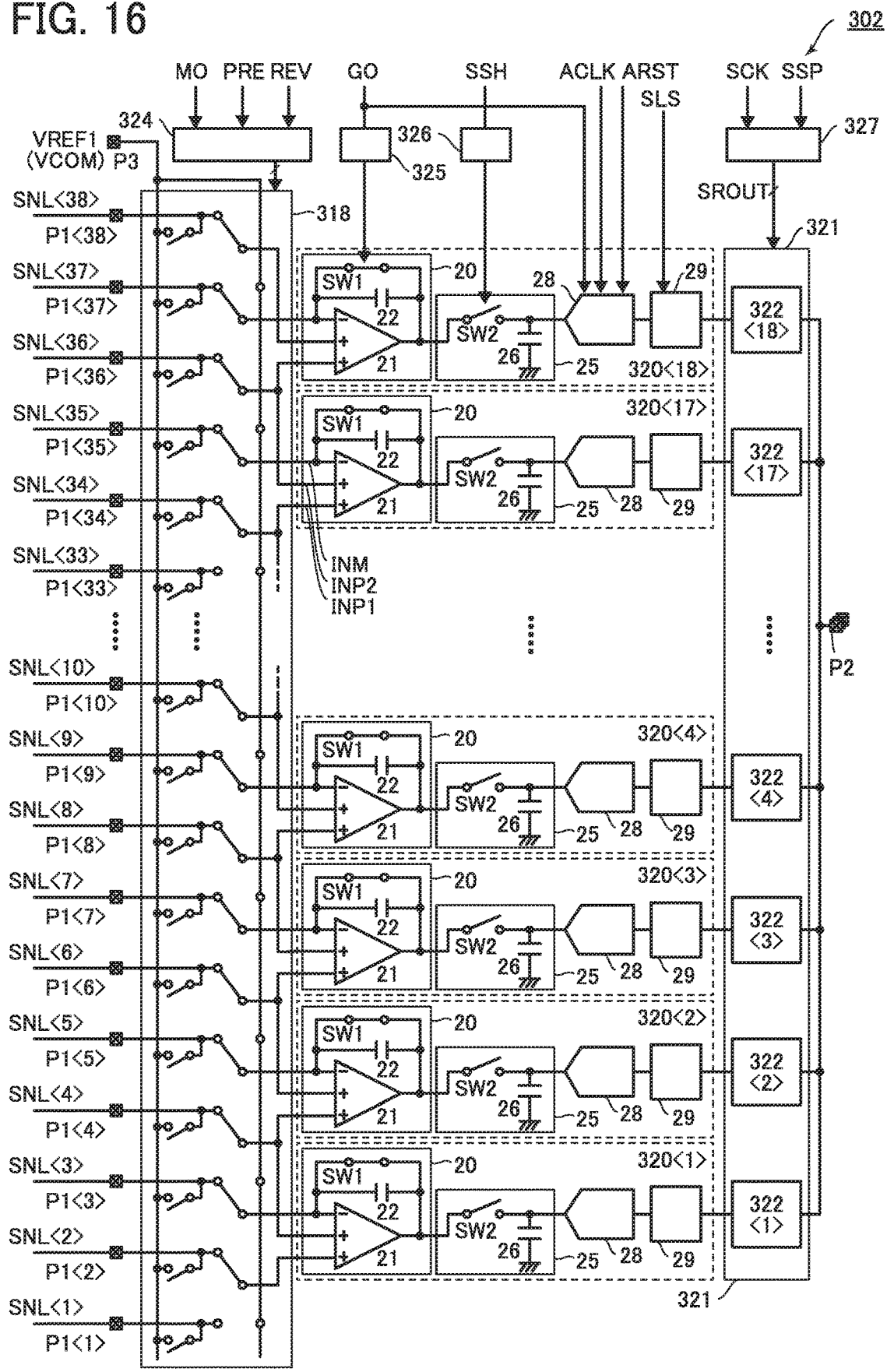
FIG. 16 is a circuit diagram illustrating an operation example of a sensing IC.

The logical levels of the signals MO, PRE, and REV are "L," "L," and "H," respectively. As illustrated in FIG. 16, electrical connection between the pins P1<1> to P1<38> and the pin P3 is broken. The terminal INM of the circuit 320<j> is electrically connected to the wiring SNL<2j+1>, and electrically connected to the output terminal of the amplifier circuit 21<j> through the switch SW1.

The logical level of the signal GO is changed from "L" to "H." H-level transition of the signal GO makes each ADC 28 execute analog-to-digital (A/D) conversion. By A/D conversion of the ADC 28<j>, an analog voltage held in the sample and hold circuit 25<j> is converted into a digital data signal. In accordance with the signal SLS, the LAT 29<j> stores the digital data signal generated by the ADC 28<j>. That is, in Step ST14, the signal of the wiring SNL<2j>, which is sensed in Step ST12, is converted into a digital data signal by the ADC 28<j>, and then the digital data signal is stored in the LAT 29<j>.

(Step ST15: Operation for Sensing Odd-Numbered Channel)

In Step ST15, a signal of the wiring SNL for an odd-numbered channel is sensed. The logical levels of the signals MO, PRE, and REV remain at "L," "L," and "H," respectively. Each of the switches SW1 is turned off by setting the signal GO to low (L) level. Then, each of the switches SW2 is turned on by setting the signal SSH to H level (FIG. 17). The DRL driver IC 301 inputs an H-level drive signal again to the wiring DRL<k> selected in Step ST12.

The integrator circuit 20<j> integrates a signal of the wiring SNL<2j+1>, using a voltage obtained by averaging the voltages of the wirings SNL<2j> and SNL<2j+2> as a reference voltage. The integrator circuit 20<j> converts the amount of capacitance change of the wiring SNL<2j> into a voltage and outputs the voltage. The sample and hold circuit 25<j> samples the output signal of the integrator circuit 20<j> in a period during which the signal SSH is at H level. After an L-level signal SSH is input to the sensing IC 302, the DRL driver IC 301 sets the voltage of the wiring DRL in driving to L level.

Furthermore, in Step ST15, the signal SSP becomes active, and the SR 327 generates the signal SROUT. The output buffer circuits 322<1> to 322<18> are sequentially selected by the signal SROUT, and data signals stored in the LATs 29<1> to 29<18> are sequentially output from the pin P2. Note that readout of the digital data signals from the LATs 29<1> to 29<18> only needs to be completed before Step ST11 is performed again. In other words, data of the signal SDO output from the pin P2 while Steps ST15 and ST16 are performed represents the capacitance of the wiring SNL for an even-numbered channel.

A sensing signal of the wiring SNL<2j-1>, which is sensed in Step ST15, is converted into a digital data signal by the ADC 28<j> and stored in the LAT 29<j> in Step ST11 of the next cycle. When the signal SSP becomes active in Step ST12, digital data signals are sequentially output from the LATs 29<1> to 29<18> to the pin P2 through the output circuit 321. Readout of the digital data signals from the LATs 29<1> to 29<18> at this time only needs to be completed before Step ST14 starts. In other words, data of the signal SDO output from the pin P2 while Steps ST12 and ST13 are performed represents the capacitance of the wiring SNL for an odd-numbered channel.

(Step ST16: Precharge Operation for Even-Numbered Channel)

Step ST16 is performed in a manner similar to that of Step ST10. As illustrated in FIG. 18, the pins P1<1> to P1<38> are electrically connected to the pin P3, and the wirings SNL<1> to SNL<38> are precharged at the voltage VCOM. The terminals INP1 and INP2 of the circuit 320<j> are electrically connected to the wirings SNL<2j-1> and SNL<2j+1>, respectively, and the terminal INM is made floating.

<<Single-Ended Sensing Mode>>

As illustrated in FIG. 19, the operation of the sensing IC 302 in the single-ended sensing mode is roughly classified into five steps ST20 to ST24. Steps ST21 to ST24 are performed the same number of times as the number of driving lines. To set the sensing IC 302 in the single-ended sensing mode, an H-level signal MO is input to the sensing IC 302.

(Step ST20: Precharge (Display Period))

The precharge operation in Step ST20 is executed while display operation is performed in the display unit 110. Like Step ST10, Step ST20 is performed to set the sensor array 121 in a state that does not affect display on the display unit 110.

The logical levels of the signals MO and PRE are "H" and "H," respectively. The logical level of the signal REV can be either "H" or "L." As illustrated in FIG. 20, the input circuit 318 electrically connects the pins P1<1> to P1<38> to the pin P3, electrically connects the terminals INP1 and INP2 of the amplifier circuit 21<j> to the pin P3, and makes the terminal INM floating. In the integrator circuit 20<j>, the switch SW1 is turned on, and the output terminal of the amplifier circuit 21<j> and the terminal INM are short-circuited.

(Step ST21: Operation for Sensing Even-Numbered Channel)

In Step ST21, the circuits 320<1> to 320<18> sense sensing signals of the wirings SNL for even-numbered channels. The logical levels of the signals MO, PRE, and REV are "H," "L," and "L," respectively. Each of the switches SW1 is turned off by setting the logical level of the signal GO to L level. Then, each switch SW2 is turned on by setting the signal SSH to H level (FIG. 21). Moreover, the DRL driver IC 301 selects one of the wirings DRL and inputs an H-level drive signal to the selected wiring DRL.

The integrator circuit 20<j> integrates a signal of the wiring SNL<2j>, using the voltage VCOM as a reference voltage. The signal SSH is at H level. The sample and hold circuit 25<j> samples the output signal of the integrator circuit 20<j>. An L-level signal SSH is input to the sensing IC 302 to switch the sample and hold circuit 25<j> from the sampling state to the hold state. Then, the DRL driver IC 301 sets the voltage of the wiring DRL in driving to L level.

(Step ST22: Precharge Operation)

The precharge operation in Step ST22 is performed in a manner similar to that of Step ST20 (see FIG. 20). In Step ST22, an H-level signal GO is input, whereby the ADC 28 becomes active. The ADC 28 converts an analog voltage held in the sample and hold circuit 25 into a digital data signal. In accordance with the signal SLS, the LAT 29 stores the digital data signal generated by the ADC 28. Subsequently, the signal SSP becomes active, the output buffer circuits 322<1> to 322<18> are sequentially selected by the signal SROUT, and the data signals stored in the LATs 29<1> to 29<18> are sequentially output from the pin P2. In Step ST22, the sensing signal sensed in Step ST21 is converted into a digital data signal, and the digital data signal is output from the pin P2.

(Step ST23: Operation for Sensing Odd-Numbered Channel)

In Step ST23, the circuits 320<1> to 320<18> sense sensing signals of the wirings SNL for odd-numbered channels. The logical levels of the signals MO, PRE, and REV are "H," "L," and "H," respectively. Each of the switches SW1 is turned off by setting the logical level of the signal GO to L level. Then, each switch SW2 is turned on by setting the signal SSH to H level (FIG. 22). The DRL driver IC 301 inputs an H-level drive signal again to the wiring DRL selected in Step ST11.

The integrator circuit 20<j> integrates a sensing signal of the wiring SNL<2j>, using the voltage VCOM as a reference voltage. The sample and hold circuit 25<j> samples the output signal of the integrator circuit 20<j>. Next, by inputting an L-level signal SSH to the sensing IC 302, the sample and hold circuit 25<j> is set in the hold state, and the DRL driver IC 301 sets the voltage of the wiring DRL in driving to L level.

(Step ST24: Precharge Operation)

The precharge operation in Step ST24 is performed in a manner similar to that of Step ST22 (see FIG. 20). In Step ST24, the sensing signal sensed in Step ST23 is converted into a digital data signal, and the digital data signal is output from the pin P2.

Note that in the sensing IC 302, the pin P1<38> is not connected to the terminal INM of the circuit 320<38> in the sensing operation for even-numbered channels, and in addition, the pin P1<38> is not connected to the terminal INM of the circuit 320<38> in the sensing operation for odd-numbered channels. That is, the sensing IC 302 does not have a function of sensing signals of the wirings SNL connected to the pins P1<1> and P1<38>. When the number of input channels (the number of pins P1) of the sensing IC 302 is 2N+2, the maximum number of wirings SNL whose signals can be sensed by the sensing IC 302 is 2N.

The structure of a touch panel device is roughly classified into an out-cell (external) type and a built-in type. Examples of the structure of a built-in touch panel device are an on-cell type and an in-cell type. A dedicated IC (e.g., a sensing IC, a driving line driver IC, or a driver IC for a display device) of a touch panel device can have a variety of structures in accordance with the structure of a touch sensor unit. Structure examples of a touch panel device and a dedicated IC of the touch panel device will be described in Embodiment 2.

Embodiment 2

<<Out-Cell Touch Panel Unit>>

FIG. 23A is an exploded perspective view that schematically illustrates a structure example of a touch panel device including an out-cell touch panel unit. A touch panel device 201 illustrated in FIG. 23A includes an upper cover 211, a lower cover 212, a battery 213, a printed circuit board 214, a backlight unit 216, a touch sensor unit 220, and a display unit 230. The battery 213, the backlight unit 216, or the like is not provided in some cases. The touch sensor unit 220 and the display unit 230 form an out-cell touch panel unit.

The backlight unit 216 is provided when the display unit 230 is a transmissive display unit (e.g., a transmissive liquid crystal display unit). The backlight unit 216 includes a light source 216a. The light source 216a is a light-emitting diode (LED), for example. A light diffuser plate whose end portion is provided with the light source 216a can also be used as the backlight unit 216.

A wavelength conversion component may be provided between the backlight unit 216 and the display unit 230. The wavelength conversion component has a function of absorbing light from the backlight unit 216 and converting part or all of the light into light with another wavelength. Moreover, the wavelength conversion component may have a function of a light guide plate.

The printed circuit board 214 is provided with a processor, a power supply circuit, a memory, a controller, and the like. As a power supply that supplies power to the power supply circuit, an external commercial power supply or the battery 213 can be used. A frame 215 has a function of protecting the display unit 230 and a function of an electromagnetic shield for blocking electromagnetic waves generated by the operation of the printed circuit board 214. The frame 215 may have a function of a radiator plate.

The touch sensor unit 220 includes a touch sensor panel 221, a flexible printed circuit (FPC) 229, a DRL driver IC 351, and a sensing IC 352. The touch sensor panel 221 includes a substrate 222. The substrate 222 is provided with a sensor array 225, a terminal portion, and the like. The FPC 229, the DRL driver IC 351, and the sensing IC 352 are electrically connected to the terminal portion provided over the substrate 222.

The DRL driver IC 351 includes a touch sensor driving line driver circuit (hereinafter "TS-DR") 61. The sensing IC 352 includes a touch sensor sensing circuit (hereinafter "TS-SN") 62. In some cases, a plurality of DRL drivers IC 351 corresponding to the number of driving lines are provided, and a plurality of sensing ICs 352 corresponding to the number of sensing lines in the sensor array 225 are provided.

In the touch sensor unit 220, an IC 353 (FIG. 23B) or an IC 354 (FIG. 23C) may be provided instead of the DRL driver IC 351 and the sensing IC 352. The IC 353 includes the TS-DR 61 and the TS-SN 62. The IC 354 includes the TS-DR 61, the TS-SN 62, and a touch sensor controller (TS-CTR) 63. One or a plurality of ICs 353 can be used; the same applies to the IC 354.

The display unit 230 includes a display panel 231, an FPC 238, and a source driver IC 381. The display panel 231 includes an element substrate 232 and a counter substrate 233. The element substrate 232 is provided with a pixel array, a gate driver circuit, and a terminal portion. The counter substrate 233 is provided with a color filter and a black matrix, for example. The source driver IC 381 includes a source driver circuit (SDR) 81. One or a plurality of source driver ICs 381 corresponding to the number of source lines in the pixel array is/are used.

The pixel array in the display unit 230 and the sensor array 225 in the touch sensor unit 220 are placed to overlap each other. Note that when the display unit 230 has a structure where light of display elements is extracted through the element substrate (e.g., when the display unit 230 is a bottom-emission self-luminous display unit), the display unit 230 is placed so that the element substrate 232 is closer to the upper cover 211.

The FPC 238 and the source driver IC 381 are electrically connected to the terminal portion provided over the element substrate 232. Although the source driver IC 381 is mounted by a chip on glass (COG) method here, there is no particular limitation on the mounting method, and a chip on flexible (COF) method, a tape automated bonding (TAB) method, or the like may be employed. The same applies to a method for mounting the IC on the touch sensor unit 220.

When a gate driver circuit is not provided over the element substrate 232, a gate driver IC is connected to the element substrate 232, for example. Instead of the source driver IC 381, a driver IC 382 illustrated in FIG. 23D may be connected to the element substrate 232. The driver IC 382 includes the source driver circuit (SDR) 81 and a gate driver circuit (GDR) 82.

A base substrate of the element substrate 232 is any substrate that can support transistors and the like included in the pixel array. For example, a support substrate used for fabricating the transistors in the pixel array (e.g., a glass substrate or a quartz substrate) or a substrate different from the support substrate is used as the base substrate of the element substrate 232.

Examples of the base substrate include a glass substrate, a quartz substrate, a plastic substrate, a metal substrate, a stainless steel substrate, a substrate containing stainless steel foil, a tungsten substrate, a substrate containing tungsten foil, a flexible substrate, a laminate film, paper containing a fibrous material, and a base film. Examples of a glass substrate include a barium borosilicate glass substrate, an aluminoborosilicate glass substrate, and a soda lime glass substrate. Examples of a flexible substrate include flexible synthetic resin substrates made of plastics typified by polyethylene terephthalate (PET), polyethylene naphthalate (PEN), and polyether sulfone (PES), and acrylic. Examples of a laminate film are a film made of polypropylene, polyester, polyvinyl fluoride, polyvinyl chloride, or the like, and an inorganic film formed by evaporation. Examples of a base film are base films formed using a polyester resin, a polyamide resin, a polyimide resin, an aramid resin, an epoxy resin, and paper.

A base substrate of the counter substrate 233 is preferably a substrate having a function of sealing a display element. As the base substrate of the counter substrate 233, a substrate similar to the base substrate of the element substrate 232 can be used. Alternatively, the base substrate of the counter substrate 233 can be an optical film (circularly polarizing film).

<<On-Cell Touch Panel Unit>>

Figure 24A:
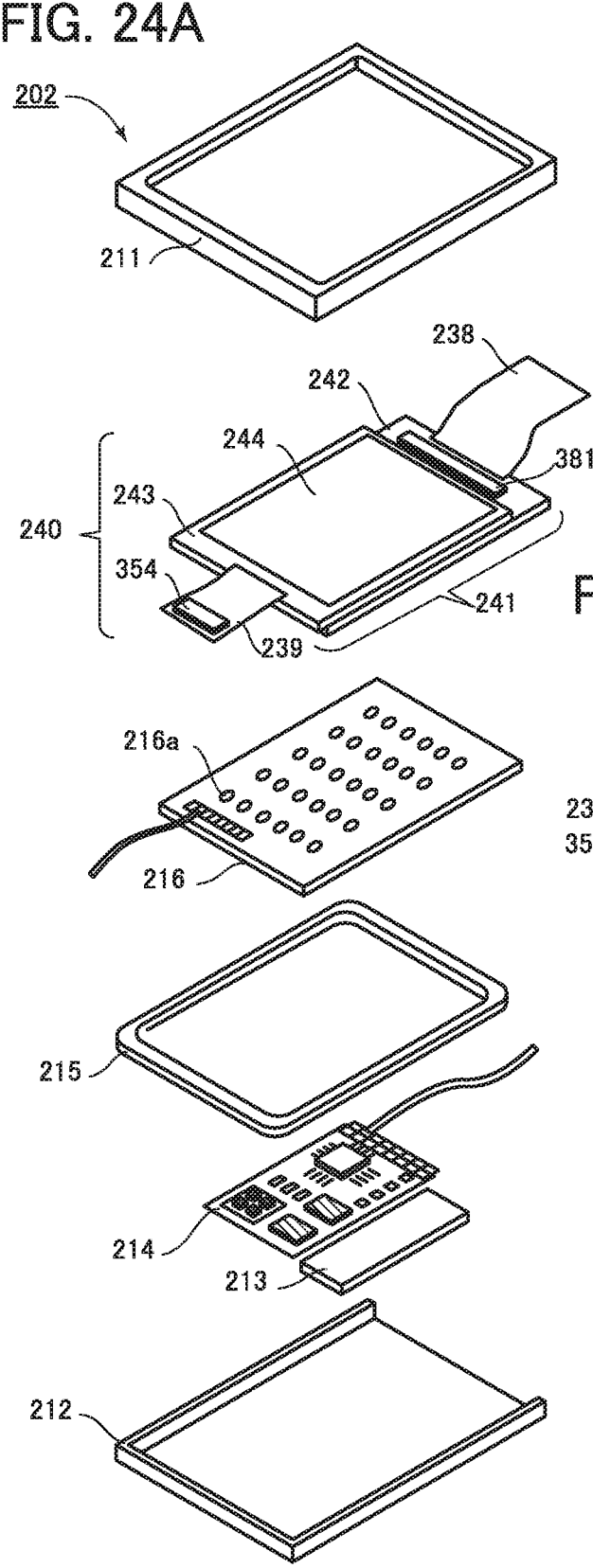
FIG. 24A is a schematic exploded perspective view illustrating a structure example of a touch panel device.

FIG. 24A is an exploded perspective view that schematically illustrates a structure example of an on-cell touch panel device. A touch panel device 202 illustrated in FIG. 24A includes a touch panel unit 240 instead of the touch sensor unit 220 and the display unit 230. The touch panel unit 240 is made in combination of the touch sensor unit 220 and the display unit 230.

The touch panel unit 240 includes a display panel 241, the FPC 238, an FPC 239, the IC 354, and the source driver IC 381. The display panel 241 includes an element substrate 242 and a counter substrate 243. The structure of the element substrate 242 is similar to that of the element substrate 232. The IC 354 and a pixel array are electrically connected to the FPC 238. The counter substrate 243 is provided with a sensor array 244 and a terminal portion connected to the sensor array 244. The sensor array 244 and the terminal portion are placed on an exterior surface of the counter substrate 243. The FPC 239 is connected to the terminal portion so that the FPC 239 and the IC 354 are electrically connected to each other.

Figure 24B:
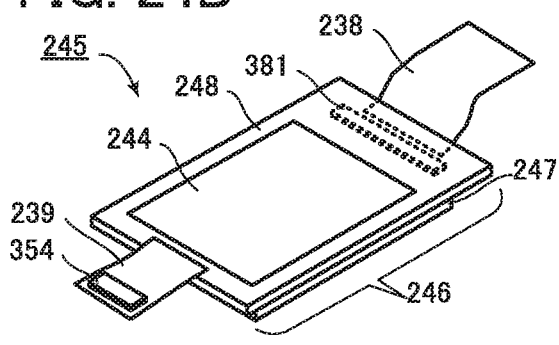
FIG. 24B is a perspective view illustrating a structure example of a touch panel unit.

As an example, the touch panel unit 240 in FIG. 24A has a structure where light of display elements is extracted through a counter substrate. FIG. 24B illustrates another structure example of a touch panel unit in which light of display elements is extracted through a counter substrate. A touch panel unit 245 illustrated in FIG. 24B includes a display panel 246, the FPCs 238 and 239, the IC 354, and the source driver IC 381. The display panel 246 includes an element substrate 247 and a counter substrate 248. The sensor array 244 and a terminal portion connected to the sensor array 244 are provided on an exterior surface of the counter substrate 248. The FPC 239 is electrically connected to the terminal portion.

<<In-Cell Touch Panel>>

FIGS. 25A to 25C and FIG. 26A are perspective views each illustrating a structure example of an in-cell touch panel device.

Figure 25A:
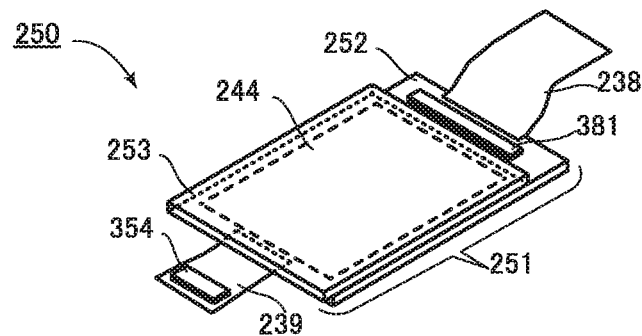
FIGS. 25A to 25C are schematic perspective views each illustrating a structure example of a touch panel unit.

A touch panel unit 250 illustrated in FIG. 25A includes a display panel 251, the FPCs 238 and 239, the IC 354, and the source driver IC 381. The display panel 251 includes an element substrate 252 and a counter substrate 253. The element substrate 252 can have a structure similar to that of the element substrate 232. The IC 354 is electrically connected to the FPC 239. The sensor array 244 and a terminal portion electrically connected to the sensor array 244 are provided on an interior surface of the counter substrate 253 (a surface that faces the element substrate 252). The FPC 239 is electrically connected to the terminal portion.

Figure 25B:
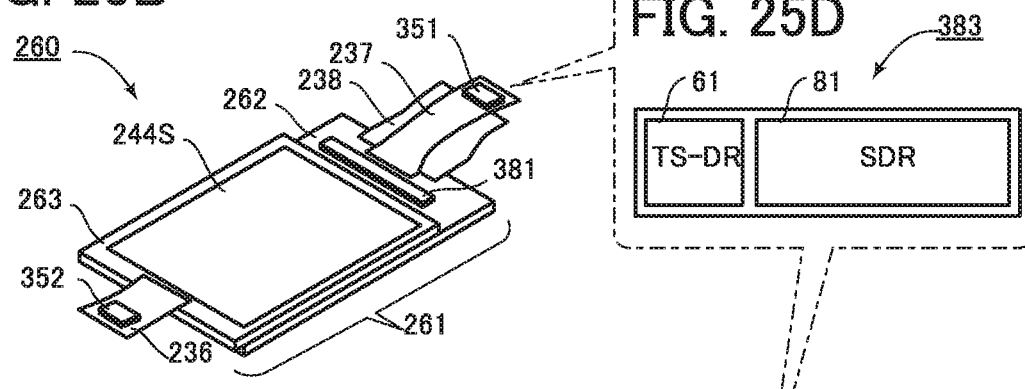

FIG. 25B illustrates an example of a hybrid in-cell touch panel unit. A hybrid in-cell touch panel refers to a unit made in combination of an in-cell touch panel and an on-cell touch panel. A touch panel unit 260 illustrated in FIG. 25B includes a display panel 261, FPCs 236 to 238, the DRL driver IC 351, the sensing IC 352, and the source driver IC 381.

The display panel 261 includes an element substrate 262 and a counter substrate 263. A sensing line group 244S included in a sensor array and a terminal portion electrically connected to the sensing line group 244S are provided on an exterior surface of the counter substrate 263. The FPC 236 is electrically connected to the terminal portion, and the sensing IC 352 is electrically connected to the FPC 236.

The element substrate 262 is provided with a pixel array, a gate driver circuit, the FPC 237, the FPC 238, and a terminal portion for the source driver IC 381. A common electrode in the pixel array functions as a driving line for the touch sensor. The FPC 238 is electrically connected to the pixel array and the source driver IC 381 through the terminal portion. The DRL driver IC 351 is electrically connected to the FPC 237. At the time of sensing touch operation, the common electrode in the pixel array is driven by the DRL driver IC 351.

When the gate driver circuit is not provided over the element substrate 262, a gate driver IC is used as a dedicated IC. Alternatively, the driver IC 382 is additionally used instead of the source driver IC 381.

Figure 25C:
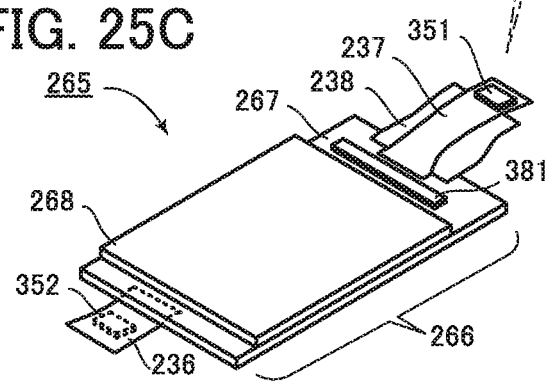

A touch panel unit 265 illustrated in FIG. 25C includes a display panel 266, the FPCs 236 to 238, the DRL driver IC 351, the sensing IC 352, and the source driver IC 381. The display panel 266 includes an element substrate 267 and a counter substrate 268. The display panel 266 is configured such that light of display elements is extracted through the element substrate 267. A sensing line group and a terminal portion electrically connected to the sensing line group are provided on an exterior surface of the element substrate 267. The FPC 236 is electrically connected to the terminal portion.

In the touch panel unit 265, a DRL driver circuit together with a pixel array can be provided over the element substrate 267. Alternatively, instead of the source driver IC 381 and the DRL driver IC 351, a source driver IC 383 illustrated in FIG. 25D may be provided over the element substrate 267. Using the source driver IC 383 can omit a terminal portion for the FPC 237, resulting in smaller size, lower cost, and simpler fabrication process of the touch panel unit 265. The same applies to the touch panel unit 260.

A touch panel unit 270 illustrated in FIG. 26A includes a display panel 271, the FPCs 237 and 238, the IC 354, and the source driver IC 381. The display panel 271 includes an element substrate 272 and a counter substrate 273. The counter substrate 273 can have a structure similar to that of the counter substrate 233 in the display unit 230.

The element substrate 272 is provided with a pixel array, a gate driver circuit, the FPCs 237 and 238, and a terminal portion for the source driver IC 381. Some common electrodes in the pixel array function as driving lines for the touch sensor, and the other common electrodes function as sensing lines for the touch sensor. The FPC 238 is electrically connected to the pixel array and the source driver IC 381 through the terminal portion. The DRL driver IC 351 is electrically connected to the FPC 237. A DRL driver circuit together with the pixel array may be provided over the element substrate 272.

In the touch panel unit 270, the driver IC 382 may be used instead of the source driver IC 381. Note that a gate driver IC is used when the gate driver circuit is not provided over the element substrate 272.

In the touch panel unit 270, the touch sensor is provided in the pixel array, so that a dedicated IC provided with a peripheral circuit for the display panel and a peripheral circuit for the touch sensor can be used. Structure examples of such a dedicated IC will be described with reference to FIGS. 26B to 26D. FIGS. 26B to 26D are plan views each illustrating part of an element substrate.

An element substrate 272B in FIG. 26B includes a base substrate 280 (hereinafter referred to as substrate 280). The substrate 280 is provided with a pixel array 281, gate driver circuits 282A and 282B, a demultiplexer (DEMUX) 284, and a terminal portion 285. The terminal portion 285 is to be connected to an FPC. The substrate 280 is also provided with a terminal portion to be connected to an IC, and the source driver IC 384 is electrically connected to this terminal portion.

Although two gate driver circuits 282A and 282B are provided here, one gate driver circuit may be used instead. The DEMUX 284 has a function of selecting a source line to which a data signal is input from the source driver IC 384. The DEMUX 284 can be provided as necessary. The other element substrates illustrated in FIG. 23A and the like are appropriately provided with a DEMUX with a similar function.

The source driver IC 384 includes the TS-DR 61, the TS-SN 62, and the SDR 81. Arranging the internal circuits in the source driver IC 384 such that the TS-DR 61 is not adjacent to the TS-SN 62 makes the TS-SN 62 less likely to be affected by noise due to driving of the TS-DR 61. As a result, the SNR of the TS-SN 62 can be improved.

In an element substrate 272C illustrated in FIG. 26C, the substrate 280 is provided with DRL driver circuits 283A and 283B as well as the pixel array 281. Thus, as a source driver IC, a source driver IC 385 including the TS-SN 62 and the SDR 81 can be used. The SNR of the TS-SN 62 is improved because the TS-SN 62 is not adjacent to the DRL driver circuits.

The number of source driver ICs to be used is determined in accordance with the number of pixels in the pixel array 281. Source driver ICs to be used can be selected from the source driver ICs 381 and 383 to 385 as appropriate. FIG. 26D illustrates an example where a plurality of source driver ICs are used. Over an element substrate 272D in FIG. 26D, the source driver ICs 381, 383, and 385 are electrically connected to each other. Also in this example, the SNR of the TS-SN 62 is improved because the TS-SN 62 is not adjacent to a DRL driver circuit. Note that when the DRL driver circuits 283A and 283B are provided over the substrate 280 of the element substrate 272D, the source driver IC 381 is provided instead of the source driver IC 383.

Figure 27A:
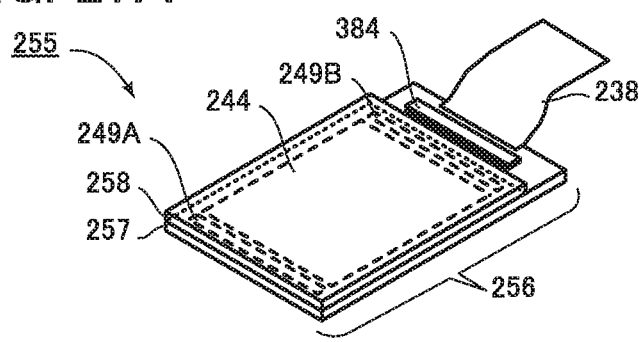
FIGS. 27A and 27B are a schematic perspective view and a cross-sectional view illustrating a structure example of a touch panel unit.
Figure 27B:
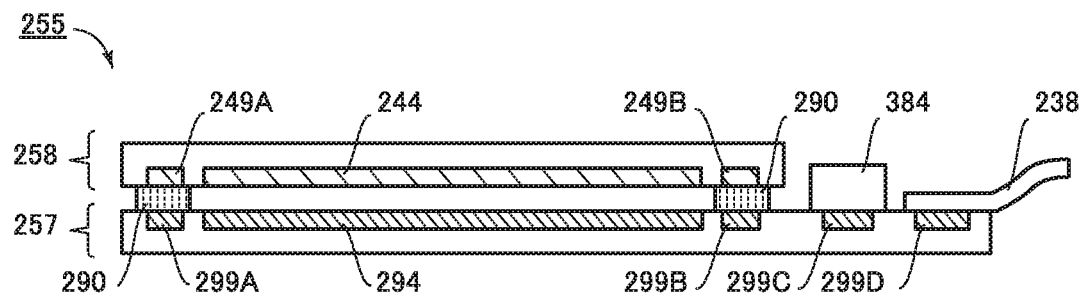

The source driver ICs 383 to 385 can be used for a display panel in which a touch sensor is provided on an interior surface of a counter substrate as in the touch panel unit 250 (FIG. 25A). In that case, a terminal portion provided over the counter substrate is electrically connected to a terminal portion provided over an element substrate. A touch panel unit with such a structure will be described with reference to FIGS. 27A and 27B. FIGS. 27A and 27B are a schematic perspective view and a schematic cross-sectional view, respectively, illustrating a structure example of a touch panel unit.

A touch panel unit 255 illustrated in FIGS. 27A and 27B includes a display panel 256, the FPC 238, and the source driver IC 384. The display panel 256 includes an element substrate 257 and a counter substrate 258. The source driver IC 384 is electrically connected to the FPC 238.

The sensor array 244 and terminal portions 249A and 249B are provided on an interior surface of the counter substrate 258. A pixel array 294, a gate driver circuit, and terminal portions 299A to 299D are provided on an interior surface of the element substrate 257. The pixel array 294 is electrically connected to the terminal portions 299C and 299D. The gate driver circuit is electrically connected to the terminal portion 299D. The terminal portions 299A and 299B are electrically connected to the terminal portion 299C. The source driver IC 384 is electrically connected to the terminal portion 299C. The terminal portion 299C is electrically connected to the terminal portion 299D. The FPC 238 is electrically connected to the terminal portion 299D.

The counter substrate 258 is fixed to the element substrate 257 with a sealant 290. The sealant 290 contains conductive particles; thus, electrical continuity is established between the terminal portion 249A and the terminal portion 299A and between the terminal portion 249B and the terminal portion 299B through the sealant 290. For example, when the terminal portion 249A is for driving lines and the terminal portion 249B is for sensing lines, the TP-DR 61 in the source driver IC 384 is electrically connected to the driving lines through the terminal portion 299C, a lead wiring, the terminal portion 299A, the sealant 290, and the terminal portion 249A. Moreover, the TP-SN 62 in the source driver IC 384 is electrically connected to the sensing lines through the terminal portion 299C, a lead wiring, the terminal portion 299B, the sealant 290, and the terminal portion 249B.

When a plurality of source driver ICs are used, they can be selected from the source driver ICs 381 and 383 to 385 as appropriate. For example, when the number of source driver ICs to be used is two, the source driver IC 383 and the source driver IC 385 are used. When the number of source driver ICs to be used is three, the source driver IC 381, the source driver IC 383, and the source driver IC 385 are used.

Embodiment 3

In this embodiment, electronic devices including a display portion will be described.

Examples of electronic devices including a display portion are a television set (also referred to as television or television receiver), a monitor of a computer or the like, a digital camera, a digital video camera, a digital photo frame, a mobile phone (also referred to as cellular phone or mobile phone device), a portable game machine, a portable information appliance, an audio reproducing device, and a large game machine such as a pinball machine. A flexible electronic device can be incorporated along a curved inside/outside wall surface of a construction such as a house or a building or a curved interior/exterior surface of a car.

FIGS. 28A to 28F, FIGS. 29A to 29D, and FIG. 30 illustrate structure examples of electronic devices. For display portions of the electronic devices in FIGS. 28A to 28F, FIGS. 29A to 29D, and FIG. 30, the touch panel device of Embodiment 1 can be used, in which case the display portion of the electronic device can function as an input unit. Moreover, using the touch panel device of Embodiment 1, which is highly sensitive, as the input unit results in an electronic device with high operability.

Figure 28A:
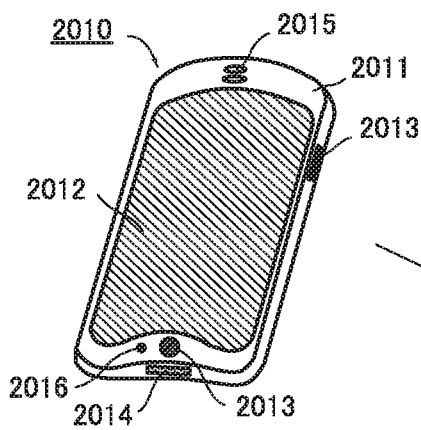
FIGS. 28A to 28F each illustrate a structure example of an electronic device.

An information appliance 2010 illustrated in FIG. 28A includes a display portion 2012 incorporated into a housing 2011, an operation button 2013, an external connection port 2014, a speaker 2015, and a microphone 2016. Here, a display region of the display portion 2012 is curved. The information appliance 2010 is a portable information appliance driven with a battery and can be used as a tablet information appliance or a smartphone. The information appliance 2010 has functions such as phone calls, e-mailing, an appointment organizer, Internet communication, and music reproduction. Information can be input by touching the display portion 2012 with a finger or the like. Various kinds of operation such as making a call, inputting letters, and switching screen images on the display portion 2012 can be performed by touching the display portion 2012 with a finger or the like. The information appliance 2010 can also be operated by inputting sound from the microphone 2016. Moreover, a variety of operations such as power on/off operation and screen switching of the display portion 2012 can be performed by pressing the operation button 2013.

Figure 28B:
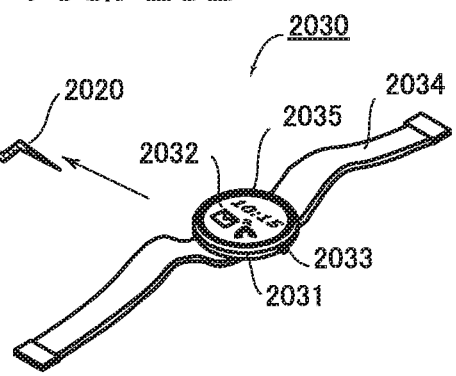

FIG. 28B illustrates an example of a watch-type information appliance. An information appliance 2030 includes a housing 2031, a display portion 2032, a winding crown 2033, a belt 2034, and a sensing unit 2035. The information appliance 2030 can be operated by rotating the winding crown 2033 or by touching the display portion 2032 with a finger or the like.

The sensing unit 2035 has a function of obtaining information on usage environment and biological information, for example. The sensing unit 2035 may be provided with a microphone, an imaging element, an acceleration sensor, a direction sensor, a pressure sensor, a temperature sensor, a humidity sensor, an illumination sensor, a positioning sensor (e.g., a global positioning system (GPS)), or the like.

Wireless communication devices with the same standard may be incorporated into the information appliance 2010 and the information appliance 2030 so that interactive communication is possible through a radio signal 2020. When the information appliance 2010 receives an incoming e-mail or call, for example, information notifying the incoming e-mail or call is displayed on the display portion 2032 of the information appliance 2030.

Figure 28C:
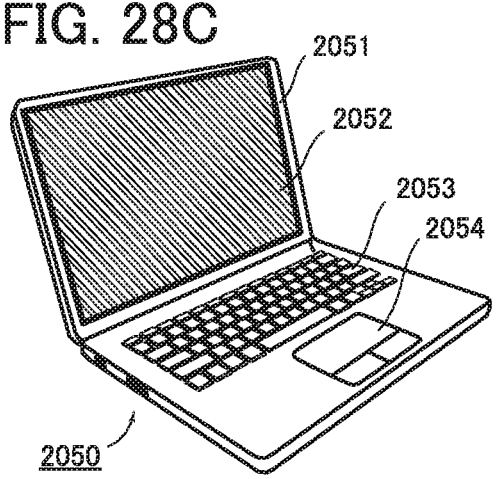

A notebook personal computer (PC) 2050 illustrated in FIG. 28C includes a housing 2051, a display portion 2052, a keyboard 2053, and a pointing device 2054. The notebook PC 2050 can be operated by touch operation on the display portion 2052.

Figure 28D:
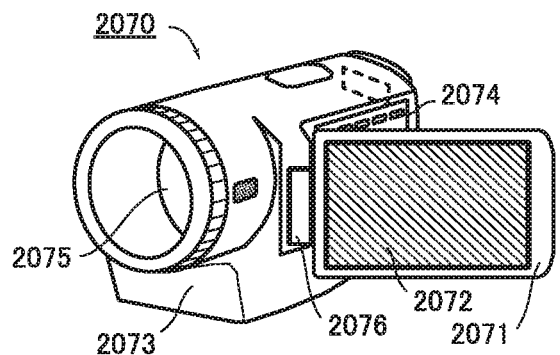

A video camera 2070 illustrated in FIG. 28D includes a housing 2071, a display portion 2072, a housing 2073, an operation key 2074, a lens 2075, and a joint 2076. The display portion 2072 is provided in the housing 2071. The housing 2073 is provided with the operation key 2074 and the lens 2075. The housing 2071 and the housing 2073 are connected to each other with the joint 2076, and the angle between the housing 2071 and the housing 2073 can be changed with the joint 2076. Images on the display portion 2072 may be switched in accordance with the angle between the housing 2071 and the housing 2073 at the joint 2076. A variety of operations such as start and stop of recording, zoom adjustment, and change of shooting range can be executed by touch operation on the display portion 2072.

Figure 28E:
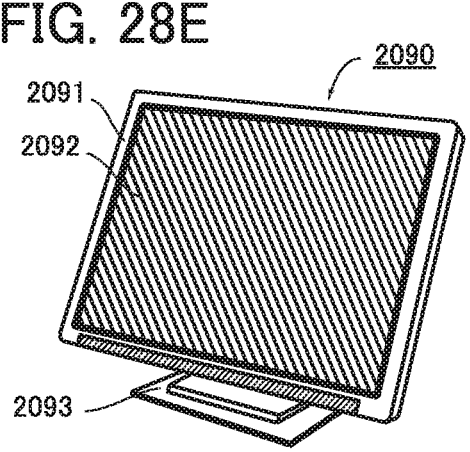

A display device 2090 illustrated in FIG. 28E includes a housing 2091, a display portion 2092, a support base 2093, and the like. The display device 2090 can be used as a monitor for a computer, a game machine, or the like and an input device.

Figure 28F:
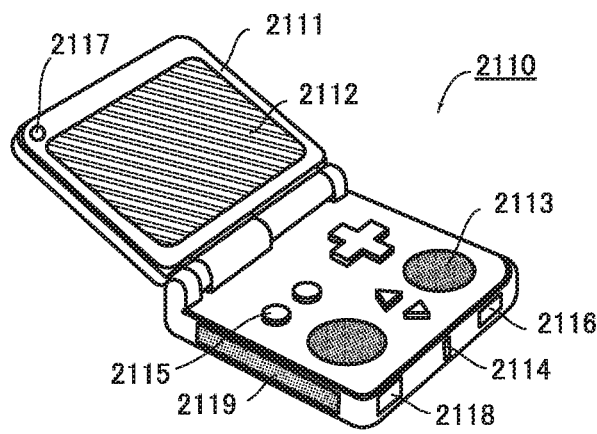

A portable game machine 2110 illustrated in FIG. 28F includes a housing 2111, a display portion 2112, a speaker 2113, an LED lamp 2114, an operation key 2115, a connection terminal 2116, a camera 2117, a microphone 2118, and a recording medium read portion 2119.

Figure 29A:
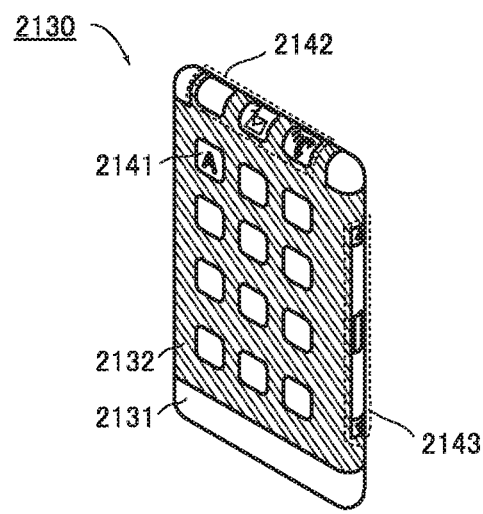
FIGS. 29A to 29D illustrate structure examples of electronic devices.

An information appliance 2130 illustrated in FIG. 29A includes a housing 2131 and a display portion 2132. The information appliance 2130 is a portable information appliance driven with a battery and can be used as a smartphone, a tablet information appliance, or the like. The information appliance 2130 has functions such as phone calls, e-mailing, an appointment organizer, Internet communication, and music reproduction. Since the display portion 2132 is curved, the information appliance 2130 can display information on at least three surfaces. Here, information 2141, information 2142, and information 2143 are displayed on different surfaces of the display portion 2132. For example, a user can see the display (here, the information 2142) on the upper edge portion of the display portion 2132 with the information appliance 2130 put in a breast pocket. Thus, the user can see the information 2142 without taking out the information appliance 2130 from the pocket and decide whether to answer the call.

Examples of the information 2141 to 2143 include notification from a social networking service (SNS), display indicating an incoming e-mail or call, e-mail information (e.g., the title and sender), the date, the time, remaining battery, and the reception strength of an antenna.

Figure 29B:
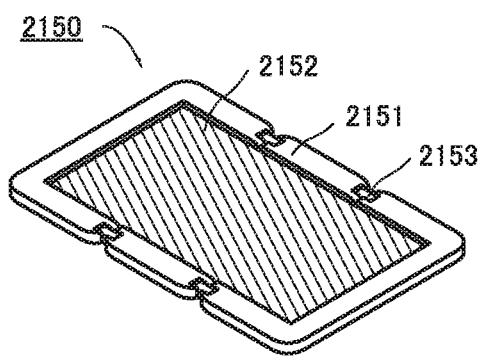
Figure 29C:
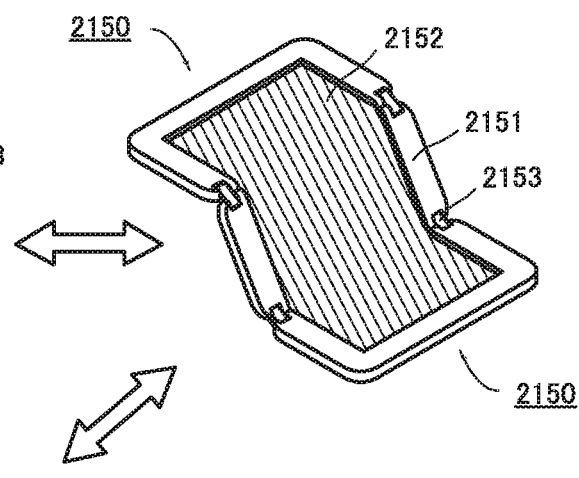
Figure 29D:
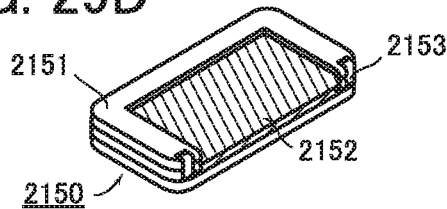

FIG. 29B illustrates a structure example of a foldable information appliance. An information appliance 2150 illustrated in FIG. 29B includes housings 2151, a display portion 2152, and hinges 2153. The information appliance 2150 is also a portable information appliance and has functions similar to those of the information appliance 2130. FIG. 29B illustrates the information appliance 2150 in an unfolded state. FIG. 29D illustrates the information appliance 2150 in a folded state. FIG. 29C illustrates the information appliance 2150 that is being opened or folded. The portability of the information appliance 2150 is increased in a folded state and a large display screen is obtained in an unfolded state, resulting in higher convenience of the information appliance 2150.

The display portion 2152 is supported with eight housings 2151 joined by the hinges 2153. By folding the information appliance 2150 at a connection portion between two housings 2151 with the hinges 2153, the information appliance 2150 can be reversibly changed in shape from an unfolded state to a folded state. The display portion 2152 can be bent with a radius of curvature of 1 mm to 150 mm, for example.

The information appliance 2150 may be provided with a sensor capable of sensing that the display portion 2152 is in a folded state (FIG. 29D). Similarly, the sensor may sense that the display portion 2152 is in an unfolded state (FIG. 29B). When the sensor senses that the display portion 2152 is in a folded state, display on a folded portion (or a portion where a user cannot see because of a folded state) may be stopped, or sensing by a touch sensor may be stopped. In such cases, display and touch sensing may be restarted when the sensor senses that the display portion 2152 is unfolded.

Figure 30:
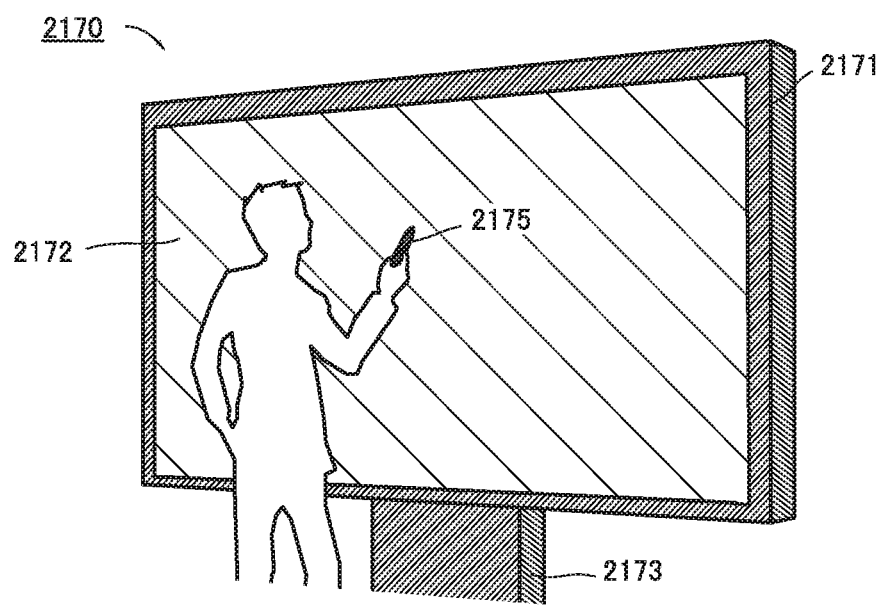
FIG. 30 illustrates a structure example of an electronic device.

An electronic whiteboard 2170 illustrated in FIG. 30 includes a housing 2171, a display portion 2172, and a support portion 2173. A user can draw letters and create drawings, for example, on the electronic whiteboard 2170 with an electronic pen 2175. The electronic whiteboard 2170 may be provided with a communication device such as a wireless communication device, in which case information displayed on the electronic whiteboard 2170 can be transmitted to another electronic device (e.g., a PC or a tablet terminal).

Embodiment 4

In this embodiment, device structures and the like of a display panel applicable to a touch panel device will be described with reference to FIG. 31, FIGS. 32A and 32B, FIGS. 33A and 33B, FIGS. 34A and 34B, and FIGS. 35A and 35B.

<<Structure Example 1 of Display Panel>>

Figure 31:
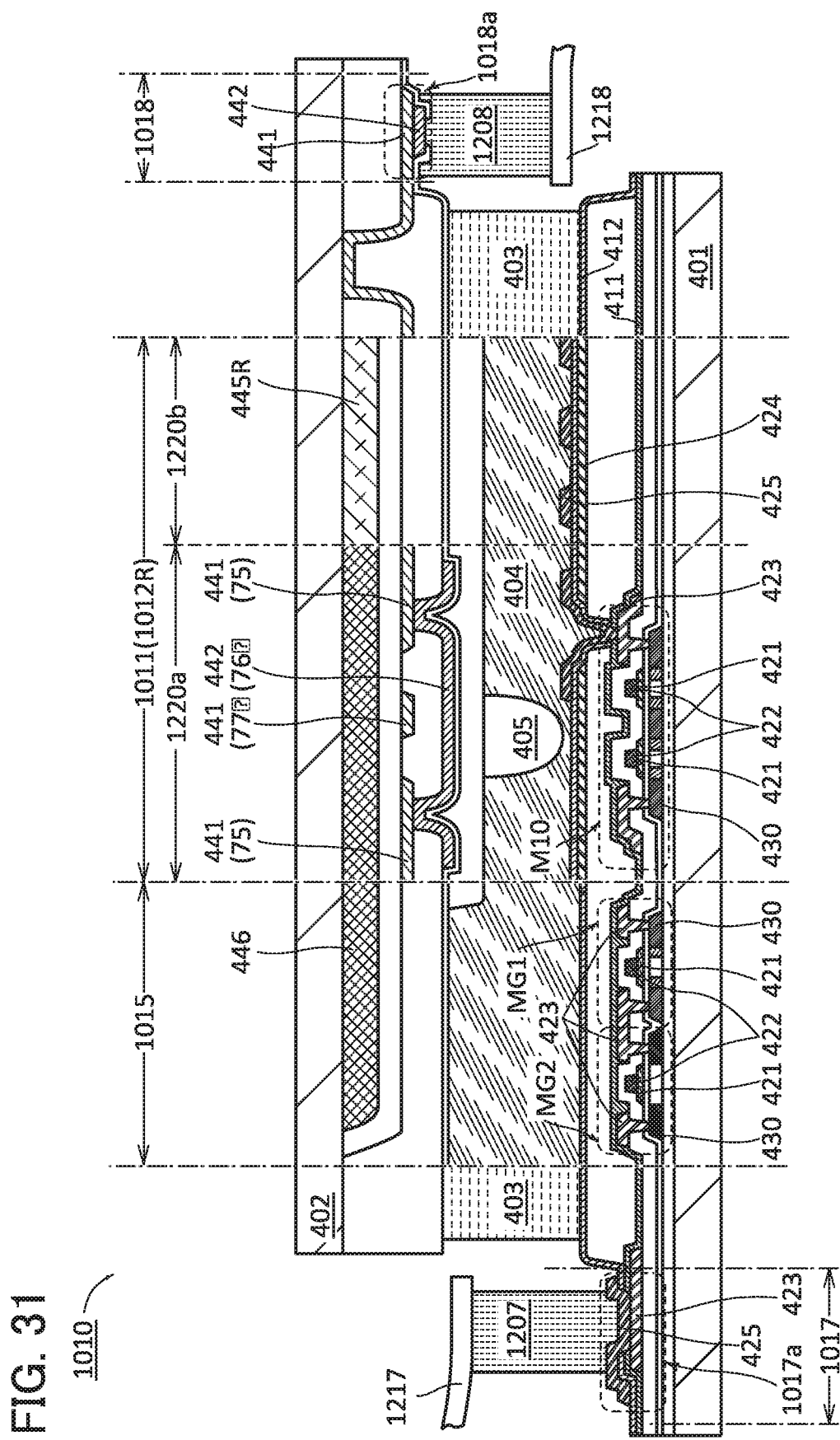
FIG. 31 is a cross-sectional view illustrating a structure example of a display panel.

A structure example of a display panel applicable to an in-cell touch panel unit will be described. FIG. 31 is a cross-sectional view illustrating a structure example of such a display panel. A display panel 1010 illustrated in FIG. 31 includes a pixel array 1011, a gate driver circuit 1015, and terminal portions 1017 and 1018.

A substrate 401 is a base substrate of an element substrate. A substrate 402 is a base substrate of a counter substrate. The substrate 401 and the substrate 402 are attached to each other with a sealant 403. A liquid crystal layer 404 is sealed in a region surrounded by the substrate 401, the substrate 402, and the sealant 403.

A pixel in the pixel array 1011 consists of three subpixels 1012R, 1012G, and 1012B. In FIG. 31, the subpixel 1012R is shown as a representative component of the pixel array 1011, and transistors MG1 and MG2 are shown as representative components of the gate driver circuit 1015.

As the sealant 403, a curable resin such as a thermosetting resin, a photocurable resin, or a two-component curable resin can be used. For example, the sealant 403 can be an acrylic resin, a urethane resin, an epoxy resin, or a resin having a siloxane bond (e.g., a silicone resin).

A transistor M10 is an n-channel transistor. The transistor MG1 is an n-channel transistor. The transistor MG2 is a p-channel transistor. Here, the transistor MG1 and the transistor MG2 are electrically connected to each other in series and form an inverter.

The substrate 401 is provided with insulating layers 411 and 412, conductive layers 421 to 425, and a semiconductor layer 430. The substrate 402 is provided with conductive layers 441 and 442, a color filter layer 445R, a light-blocking layer 446, and a spacer 405. Here, a region without a reference numeral or a hatch pattern represents an insulating layer. A plurality of conductive layers obtained by processing one conductive film are sometimes denoted by the same reference numeral. A conductive film can be a single layer or a stacked layer; the same applies to the insulating layers and the semiconductor layer. The above explanation applies also to FIGS. 32A to 35B.

The semiconductor layers 430 in the transistors M10, MG1, and MG2 are formed of one semiconductor film. Regarding crystallinity, this semiconductor film is in an amorphous, microcrystalline, polycrystalline, or single crystal state. There is no particular limitation on a semiconductor material for the semiconductor layers 430; for example, a semiconductor material containing a Group 14 element (silicon, germanium, silicon carbide, or Si—Ge), a compound semiconductor, or a metal oxide (oxide semiconductor) is used.

For example, the semiconductor layers 430 can be formed using a polycrystalline silicon film obtained in such a manner that an amorphous silicon film is formed and then crystallized. Examples of a method for crystallizing an amorphous silicon film include a laser crystallization method in which a laser having a wavelength of less than or equal to 400 nm is used, a lamp annealing crystallization method using infrared light, a solid phase growth method using heat treatment at 400° C. to 600° C., and a high-temperature annealing crystallization method at approximately 950° C. In a solid phase growth method, a catalytic element such as nickel is added to an amorphous silicon film, and then heat treatment is performed. Alternatively, an amorphous silicon film may be crystallized by a combination of at least two crystallization methods. For example, a polycrystalline silicon film is obtained in such a manner that a catalytic element such as nickel is added and a solid phase growth is caused by heat treatment, and then this polycrystalline silicon film is irradiated with a laser beam to reduce defects in the polycrystalline silicon film.

The semiconductor layer 430 can be formed using a single crystal (or polycrystalline) silicon film that is formed of a surface portion separated from a single crystal (or polycrystalline) silicon wafer to which hydrogen ions or the like are injected.

The transistor MG1 is an n-channel transistor with a lightly doped drain (LDD) structure. The transistor MG2 is a p-channel transistor without an LDD region.

The transistor M10 is an n-channel transistor with a multi-channel structure and an LDD structure. In the semiconductor layer 430 of the transistor M10, two channel formation regions, four low-concentration impurity regions, and three high-concentration impurity regions are formed. The multi-channel structure enables the reduction in off-state leakage current of the transistor M10.

In the subpixel 1012R, the conductive layer 424 functions as a common electrode, and the conductive layer 425 functions as a pixel electrode. The conductive layer 425 has a comb shape or has a slit in a plan view.

A sensor array is provided on the substrate 402 in a region overlapping the pixel array 1011. The sensor array includes electrodes 75 and 76 and a wiring 77. The electrode 75 and the wiring 77 are formed of the conductive layer 441. The electrode 76 is formed of the conductive layer 442. The electrode 76 establishes electrical continuity between two electrodes 75 that are adjacent to each other with the wiring 77 placed therebetween. For example, a wiring composed of the electrodes 75 and 76 functions as a sensing line, and the wiring 77 functions as a driving line. The subpixel 1012R includes a region 1220a and a region 1220b. The region 1220a does not contribute to display. The region 1220b contributes to display, and light from the subpixel 1012R can be extracted through the region 1220b. On the substrate 402, the light-blocking layer 446 and the conductive layers 441 and 442 are provided in the region 1220a. Meanwhile, in the region 1220b, the color filter layer 445R is provided, but the conductive layers 441 and 442 are not provided.

The terminal portion 1017 is provided over the substrate 401. The terminal portion 1018 is provided on the substrate 402. The terminal portion 1017 includes a terminal 1017a. The terminal 1017a includes the conductive layers 423 and 425. The terminal 1017a is electrically connected to an FPC 1217 through a conductive layer 1207. The terminal portion 1018 includes a terminal 1018a. The terminal 1018a includes the conductive layers 441 and 442. The terminal 1018a is electrically connected to an FPC 1218 through a conductive layer 1208.

Here, the display panel 1010 is an FFS-mode liquid crystal display panel. Alternatively, the display panel 1010 may be a liquid crystal display panel of another horizontal electric field mode (e.g., IPS mode) or a liquid crystal display panel of a vertical electric field mode (e.g., TN mode or VA mode). Needless to say, the display panel 1010 is not limited to a liquid crystal display panel and may be an EL display panel, an electronic paper panel, or the like.

<<Structure Example 2 of Display Panel>>

In the structure example 1, the sensor array is provided on the counter substrate; in this structure example, a sensor array is provided over an element substrate. FIG. 32A is a cross-sectional view illustrating a structure example of a display panel. A display panel 1020 illustrated in FIG. 32A includes a pixel array 1031, a gate driver circuit 1035, and a terminal portion 1037.

A pixel in the pixel array 1031 consists of subpixels 1032R, 1032G, and 1032B. Each of the subpixels has a similar structure. FIG. 32A illustrates the subpixel 1032R and the subpixel 1032G as representative components. The subpixel 1032R includes a transistor M11. The transistor M11 is an n-channel transistor.

The transistor M11 includes a semiconductor layer 431, a conductive layer 451, a pair of conductive layers 452, and a conductive layer 453. The conductive layer 451 functions as a gate electrode (front gate electrode), and the conductive layer 453 functions as a backgate electrode. The pair of conductive layers 452 functions as a source electrode and a drain electrode. The semiconductor layer 431 is formed using an oxide semiconductor film, for example.

In the subpixel 1032R, a conductive layer 455 functions as a pixel electrode, and a conductive layer 454 functions as a common electrode and faces the conductive layer 455.

The sensor array is composed of the conductive layers 451 and 454 provided in the pixel array 1031. FIG. 32B is a schematic plan view illustrating a structure example of the sensor array in the display panel 1020. The sensor array includes a plurality of wirings 71 and 72 and a plurality of electrodes 73. The wiring 71 is formed of the conductive layer 451. The wiring 72 and the electrode 73 are formed of the conductive layer 454. The wiring 71 extends in the X direction. The wiring 72 extends in the Y direction. The electrode 73 is connected to the wiring 72. For example, the wiring 71 functions as a driving line, and the wiring 72 functions as a sensing line.

A terminal 1037a is provided in the terminal portion 1037. The terminal 1037a includes the conductive layers 451 and 455 and is electrically connected to the FPC 1217 through the conductive layer 1207.

A transistor MG3 is shown as a representative component of the gate driver circuit 1035. The transistor MG3 is fabricated in the same steps as the transistor M11 and has a structure similar to that of the transistor M11.

Using an oxide semiconductor with a wider bandgap than silicon for the semiconductor layer 431 enables off-state current of the transistors M11 and MG3 to be extremely low. The oxide semiconductor preferably contains at least one of indium (In) and zinc (Zn) as a metal element. For the semiconductor layer of the transistors, an oxide semiconductor represented as In-M-Zn oxide (M is a metal such as Al, Ti, Ga, Y, Zr, La, Ce, Sn, or Hf) can be used, for example.

A crystalline oxide semiconductor is preferably used for the semiconductor layer of the transistors. Using a crystalline oxide semiconductor can suppress variation in electrical characteristics and provide a highly reliable transistor.

<<Structure Example 3 of Display Panel>>

A structure example of a top-emission EL display panel including a sensor array will be described. FIG. 33A is a cross-sectional view illustrating a structure example of the display panel. A display panel 1050 illustrated in FIG. 33A is a top-emission self-luminous display panel. The substrate 402 is fixed to the substrate 401 with a bonding layer 406. The display panel 1050 includes a pixel array 1061, a gate driver circuit 1065, and a terminal portion 1067.

A pixel in the pixel array 1061 consists of subpixels 1062R, 1062G, and 1062B. Each of the subpixels has a similar structure. FIG. 33A illustrates the subpixel 1062R and the subpixel 1062G as representative components. The subpixel 1062R includes a transistor M12 and an EL element 460. The transistor M12 and a transistor MG4 have a structure similar to that of the transistor M11.

The EL element 460 includes conductive layers 461 and 462 and an EL layer 463. In the EL element 460, the conductive layer 461 functions as a reflective pixel electrode and is electrically connected to the transistor M12. The conductive layer 462 functions as a transmissive common electrode. The conductive layer 462 may have a function of a semi-reflective film. In the pixel array 1061, the conductive layer 462 has an opening 462a between two adjacent pixel electrodes (conductive layers 461).

FIG. 33B is a schematic plan view illustrating a structure example of the sensor array in the display panel 1050. The wirings 71 and 72 and the electrodes 73 that constitute the sensor array are provided over the substrate 401. The wiring 71 is formed of the conductive layer 451. The wiring 72 and the electrode 73 are formed of the conductive layer 453.

FIG. 33A illustrates the transistor MG4 as a representative component of the gate driver circuit 1065. The transistor MG4 is fabricated in the same steps as the transistor M12 and has a structure similar to that of the transistor M12.

The substrate 402 is provided with color filter layers 466R and 466G and a light-blocking layer 467. A terminal 1067a is provided in the terminal portion 1067. The terminal 1067a includes the conductive layers 451 and 461 and is electrically connected to the FPC 1217 through the conductive layer 1207.

<<Structure Example 4 of Display Panel>>

Here, a structure example of a display panel applicable to a hybrid in-cell touch panel unit will be shown. FIG. 34A is a cross-sectional view illustrating a structure example of the display panel. A display panel 1021 illustrated in FIG. 34A includes a pixel array 1033, a gate driver circuit 1036, and terminal portions 1037 and 1038. A pixel in the pixel array 1033 consists of subpixels 1034R, 1034G, and 1034B. Each of the subpixels has a similar structure. FIG. 34A illustrates the subpixel 1034R and the subpixel 1034G as representative components.

The substrate 402 is provided with the terminal portion 1038, the wiring 72, and a dummy electrode 72d. The wiring 72 and the dummy electrode 72d are included in a sensor array. The terminal portion 1038 includes a terminal 1038a. The wiring 72, the dummy electrode 72d, and the terminal 1038a are formed of a conductive layer 481. The terminal 1038a is electrically connected to the FPC 1218 through the conductive layer 1208.

FIG. 34B is a schematic plan view illustrating a structure example of the sensor array in the display panel 1021. The sensor array includes a plurality of wirings 71 and 72 and a plurality of dummy electrodes 72d. Here, the wiring 71 is formed of the conductive layer 453. The plurality of wirings 72 are electrically connected to the FPC 1218 through the terminal portion 1038. For example, the wiring 71 functions as a driving line, and the wiring 72 functions as a sensing line. The dummy electrode 72d is electrically floating, for example.

<<Structure Example 5 of Display Panel>>

Here, an example of a bottom-emission EL display panel will be shown. FIG. 35A is a cross-sectional view illustrating a structure example of the display panel. A display panel 1051 illustrated in FIG. 35A includes a pixel array 1063, a gate driver circuit 1065, and terminal portions 1067 and 1068. A pixel in the pixel array 1063 consists of three subpixels 1064R, 1064G, and 1064B. Each of the subpixels has a similar structure. Here, the subpixels 1064R and 1064G are shown.

The terminal portion 1068, the color filter layers 466R and 466G, and the light-blocking layer 467 are provided over the substrate 401. A terminal 1068a and the wiring 72 are provided on an exterior surface of the substrate 401. The terminal 1068a and the wiring 72 are formed of a conductive layer 482.

FIG. 35B is a schematic plan view illustrating a structure example of a sensor array in the display panel 1051. The sensor array includes a plurality of wirings 71 and 72. Here, the wiring 71 is formed of the conductive layer 453. The plurality of wirings 72 are electrically connected to the FPC 1218 through the terminal portion 1068. For example, the wiring 71 functions as a driving line, and the wiring 72 functions as a sensing line.

Information about this specification and the like will be described below.

In this specification and the like, the description "X and Y are connected" means that X and Y are electrically connected, X and Y are functionally connected, and X and Y are directly connected. Accordingly, without being limited to a predetermined connection relation, for example, a connection relation shown in drawings or texts, another connection relation is included in the drawings or the texts. Each of X and Y denotes an object (e.g., a device, an element, a circuit, a wiring, an electrode, a terminal, a conductive film, or a layer).

A transistor is an element having three terminals: a gate, a source, and a drain. A gate functions as a control node that controls the on/off state of the transistor. Depending on the type of a transistor or levels of potentials applied to the terminals, one of two input/output nodes functions as a source and the other functions as a drain. Therefore, the terms "source" and "drain" can be replaced with each other in this specification and the like. In this specification and the like, the two terminals other than the gate are sometimes referred to as a first terminal and a second terminal.

A node can be referred to as a terminal, a wiring, an electrode, a conductive layer, a conductor, an impurity region, or the like depending on a circuit configuration, a device structure, and the like. Furthermore, a terminal, a wiring, or the like can be referred to as a node.

A voltage usually refers to a potential difference between a given potential and a reference potential (e.g., a ground potential (GND) or a source potential). Thus, a voltage can be referred to as a potential. Note that a potential has a relative value; hence, "GND" does not necessarily mean 0 V.

In the drawings, the size, the layer thickness, or a region is exaggerated for clarity in some cases. Therefore, the scale is not necessarily limited to that illustrated in the drawings. Note that the drawings schematically show ideal examples, and shapes or values are not limited to those shown in the drawings. For example, the following can be included: variation in signal, voltage, or current due to noise or difference in timing.

In this specification, terms for explaining arrangement, such as "over" and "under," are sometimes used for convenience to describe the positional relation between components with reference to drawings. Furthermore, the positional relation between components is changed as appropriate in accordance with a direction in which each component is described. Thus, the positional relation is not limited by a term used in the specification and can be described with another term as appropriate depending on the situation.

Even when one circuit block that performs given processing is shown in a circuit block diagram, a plurality of circuit blocks may actually be provided to perform the processing. Moreover, even when a plurality of circuit blocks with different functions are shown in a diagram, one circuit block may actually be provided to achieve these functions. Each of the above cases is included in one embodiment of the present invention shown in the drawings.

In this specification and the like, the terms "film" and "layer" can be interchanged depending on the case or circumstances. For example, in some cases, the term "conductive film" can be used instead of "conductive layer," and the term "insulating layer" can be used instead of "insulating film."

This application is based on Japanese Patent Application serial no. 2015-242728 filed with Japan Patent Office on Dec. 11, 2015, the entire contents of which are hereby incorporated by reference.

What is claimed is:

1. A signal processing circuit comprising:
a first terminal, a second terminal, a third terminal, and a fourth terminal;
a switch circuit; and
an integrator circuit,
wherein:
the integrator circuit comprises an amplifier circuit and a capacitor,
the amplifier circuit comprises an output terminal, an inverting input terminal, a first non-inverting input terminal, and a second non-inverting input terminal,
the amplifier circuit is configured to amplify a difference between a voltage of the inverting input terminal and an average voltage of a voltage of the first non-inverting input terminal and a voltage of the second non-inverting input terminal,
one of electrodes of the capacitor is electrically connected to the inverting input terminal, and the other of the electrodes of the capacitor is electrically connected to the output terminal,
the switch circuit comprises a first function and a second function,
the first function is capable of establishing electrical continuity between the inverting input terminal and the second terminal, establishing electrical continuity between the first non-inverting input terminal and the first terminal, and establishing electrical continuity between the second non-inverting input terminal and the third terminal, and
the second function is capable of establishing electrical continuity between the inverting input terminal and the third terminal, establishing electrical continuity between the first non-inverting input terminal and the second terminal, and establishing electrical continuity between the second non-inverting input terminal and the fourth terminal.

2. The signal processing circuit according to claim 1, further comprising a fifth terminal,
wherein:
a first voltage is input to the fifth terminal,
the switch circuit comprises a third function and a fourth function,
the third function is capable of establishing electrical continuity between the fifth terminal and each of the first to fourth terminals, and
the fourth function is capable of making the inverting input terminal electrically floating.

3. The signal processing circuit according to claim 2, wherein:
the switch circuit comprises a fifth function and a sixth function,
the fifth function is capable of establishing electrical continuity between the inverting input terminal and the second terminal, and establishing electrical continuity between the fifth terminal and each of the first and second non-inverting input terminals, and
the sixth function is capable of establishing electrical continuity between the inverting input terminal and the third terminal, and establishing electrical continuity between the fifth terminal and each of the first and second non-inverting input terminals.

4. A signal processing circuit comprising:
a first terminal, a second terminal, a third terminal, a fourth terminal, and a fifth terminal;
a switch circuit; and
a sensing circuit,
wherein:
the sensing circuit comprises an integrator circuit and an analog-to-digital converter circuit,
the analog-to-digital converter circuit is configured to convert analog data output from the integrator circuit into digital data,
the integrator circuit comprises an amplifier circuit and a capacitor,
the amplifier circuit comprises an output terminal, an inverting input terminal, a first non-inverting input terminal, and a second non-inverting input terminal,
the amplifier circuit is configured to amplify a difference between a voltage of the inverting input terminal and an average voltage of a voltage of the first non-inverting input terminal and a voltage of the second non-inverting input terminal,
one of electrodes of the capacitor is electrically connected to the inverting input terminal, and the other of the electrodes of the capacitor is electrically connected to the output terminal,
each of the first to fourth terminals is a terminal to be electrically connected to a wiring targeted for sensing,
a first voltage is input to the fifth terminal,
the switch circuit comprises a first function, a second function, a third function, and a fourth function,
the first function is capable of establishing electrical continuity between the inverting input terminal and the second terminal, establishing electrical continuity between the first non-inverting input terminal and the first terminal, and establishing electrical continuity between the second non-inverting input terminal and the third terminal,
the second function is capable of establishing electrical continuity between the inverting input terminal and the third terminal, establishing electrical continuity between the first non-inverting input terminal and the second terminal, and establishing electrical continuity between the second non-inverting input terminal and the fourth terminal,
the third function is capable of establishing electrical continuity between the inverting input terminal and the second terminal, and establishing electrical continuity between the fifth terminal and each of the first and second non-inverting input terminals, and
the fourth function is capable of establishing electrical continuity between the inverting input terminal and the third terminal, and establishing electrical continuity between the fifth terminal and each of the first and second non-inverting input terminals.

5. The signal processing circuit according to claim 4, wherein:
the switch circuit comprises a fifth function and a sixth function,
the fifth function is capable of establishing electrical continuity between the fifth terminal and each of the first to fourth terminals, and
the sixth function is capable of making the inverting input terminal electrically floating.

6. The signal processing circuit according to claim 4, wherein:
the sensing circuit comprises a sample and hold circuit,
an output signal of the integrator circuit is sampled by the sample and hold circuit, and
an analog signal sampled by the sample and hold circuit is input to the analog-to-digital converter circuit.

7. An integrated circuit comprising:
N sensing circuits, where N is an integer larger than 0;
N switch circuits;
2N+2 first pins; and
a second pin,
wherein:
the j-th sensing circuit comprises a j-th integrator circuit, a j-th sample and hold circuit, and a j-th analog-to-digital converter circuit, where j is an integer of 1 to N,
the j-th sample and hold circuit is configured to sample an output signal of the j-th integrator circuit,
the j-th analog-to-digital converter circuit is configured to convert an output signal of the j-th sample and hold circuit into a digital signal,
the j-th integrator circuit comprises a j-th amplifier circuit, a j-th capacitor, and a j-th switch,
the j-th amplifier circuit comprises a j-th output terminal, a j-th inverting input terminal, a j-th first non-inverting input terminal, and a j-th second non-inverting input terminal,
the j-th amplifier circuit is configured to amplify a difference between a voltage of the j-th inverting input terminal and an average voltage of a voltage of the j-th first non-inverting input terminal and a voltage of the j-th second non-inverting input terminal,
one of electrodes of the j-th capacitor is electrically connected to the j-th inverting input terminal, and the other of the electrodes of the j-th capacitor is electrically connected to the j-th output terminal,
the j-th switch is configured to control electrical continuity between the j-th inverting input terminal and the j-th output terminal,
the j-th switch circuit comprises a first function, a second function, and a third function,
the first function is capable of establishing electrical continuity between the second pin and each of the $(2j-1)$th to $(2j+2)$th first pins,
the second function is capable of establishing electrical continuity between the j-th inverting input terminal and the $2j$-th first pin, establishing electrical continuity between the j-th first non-inverting input terminal and the $(2j-1)$th first pin, and establishing electrical continuity between the j-th second non-inverting input terminal and the $(2j+1)$th first pin, and
the third function is capable of establishing electrical continuity between the j-th inverting input terminal and the $(2j+1)$th first pin, establishing electrical continuity between the j-th first non-inverting input terminal and the $2j$-th first pin, and establishing electrical continuity between the j-th second non-inverting input terminals and the $(2j+2)$th first pin.

8. The integrated circuit according to claim 7, wherein:
the j-th switch circuit comprises a fourth function and a fifth function,
the fourth function is capable of establishing electrical continuity between the second pin and each of the j-th inverting input terminal, the j-th first non-inverting input terminal, and the j-th second non-inverting input terminal, and
the fifth function is capable of establishing electrical continuity between the j-th inverting input terminal and the (2j+1)th first pin, and establishing electrical continuity between the second pin and each of the j-th first and second non-inverting input terminals.

9. The integrated circuit according to claim 8,
wherein the j-th switch circuit comprises a sixth function, and
wherein the sixth function is capable of making the j-th inverting input terminal electrically floating.

10. The integrated circuit according to claim 7, further comprising a circuit configured to drive a driving line for a touch sensor.

11. A semiconductor device comprising:
a sensor array; and
the integrated circuit according to claim 7,
wherein the sensor array comprises a sensing line and a driving line, and
wherein the sensing line is electrically connected to one of the first pins.

12. A semiconductor device comprising:
a sensor array;
a pixel array; and
the integrated circuit according to claim 7,
wherein:
the pixel array comprises a plurality of subpixels,
each of the plurality of subpixels comprises a display element,
the sensor array comprises a sensing line and a driving line, and
the sensing line is electrically connected to one of the first pins.

13. The semiconductor device according to claim 12, further comprising a source driver circuit and a gate driver circuit,
wherein the source driver circuit and the gate driver circuit are electrically connected to the pixel array, and
wherein the source driver circuit is provided in the integrated circuit.

14. A signal processing circuit comprising:
a first terminal, a second terminal, a third terminal, and a fourth terminal;
a switch circuit; and
an integrator circuit, wherein:
the first terminal, the second terminal, the third terminal, and the fourth terminal are selectively connectable to the integrator circuit through the switch circuit,
the integrator circuit comprises an amplifier circuit and a capacitor,
the amplifier circuit comprises an output terminal, an inverting input terminal, a first non-inverting input terminal, and a second non-inverting input terminal,
the amplifier circuit is configured to amplify a difference between a voltage of the inverting input terminal and an average voltage of a voltage of the first non-inverting input terminal and a voltage of the second non-inverting input terminal,
one of electrodes of the capacitor is electrically connected to the inverting input terminal, and the other of the electrodes of the capacitor is electrically connected to the output terminal.

15. The signal processing circuit according to claim 14, further comprising an analog-to-digital converter circuit,
wherein the analog-to-digital converter circuit is configured to convert analog data output from the integrator circuit into digital data.

16. The signal processing circuit according to claim 15, further comprising a sample and hold circuit,
wherein an output signal of the integrator circuit is sampled by the sample and hold circuit, and
wherein an analog signal sampled by the sample and hold circuit is input to the analog-to-digital converter circuit.

17. An electronic device comprising:
a display portion; and
the signal processing circuit according to claim 14,
wherein the display portion includes an input unit, and
wherein the signal processing circuit is configured to process a signal from the input unit.

18. An electronic device comprising:
a sensing unit; and
the signal processing circuit according to claim 14,
wherein the signal processing circuit is configured to process a signal from the sensing unit.

* * * * *